United States Patent
Yamane

(10) Patent No.: US 8,396,048 B2
(45) Date of Patent: Mar. 12, 2013

(54) COMMUNICATION APPARATUS AND METHOD FOR CONTROLLING COMMUNICATION APPARATUS

(75) Inventor: Shinji Yamane, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 942 days.

(21) Appl. No.: 12/405,470

(22) Filed: Mar. 17, 2009

(65) Prior Publication Data

US 2009/0238115 A1  Sep. 24, 2009

(30) Foreign Application Priority Data

Mar. 21, 2008  (JP) ................................ 2008-074305

(51) Int. Cl.
*H04J 3/24*  (2006.01)
*H04W 4/00*  (2009.01)
*H04L 12/28*  (2006.01)

(52) U.S. Cl. .................. 370/349; 370/328; 370/351

(58) Field of Classification Search ................ None
See application file for complete search history.

(56) References Cited

U.S. PATENT DOCUMENTS

| 2005/0058119 A1* | 3/2005 | Inouchi et al. | 370/351 |
| 2006/0209697 A1 | 9/2006 | Fujino | |
| 2007/0147304 A1* | 6/2007 | Jagana et al. | 370/331 |
| 2007/0253371 A1* | 11/2007 | Harper et al. | 370/331 |

FOREIGN PATENT DOCUMENTS

| JP | 2001-016258 | 1/2001 |
| JP | 2006-013640 | 1/2006 |
| JP | 2006-211614 | 8/2006 |
| JP | 2006-262119 | 9/2006 |

OTHER PUBLICATIONS

K. Nishida, et al; "NETLMM Protocol Applicability Analysis for 3GPP SAE Network"; Dated Nov. 7, 2006 URL: http://www2.tools.ietf or URL: http://g/html/draft-nishida-netlmm-protocol-.
3GPP TS 36.413 V8.0.0; 3rd Generation Partnership Project; Technical Specification Group Radio Access Network; "Evolved Universal Terrestrial Access Network (E-UTRAN);" S1 Application Protocol (S1AP) (Release 8); Dec. 2007 URL: http://www.3gpp.org/ftp/Specs/html-info/36413.htm.
3GPP TS 36.423 V8.0.0; 3rd Generation Partnership Project; Technical Specification Group Radio Access Network; "Evolved Universal Terrestrial Radio Access Network (EUTRAN);" X2 application protocol (X2AP) (Release 8); Dec. 2007 URL: http://www.3gpp.org/ftp/Specs/html-info/36423.htm.
WiMAX Forum Network Architecture (Stage 2: Architecture Tenets, Reference Model and Reference Points) [WiMAX Interworking with DSL] Release 1.0.0; WiMAX Forum Proprietary; Mar. 28, 2007.

(Continued)

*Primary Examiner* — Ayaz Sheikh
*Assistant Examiner* — Sori Aga
(74) *Attorney, Agent, or Firm* — Myers Wolin, LLC

(57) ABSTRACT

A communication apparatus provides a first transfer unit for transferring a first packet received from a base station to a second home agent, the first packet to be sent from a first mobile station to a second mobile station as a destination, the first terminal and the second terminal being managed by a first home agent and the second home agent respectively, a second transfer unit for transferring the first packet sent back from the second home agent to the base station, and a return instruction unit for issuing to the base station an instruction for directly transferring a second packet to the second mobile station when a predetermined condition is satisfied.

7 Claims, 68 Drawing Sheets

OTHER PUBLICATIONS

WiMAX Forum Network Architecture (Stage 2: Architecture Tenets, Reference Model and Reference Points) [3GPP—WiMAX Interworking] Release 1.0.0; WiMAX Forum Proprietary; Mar. 28, 2007.

WiMAX Forum Network Architecture (Stage 2: Architecture Tenets, Reference Model and Reference Points) [3GPP2—WiMAX Interworking] Release 1.0.0; WiMAX Forum Proprietary; Mar. 28, 2007.

WiMAX Forum Network Architecture (Stage 2: Architecture Tenets, Reference Model and Reference Points) [Stage 2 and Stage 3 Abbreviations] Release 1.0.0; WiMAX Forum Proprietary; Mar. 28, 2007.

WiMAX Forum Network Architecture (Stage 2: Architecture Tenets, Reference Model and Reference Points) [Part 0] Release 1.0.0; WiMAX Forum Proprietary; Mar. 28, 2007.

WiMAX Forum Network Architecture (Stage 2: Architecture Tenets, Reference Model and Reference Points) [Part 1] Release 1.0.0; WiMAX Forum Proprietary; Mar. 28, 2007.

WiMAX Forum Network Architecture (Stage 2: Architecture Tenets, Reference Model and Reference Points) [Part 2] Release 1.0.0; WiMAX Forum Proprietary; Mar. 28, 2007.

WiMAX Forum Network Architecture (Stage 2: Architecture Tenets, Reference Model and Reference Points) [Part 3-Informative Annex] Release 1.0.0; WiMAX Forum Proprietary; Mar. 28, 2007.

WiMAX Forum Network Architecture (Stage 3: Detailed Protocols and Procedures) Release 1.0.0; WiMAX Forum Proprietary; Mar. 28, 2007.

WiMAX Forum Network Architecture (Stage 3: Detailed Protocols and Procedures) [Annex: WiMAX—3GPP2 Interworking] Release 1.0.0; WiMAX Forum Proprietary; Mar. 28, 2007.

WiMAX Forum Network Architecture (Stage 3: Detailed Protocols and Procedures) [Annex: WiMAX—3GPP Interworking] Release 1.0.0; WiMAX Forum Proprietary; Mar. 28, 2007.

WiMAX Forum Network Architecture (Stage 3: Detailed Protocols and Procedures) [Annex: Prepaid Accounting] Release 1.0.0; WiMAX Forum Proprietary; Mar. 28, 2007.

WiMAX Forum Network Architecture (Stage 3: Detailed Protocols and Procedures) [Annex: R6/R8 ASN Anchored Mobility Scenarios] Release 1.0.0; WiMAX Forum Proprietary; Mar. 28, 2007.

Notification of Reasons for Refusal issued for corresponding Japanese Patent Application No. 2008-074305 dispatched Jul. 31, 2012 with English translation.

Iyer et al.; "All-IP Network Architecture for Mobile WiMAX"; IEEE 1-4244-0957-8; Orlando, FL; Mar. 25-29, 2007.

Iyer et al.; "All-IP Network Architecture for Mobile WiMAX"; IEEE 1-4244-0957-0; Mar. 1, 2007.

Starent Networks; Leung et al.; "WiMAX Forum/3GPP2 Proxy Mobile IPv4"; IETF Internet Draft; draft-leung-mip4-proxy-mode-07.text; Feb. 13, 2008.

Samsung Electronics; Choi et al.; Prefix binding based mobility management in WiMAX network; IETF Internet Draft; draft-jinchoi-nemo-pbm-00.text; Oct. 16, 2006.

Extended European search report with the European search opinion issued for corresponding European Patent Application No. 09155514.4 dated May 9, 2012.

* cited by examiner

| ASN-GW | BS | HA ADDRESS | MS ADDRESS | RETURN STATE (PLURAL STATES MANAGEMENT) |
|---|---|---|---|---|
| ASN-GW1 | BS1 | HA1 | MS1 | NULL |
| ASN-GW1 | BS1 | HA2 | MS2 | NULL |

Fig. 12

| ASN-GW | BS | HA ADDRESS | MS ADDRESS | RETURN STATE (PLURAL STATES MANAGEMENT) |
|---|---|---|---|---|
| ASN-GW1 | BS1 | HA1 | MS1 | MS2 and RETURN |
| ASN-GW1 | BS1 | HA2 | MS2 | MS1 and RETURN |

Fig. 13

| ASN-GW | BS | HA ADDRESS | MS ADDRESS | RETURN STATE (PLURAL STATES MANAGEMENT) |
|---|---|---|---|---|
| ASN-GW1 | BS1 | HA1 | MS1 | NULL |
| ASN-GW1 | BS2 | HA2 | MS2 | NULL |

Fig. 20

| ASN-GW | BS | HA ADDRESS | MS ADDRESS | RETURN STATE (PLURAL STATES MANAGEMENT) |
|---|---|---|---|---|
| ASN-GW1 | BS1 | HA1 | MS1 | MS2 and RETURN |
| ASN-GW1 | BS2 | HA2 | MS2 | MS1 and RETURN |

Fig. 21

| ASN-GW | BS | HA ADDRESS | MS ADDRESS | RETURN STATE (PLURAL STATES MANAGEMENT) |
|---|---|---|---|---|
| ASN-GW1 | BS1 | HA1 | MS1 | MS2 and RETURN |
| ~~ASN-GW1~~ | ~~BS2~~ | ~~HA2~~ | ~~MS2~~ | ~~MS1 and RETURN~~ |

Fig. 25

| ASN-GW | BS | HA ADDRESS | MS ADDRESS | RETURN STATE (PLURAL STATES MANAGEMENT) |
|---|---|---|---|---|
| ASN-GW1 | BS1 | HA1 | MS1 | NULL |

Fig. 27

| ASN-GW | BS | HA ADDRESS | MS ADDRESS | RETURN STATE (PLURAL STATES MANAGEMENT) |
| --- | --- | --- | --- | --- |
| ASN-GW1 | BS1 | HA1 | MS1 | MS2 and RETURN |
| ASN-GW1 | BS2 | HA2 | MS2 | MS1 and RETURN |

Fig. 30

| ASN-GW | BS | HA ADDRESS | MS ADDRESS | RETURN STATE (PLURAL STATES MANAGEMENT) |
|---|---|---|---|---|
| ASN-GW1 | BS1 | HA1 | MS1 | NULL |
| ASN-GW1 | BS2 | HA2 | MS2 | NULL |

Fig. 32

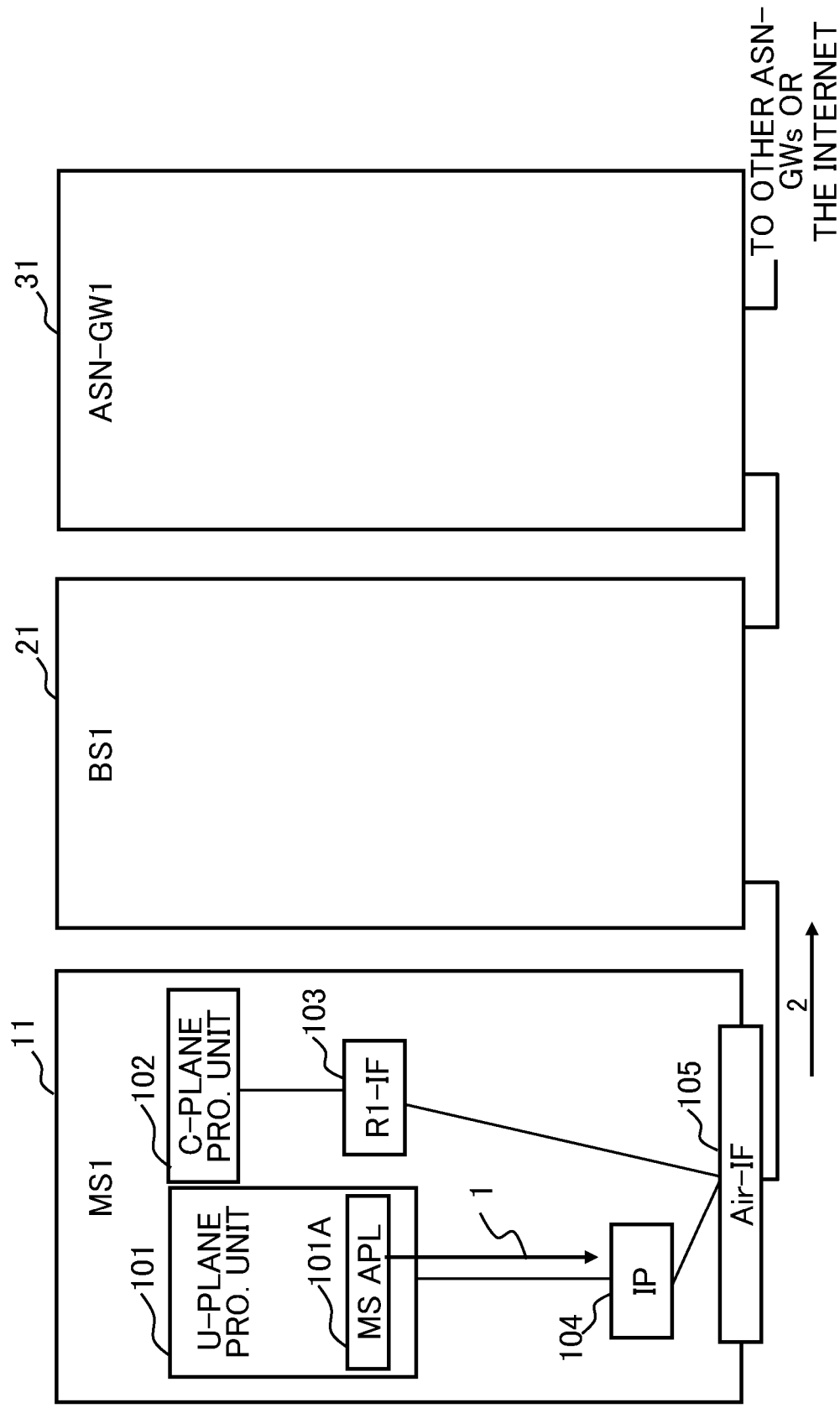

| aGW | eNB | Global-IP | Local-IP | RETURN STATE (PLURAL STATES MANAGEMENT) |
|---|---|---|---|---|
| aGW1 | eNB1 | GA1 | MS1 | NULL |
| aGW1 | eNB1 | GA2 | MS2 | NULL |

Fig. 46

| aGW | eNB | Global-IP | Local-IP | RETURN STATE (PLURAL STATES MANAGEMENT) |
|---|---|---|---|---|
| aGW1 | eNB1 | GA1 | MS1 | MS2 and RETURN |
| aGW1 | eNB1 | GA2 | MS2 | MS1 and RETURN |

Fig. 47

| aGW | eNB | Global-IP | Local-IP | RETURN STATE (PLURAL STATES MANAGEMENT) |
|---|---|---|---|---|
| aGW1 | eNB1 | GA1 | MS1 | NULL |

Fig. 55

| aGW | eNB | Global-IP | Local-IP | RETURN STATE (PLURAL STATES MANAGEMENT) |
|---|---|---|---|---|
| aGW2 | eNB2 | GA2 | MS2 | NOTHING |

Fig. 56

| aGW | eNB | Global-IP | Local-IP | RETURN STATE (PLURAL STATES MANAGEMENT) |
|---|---|---|---|---|
| aGW1 | eNB1 | GA1 | MS1 | RETURN to MS2 |
| aGW2 | eNB2 | GA2 | MS2 | RETURN to MS1 |

Fig. 57

| aGW | eNB | Global-IP | Local-IP | RETURN STATE (PLURAL STATES MANAGEMENT) |
|---|---|---|---|---|
| aGW2 | eNB2 | GA2 | MS2 | RETURN to MS1 |
| aGW1 | eNB1 | GA1 | MS1 | RETURN to MS2 |

Fig. 58

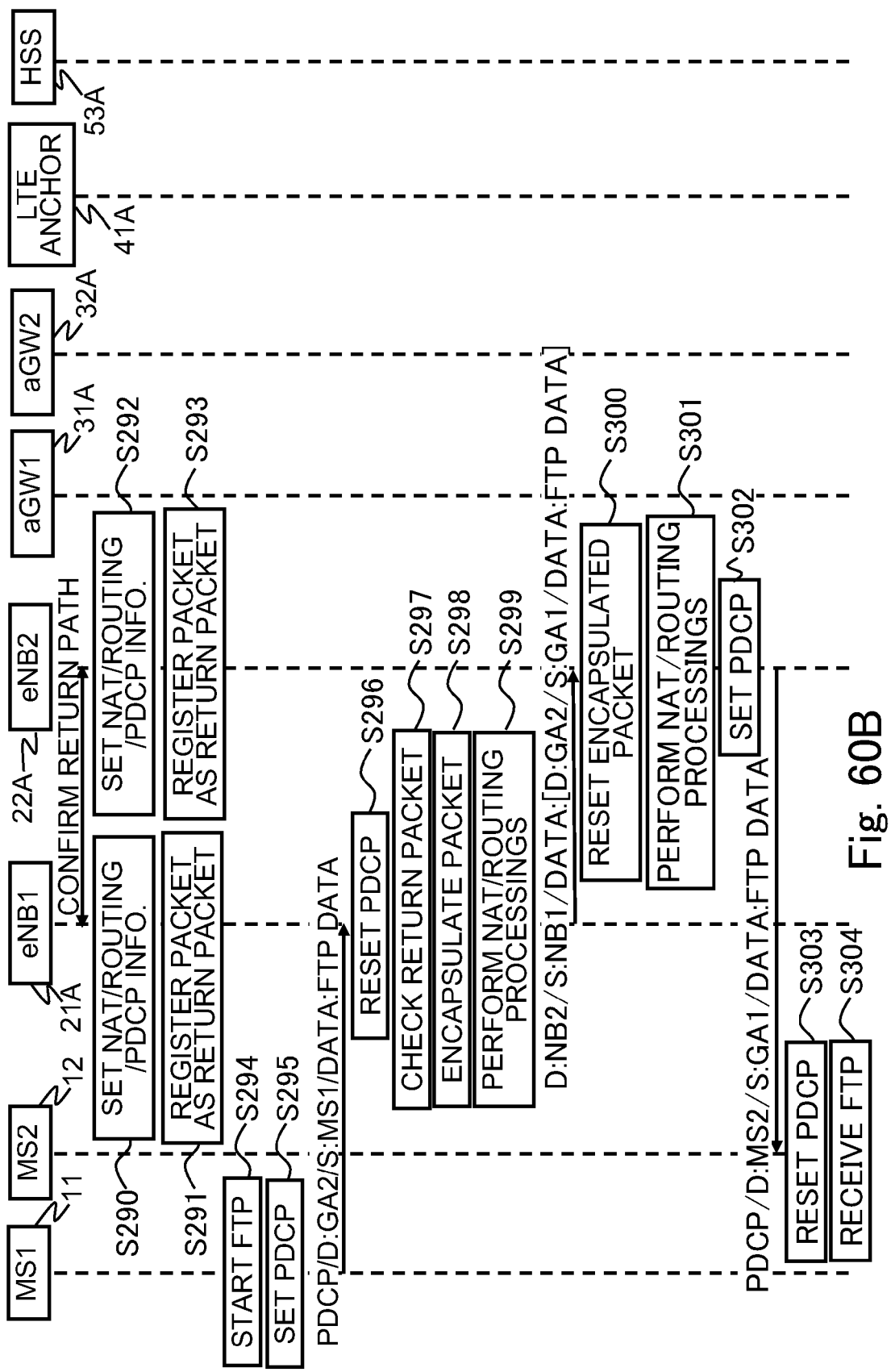

COMMUNICATION APPARATUS AND METHOD FOR CONTROLLING COMMUNICATION APPARATUS

CROSS-REFERENCE TO RELATED APPLICATION

This application is based upon and claims the benefit of priority of the prior Japanese Patent Application No. 2008-074305, filed on Mar. 21, 2008, the entire contents of which are incorporated herein by reference.

FIELD

The embodiments discussed herein are related to a communication apparatus and a control method of the communication apparatus.

BACKGROUND

The transfer of a packet with a technology of a mobile IP solves an IP address by using a Home Agent (hereinafter, simply referred to as HA).

In an example illustrated in FIG. 1, in communication between a mobile station 11 and a mobile station 12, a packet is transferred via an home agent 41 (home agent is hereinafter referred to as HA). In FIG. 1, packets transmitted from the mobile stations 11 and 12 are transferred to the HA 41 via a base station 21, an access service network-gateway (hereinafter, simply referred to as ASN-GW) 31, and a router 51.

In an example illustrated in FIG. 2, a dynamic host configuration protocol server (DHCP) 61 sets an IP address of the mobile station 11 via the base station 21. In this case, the base station 21 is actually connected to a communication network.

FIG. 3 illustrates an example in which the mobile station 11 moves the management from the base station 21 to a base station 22, i.e., handover is executed. In this case, before the moving, a tunnel between the base station 21 and the ASN-GW 31 is used. In the case illustrated in FIG. 3, an access service network router (ASN router) 56 intervenes at an interval between the base stations 21 and 22 and the ASN-GW 31. On the other hand, after the moving, paths using a tunnel between the ASN-GW 31 and an ASN-GW 32 and a tunnel between the ASN-GW 32 and the base station 22 are added.

In the case illustrated in FIG. 3, an ASN router 56 intervenes between the base station 21 and the ASN-GW 31. Further, an ASN router 57 intervenes between the base station 22 and the ASN-GW 32. As a consequence, in a state in which the IP address of the mobile station 11 is kept, a communication path having a start point of the ASN-GW 31 is established for the mobile station 11.

Herein, FIG. 4 illustrates a flow of a packet in the communication with packet transfer between the mobile station 11 and the mobile station 12 by using a technology of Worldwide Interoperability for Microwave Access (hereinafter, referred as to WiMAX) (refer to Document 1). In the case illustrated in FIG. 4, a communication network is connected to the Internet via an ISP-GW (Internet Service Provider-Gateway) 52. Further, in the case illustrated in FIG. 4, Authentication Authorization Accounting/Session Initiation Protocol (hereinafter, referred to as AAA/SIP) server 53 is provided.

FIG. 5 illustrates a flow of the packet in the communication with the transfer of the packet between the mobile station 11 and the mobile station 12 by using 3rd Generation Partnership Project (3GPP) technology (refer to Non-Patent Documents 1 to 4). In the case illustrated in FIG. 5, the packet transmitted from the mobile station 11 is transferred to an Long Term Evolution (LTE) anchor (hereinafter, referred to as an LTE anchor) 41A via an evolved node B (hereinafter, referred to as eNB) 21A as a base station, Access Gateway (hereinafter, referred to as aGW) 31A, and an ISP router 51. Further, in the case illustrated in FIG. 5, Home Subscriber Server/Session Initiation Protocol (hereinafter, referred to as HSS/SIP server) server 53A is provided. Incidentally, the basic structure and processing of devices forming a communication system with the 3GPP technology as will be described later with reference to FIG. 5 and FIGS. 7, 8, and 42 to 61 can properly use a well-known 3GPP technology, and a specific description thereof is omitted.

FIG. 6 illustrates an example of implementing a protocol stack from a Mobile Station (hereinafter, referred to as MS) to the ASN-GW via a Base Station (hereinafter, referred to as BS) with the WiMAX technology. FIG. 7 illustrates an example of implementing a protocol stack of U-Plane (uplink) from the mobile station (MS) to the aGW via the eNB with the 3GPP technology.

FIG. 8 illustrates an example of implementing a protocol stack of U-Plane (uplink) from the mobile station (MS) to the aGW via the base station (eNB) with the 3GPP technology upon terminating a Packet Data Conergence Protocol (hereinafter, referred to as PDCP) at the eNB, similarly to FIG. 7. There are several documents that relate to the related art, "WiMAX Forum Network Architecture (Stage 2: Architecture Tenets, Reference Model and Reference Points) [WiMAX Interworking with DSL] Release 1.0.0, Mar. 28, 2007", "WiMAX Forum Network Architecture (Stage 2: Architecture Tenets, Reference Model and Reference Points) [3GPP—WiMAX Interworking] Release 1.0.0, Mar. 28, 2007", "WiMAX Forum Network Architecture (Stage 2: Architecture Tenets, Reference Model and Reference Points) [3GPP2—WiMAX Interworking] Release 1.0.0, Mar. 28, 2007", "WiMAX Forum Network Architecture (Stage 2: Architecture Tenets, Reference Model and Reference Points) [Stage 2 and Stage 3 Abbreviations] Release 1.0.0, Mar. 28, 2007", "WiMAX Forum Network Architecture (Stage 2: Architecture Tenets, Reference Model and Reference Points) [Part 0] Release 1.0.0, Mar. 28, 2007", "WiMAX Forum Network Architecture (Stage 2: Architecture Tenets, Reference Model and Reference Points) [Part 1] Release 1.0.0, Mar. 28, 2007", "WiMAX Forum Network Architecture (Stage 2: Architecture Tenets, Reference Model and Reference Points) [Part 2] Release 1.0.0, Mar. 28, 2007", "WiMAX Forum Network Architecture (Stage 2: Architecture Tenets, Reference Model and Reference Points) [Part 3—Informative Annex] Release 1.0.0, Mar. 28, 2007", "WiMAX Forum Network Architecture (Stage 3: Detailed Protocols and Procedures) Release 1.0.0, Mar. 28, 2007", "WiMAX Forum Network Architecture (Stage 3: Detailed Protocols and Procedures) [Annex: WiMAX—3GPP2 Interworking] Release 1.0.0, Mar. 28, 2007", "WiMAX Forum Network Architecture (Stage 3: Detailed Protocols and Procedures) [Annex: WiMAX—3GPP Interworking] Release 1.0.0, Mar. 28, 2007", "WiMAX Forum Network Architecture (Stage 3: Detailed Protocols and Procedures) [Annex: Prepaid Accounting] Release 1.0.0, Mar. 28, 2007", "WiMAX Forum Network Architecture (Stage 3: Detailed Protocols and Procedures) [Annex: R6/R8 ASN Anchored Mobility Scenarios] Release 1.0.0, Mar. 28, 2007" which are referred to as Document 1 and were published by WiMAX Forum Proprietary, "K. Nishida, H. Yokota, "NETLMM Protocol Applicability Analysis for 3GPP SAE Network draft-nishida-netlmm-protocol-applicability-00.txt," (referred to as Document 2) (www2.tools.ietf.org/html/draft-nishida-netlmm-protocol-applicability-00), "3GPP TS 36.413 S1 Application Protocol (S1AP)" (referred to as Document 3), "3GPP TS 36.423 X2 Application Protocol (X2AP)." (referred to as Document 4).

SUMMARY

According to an aspect of the invention, a communication apparatus includes a first transfer unit for transferring a first packet received from a base station to a second home agent, the first packet to be sent from a first mobile station to a second mobile station as a destination being transferred to the second home agent, the first terminal and the second terminal being managed by a first home agent and the second home agent respectively, the first mobile station and the second mobile station being located in a region under control of the base station, a second transfer unit for transferring the first packet sent back from the second home agent to the base station, the first packet encapsulated in the second home agent so as to include an address of the communication apparatus as an destination address, and a return instruction unit for issuing to the base station an instruction for directly transferring a second packet to the second mobile station when a predetermined condition is satisfied, the instruction being including information of a network address translation for resetting an address of the second home agent to an address of the first home agent, the second packet to be sent from the first mobile station to the second mobile station as a destination being transferred to the second home agent, wherein the return instruction unit does not issue the instruction to the base station when the predetermined condition is not satisfied.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 12 is a diagram for explaining a return management table (initial state) in the communication system according to the first embodiment;

FIG. 13 is a diagram for explaining the return management table (after setting the return) in the communication system according to the first embodiment;

FIG. 20 is a diagram for explaining a return management table (initial state) in the communication system according to the second embodiment;

FIG. 21 is a diagram for explaining the return management table (after setting the return) in the communication system according to the second embodiment;

FIG. 25 is a diagram for explaining a return management table (after setting the return) in the communication system according to the third embodiment;

FIG. 27 is a diagram for explaining a return management table (after resetting the return) in the communication system according to the third embodiment;

FIG. 30 is a diagram for explaining a return management table (return state) in the communication system according to the fourth embodiment;

FIG. 32 is a diagram for explaining a return management table (return resetting state) in the communication system according to the fourth embodiment;

FIGS. 34A and 34B are diagrams for explaining the internal structure of devices in the communication system according to the first embodiment;

FIG. 46 is a diagram for explaining a return management table (initial state) in the communication system according to the fifth embodiment;

FIG. 47 is a diagram for explaining the return management table (after setting the return) in the communication system according to the fifth embodiment;

FIG. 55 is a diagram for explaining a return management table (initial state) of an aGW 31A in the communication system according to the sixth embodiment;

FIG. 56 is a diagram for explaining a return management table (initial state) of an aGW 32A in the communication system according to the sixth embodiment;

FIG. 57 is a diagram for explaining a return management table (after setting the return) of the aGW 31A in the communication system according to the sixth embodiment;

FIG. 58 is a diagram for explaining the return management table (after setting the return) of the aGW 32A in the communication system according to the sixth embodiment;

FIGS. 60A and 60B are sequence diagrams for explaining the operation in FIG. 59;

DESCRIPTION OF EMBODIMENTS

Hereinbelow, embodiments will be described with reference to the drawings.

First of all, a communication system according to the first embodiment will be described.

Figure 9:
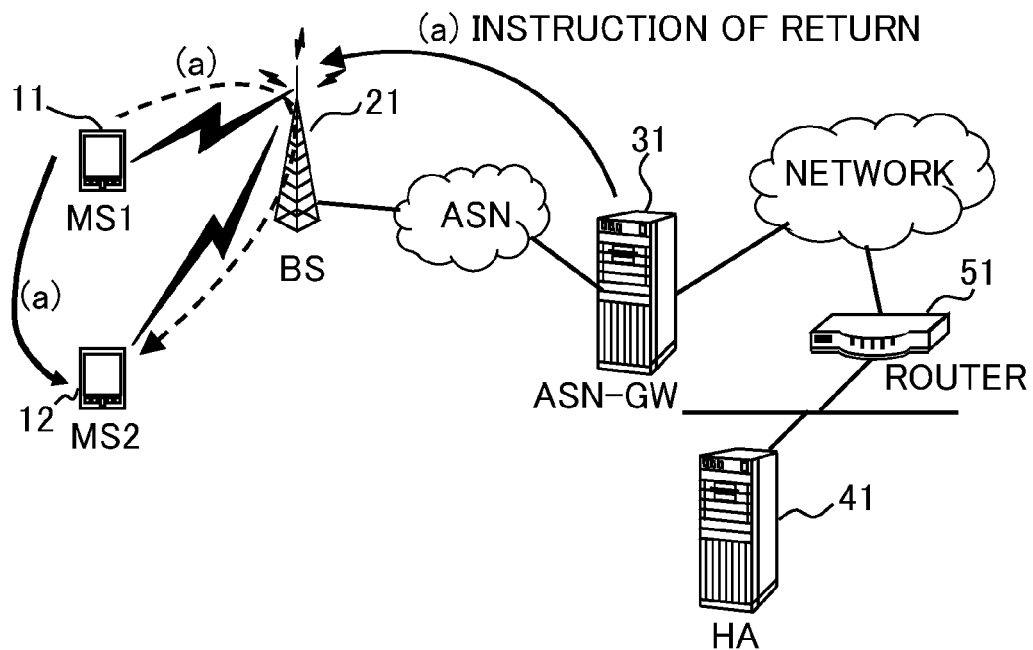
FIG. 9 is a diagram for explaining the embodiments.

According to the first embodiment, in a communication system using the WiMAX technology, referring to FIG. 9, the ASN-GW 31 instructs the return of the packet to a base station 21 that manages mobile stations 11 and 12 for mutual the communication. Herein, as illustrated in FIG. 9, the "return of packet" uses a path for returning the packet transmitted from the mobile station 11 is returned by the base station 21 and directly transmitting the packet to the mobile station 12. Therefore, the instruction of the return of the packet is an instruction for allowing the received packet to performing the processing to the base station 21.

Figure 1:
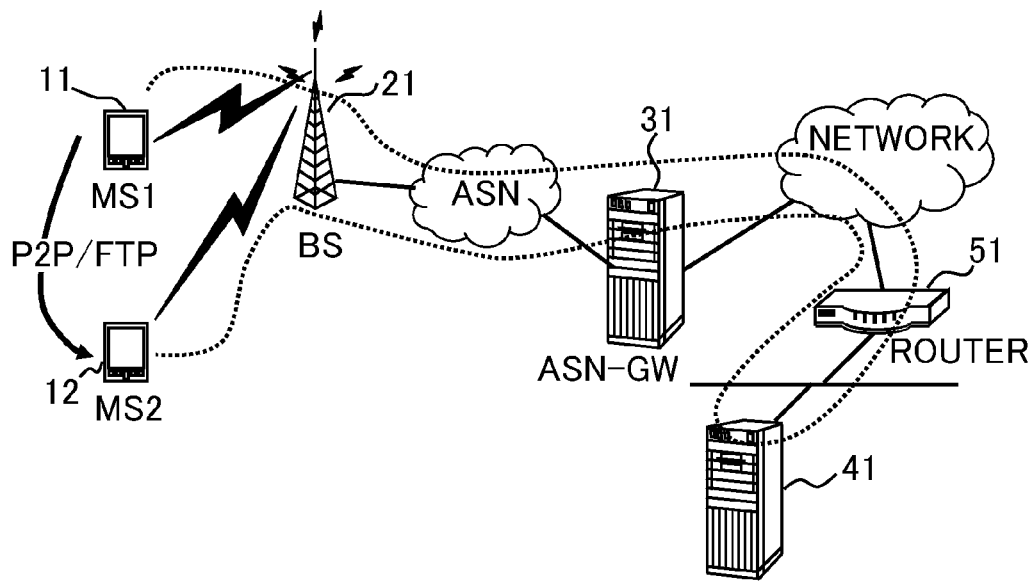
FIG. 1 is a diagram for explaining a transfer path of a packet with a WiMAX technology.
Figure 2:
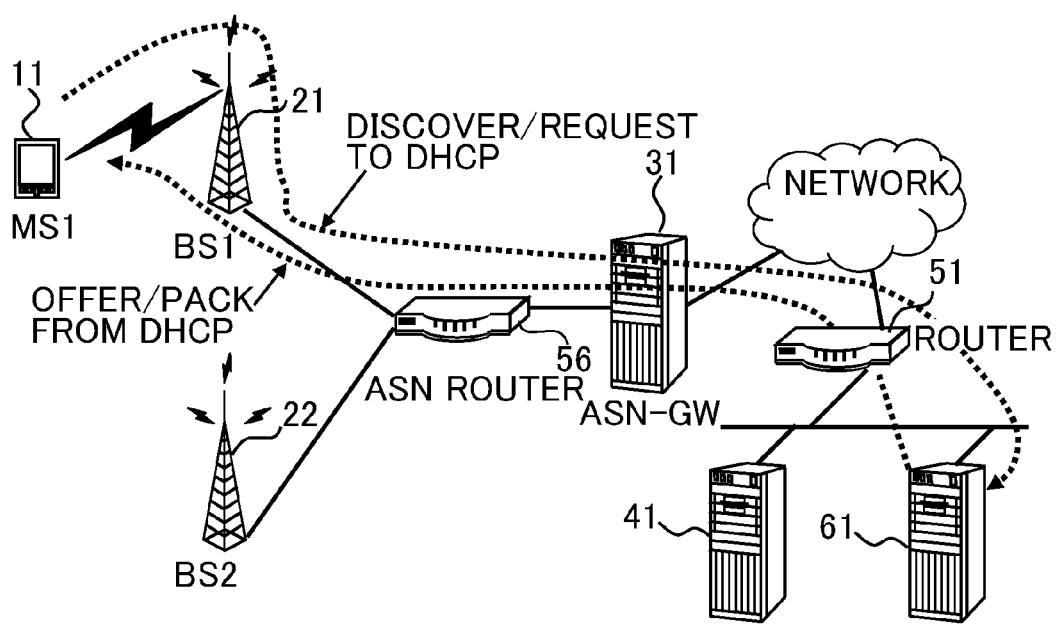
FIG. 2 is a diagram for explaining acquisition of an IP address of a mobile station with DHCP.
Figure 3:
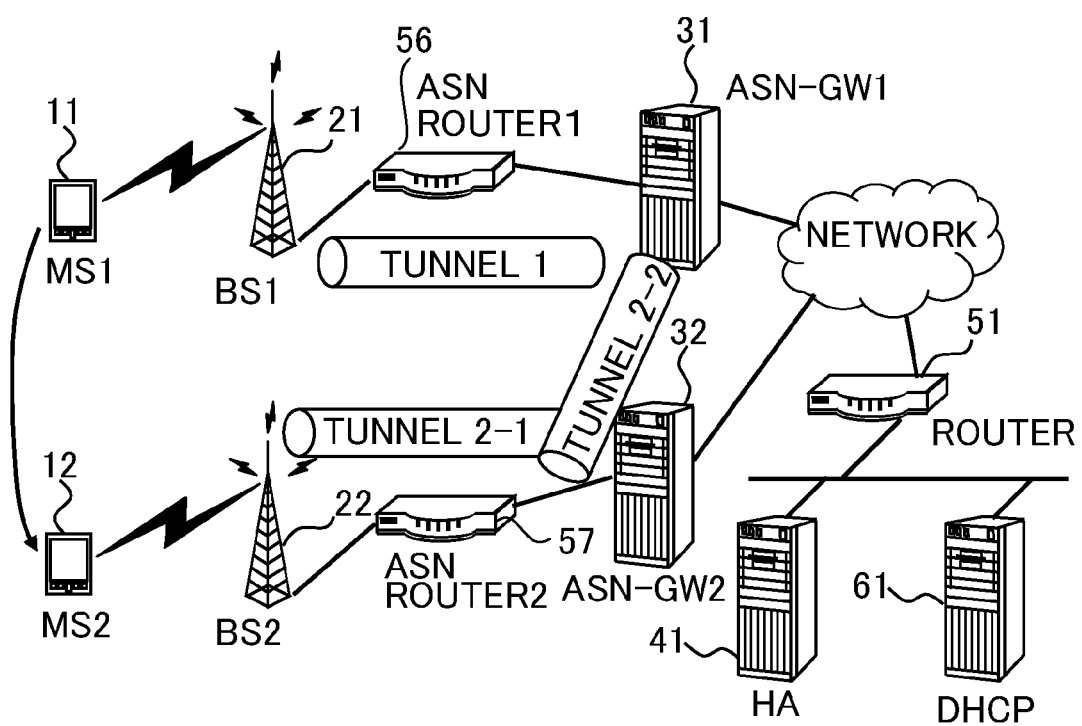
FIG. 3 is a diagram for explaining an HO operation upon moving a mobile station.

The communication path of the "return of the packet" is different from a path via the router 51 and the HA 41 illustrated in FIG. 1. Therefore, the processing load of the packet of the ASN-GW 31, router 51, and HA 41 is reduced, and communication paths among the base station 21, ASN-GW 31, router 51, and HA 41 are not used. Therefore, the load of transmission resources is efficiently reduced.

That is, with the communication system according to the first embodiment, the ASN-GW monitors a communication state of the mobile station thereunder, and instructs the return of the packet as necessary.

Further, with the communication system according to the first embodiment, the base station receives the instruction of the return of the packet from the ASN-GW, and sets a path, which is illustrated with the dashed line in FIG. 9, for returning and transmitting the received packet from the first mobile station to the second mobile station.

Further, with the communication system according to the first embodiment, in an improper situation for keeping the return of the packet, such as occurrence of the handover, the ASN-GW resets the setting of the path so as to solve the state.

Specifically, according to the first embodiment, an ASN-GW apparatus that manages the base station checks the address of the received packet from the mobile station such as a Personal Digital Assistant (PDA). When the address is managed by the base station under management of the ASN-GW, Network Address Translation (hereinafter, referred to as NAT, i.e., change of the IP address) processing, the structure of a tunnel between the base stations, and an instruction for changing a routine table are performed to the base station. As mentioned above, the packet is returned in the base station and between the base stations. As a consequence, the processing load and the load of transmission resources of the ASN-GW are reduced.

Figure 10:
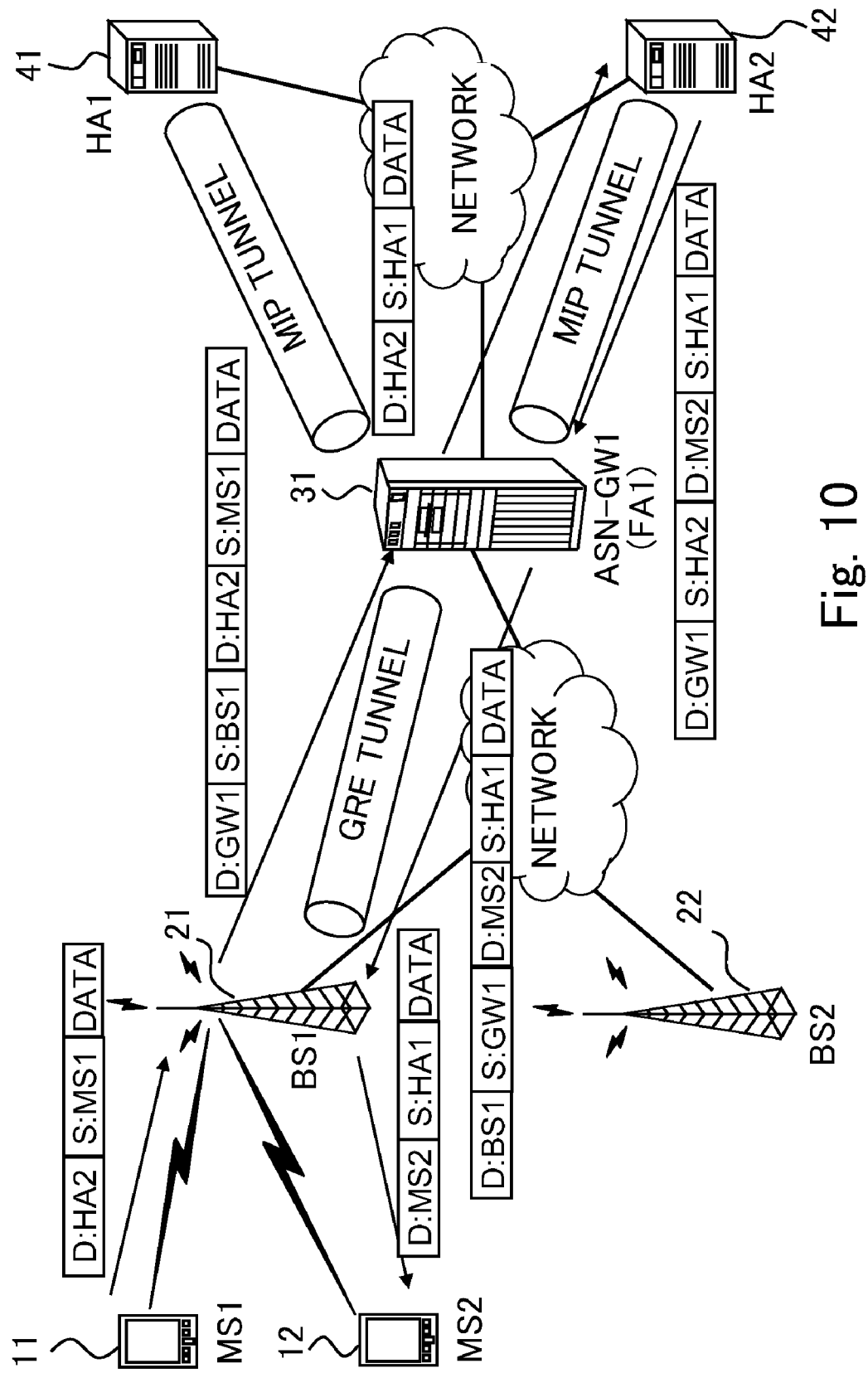
FIG. 10 is a diagram of an operation of the communication system according to the first embodiment.

FIG. 10 is a diagram for explaining an operation upon moving to a state for returning the packet in the base station according to the first embodiment. FIG. 10 illustrates a flow of the packet in the communication when the two mobile stations 11 and 12 under the management of the base station 21 communicate data with each other.

Upon transferring the packet from the mobile station 11 to the mobile station 12, the following operation is performed.

1) The packet having an address of the HA 42 (i.e., address of the HA on a mobile IP of the mobile station 12) is transferred from the mobile station 11 to the base station 21 at a wireless interval. The "D:HA", "S:MS1", and "DATA" in the packet from MS 11 to BS 21 are that the destination address is that of HA, the address of source terminal is that of MS1, and DATA is the data to be transfer from MS 11 to MS 12.

2) Generic Routing Encapsulation tunnel (hereinafter, simply referred to as GRE tunnel) is encapsulated from the base station 21 to the ASN-GW 31 and the packet is then transferred. The encapsulation enables the address of the packet to be set as the address of the ASN-GW 31. The internal header of the encapsulated packet keeps a receiving state thereof.

3) The ASN-GW 31 executes processing as a Foreign Agent (hereinafter, simply referred to as FA) of the mobile station 11. That is, the address on the transmission source of the received packet is replaced from the address of the mobile station 11 to the address of the HA 41 as the HA of the mobile station 11, and is transferred to the HA 42.

4) The HA 42 encapsulates and transfers the packet to the ASN-GW 31 as the FA of the mobile station 12 via a mobile IP tunnel (hereinafter, simply referred to as MIP tunnel). In this case, as processing of the HA, the HA 42 replaces the address of the internal header subjected to the encapsulation from the address of the HA 42 to the address of the mobile station 12. Incidentally, the ASN-GW 31 as FA may perform the processing for replacing the address of the internal header subjected to the encapsulation from the address of the HA 42 to the address of the mobile station 12.

5) The ASN-GW 31 transfers the packet to the base station 21 via the GRE tunnel.

6) The base station 21 resets the encapsulation of the packet, and transfers the packet to the mobile station 12.

Figure 11:
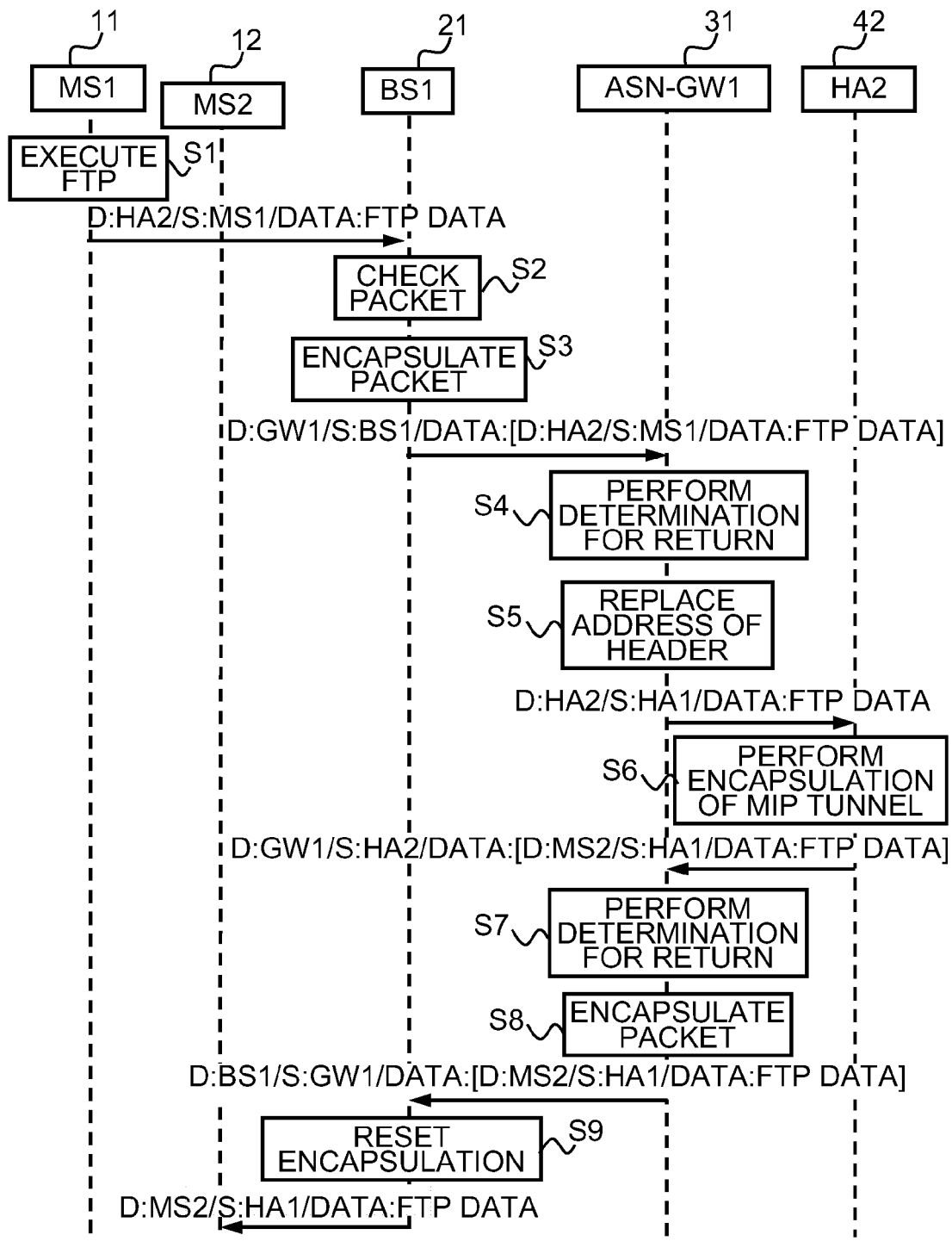
FIG. 11 is a sequence diagram of the operation in FIG. 10.

FIG. 11 illustrates an operation sequence of a flow of packet in the mutual communication between the two mobile stations 11 and 12 under the management of the base station 21 illustrated in FIG. 10.

In FIG. 11, in step S1 (hereinafter, a term of "step" will be omitted), the mobile station 11 executes a file transfer protocol (hereinafter, referred to as FTP), and transfers the packet to the base station 21. When the base station 21 receives the file transfer protocol, it is determined whether or not the packet is registered as a target of the return of the packet (S2). It is not determined that the packet is not the target of the return of the packet, the packet is encapsulated, the address thereof is set as the ASN-GW 31, and the packet is transferred to the ASN-GW 31 (S3).

The ASN-GW 31 receives the packet and performs return adaptation determination, which will be later (S4). As the ASN-GW 31 or FA, the address of the internal header subjected to the encapsulation is replaced from the address of the mobile station 11 to that of the HA 41 (S5), and the address of the HA 41 is transferred to the HA 42.

The HA 42 receives the address thereof, performs the encapsulation of the MIP tunnel (S6), and transfers the packet to the ASN-GW 31.

The ASN-GW 31 receives the packet, similarly performs the return adaptation determination (S7), encapsulates a Generic Routing Encapsulation (GRE) tunnel (S8), and transfers the packet to the base station 21.

The base station 21 receives the packet, and resets the encapsulation of the GRE tunnel (S9), and transfers the packet to the mobile station 12.

Herein, the ASN-GW 31 determines whether or not the destination of the packet or the address thereof on the transmission source is an address concerning a mobile IP, such as the HA 41 or HA 42, upon transmitting the packet to the HA 42 and receiving the packet from the HA 42. When the destination of the packet or the address thereof on the transmission source is the address concerning the mobile IP, such as the HA 41 or HA 42, the ASN-GW 31 determines whether or not the packet is registered as the target of the return of the packet, in the base station under the management of the ASN-GW 31. For the purpose of performing the determination, the ASN-GW 31 manages therein a return management table illustrated in FIG. 12.

The ASN-GW 31 analyzes the traffic situation of the packet used by itself or the protocol (FTP, streaming, etc.) of the packet, thereby determining the return adaptation. In the determination of the return adaptation, it is determined whether or not the packet under a condition (destination and transmission source) is registered as the target of the return of the packet. When it is determined that the packet under the corresponding condition (destination and transmission source) is to be registered as the target of the return of the packet, NAT information and routing information necessary for returning the packet are created on the basis of the return management table. Referring to FIG. 13, a return state of the return management table is updated. Further, referring to FIG. 14, the return of the packet is instructed to the base station 21, thereby setting the return of the packet to the base station 21.

With the setting of the return of the packet, the base station 21 performs the NAT processing and routine processing to the packet from the mobile station 11 on the basis of the NAT information and routing information. As a consequence, the packet is returned from the base station 21, and is transferred to the mobile station 12.

Figure 14:
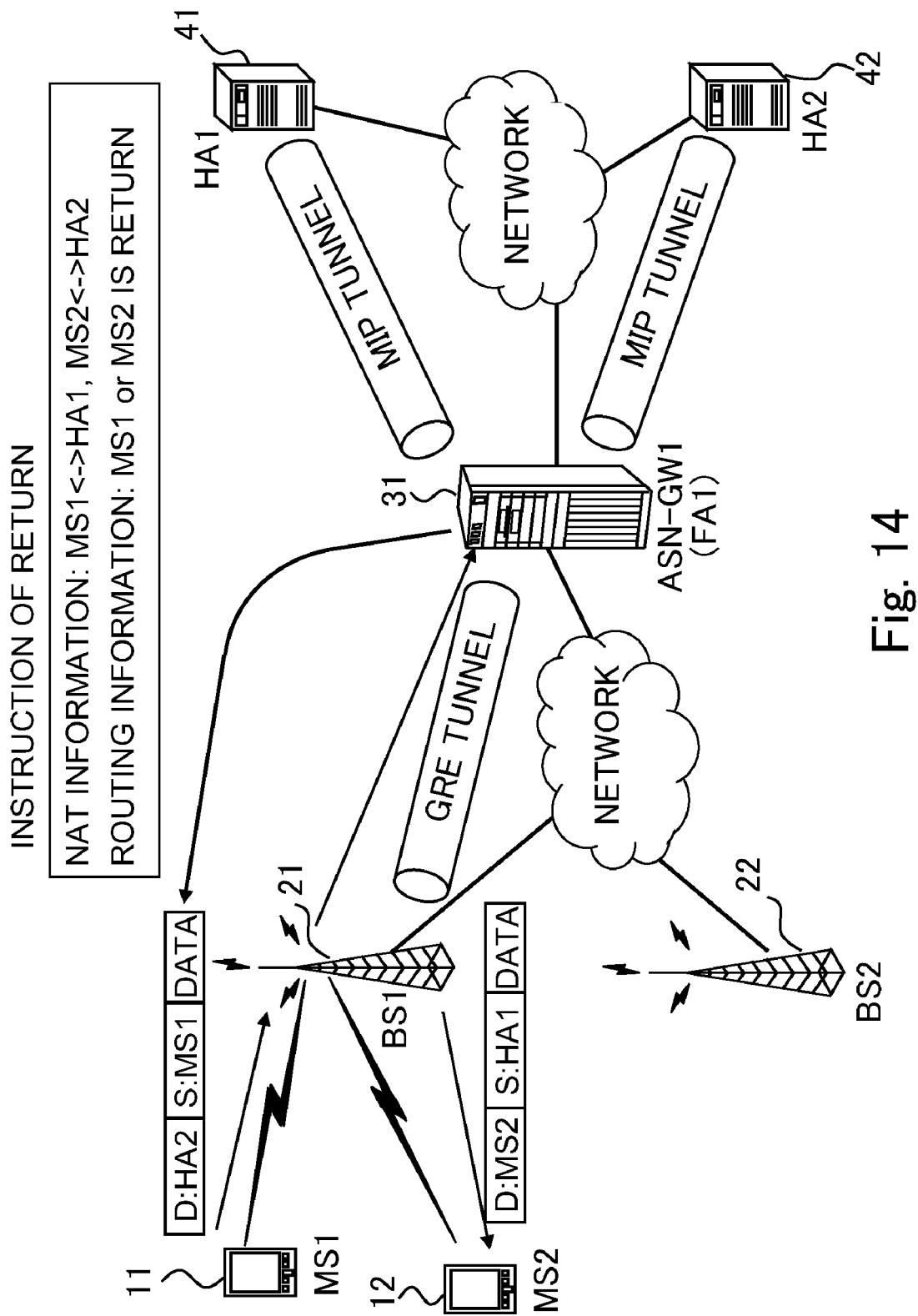
FIG. 14 is a diagram of the operation of the communication system according to the first embodiment.
Figure 15:
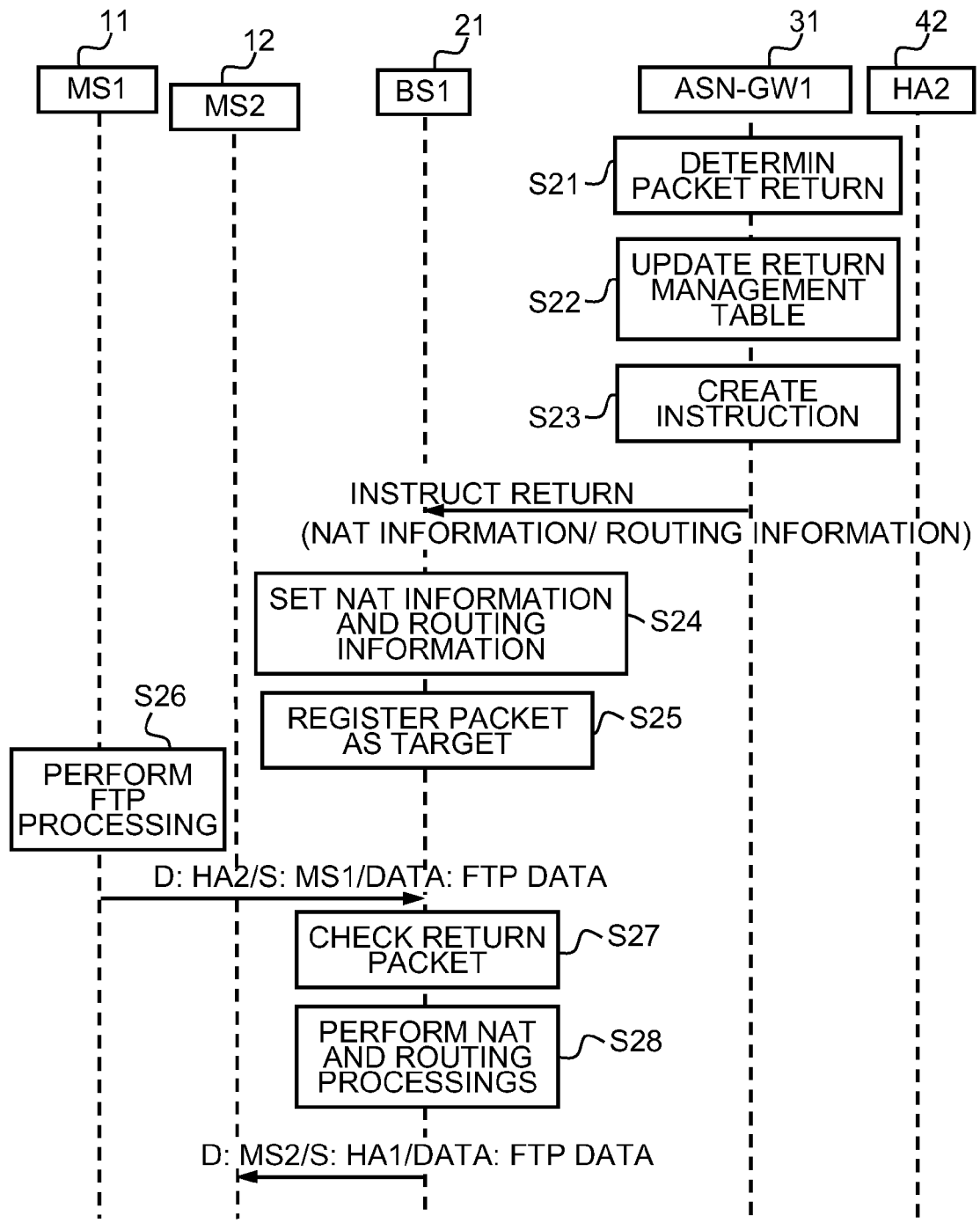
FIG. 15 is a sequence diagram for explaining the operation in FIG. 14.

FIG. 15 illustrates an operation sequence upon setting the return of the packet illustrated in FIG. 14.

In FIG. 15, the ASN-GW 31 determines the return adaptation. Then, it is determined that the packet matching a predetermined condition (destination and transmission source) is to be registered as the target of the return of the packet (S21), the return management table is updated. That is, as illustrated in FIG. 13, "return to MS 2" and "return to MS 1" are written to a return state column of the corresponding record with respect of the packet of the communication between the mobile station 11 and the mobile station 12 (S22). Further, the ASN-GW 31 creates necessary NAT information and routing information so that the base station 21 embodies the return of the corresponding packet, and transmits the created information to the base station 21 (S23).

The base station 21 that receives the information sets the NAT information and routing information thereto (S24), and registers the corresponding packet of (the packet of the communication between the mobile station 11 and the mobile station 12) as the target of the return of the packet (S25).

Thereafter, the mobile station 11 performs FTP processing, and transfers the packet addressed to the mobile station 12 to the base station 21 (S26). Then, the base station 21 checks to see if the packet is registered as the target of the return of the packet (S27). Since the packet matches the condition (destination and transmission source) registered in S25, the NAT processing and routine processing are performed to return the packet (S28). As a consequence, the base station 21 replaces the address of the destination of the packet to the address of the mobile station 12, and also replaces the address on the transmission source to the address of the HA 41 in the mobile station 11. As a consequence, the packet is returned and the resultant packet is directly transferred to the mobile station 12.

According to the first embodiment, the ASN-GW 31 analyzes the traffic situation of the packet used by itself and the protocol of the packet, thereby determining the return adaptation. Hereinbelow, this will be specifically described.

1) The ASN-GW 31 monitors the amount of packet of a specific mobile station at the communication destination for a predetermined period. When the mobile station communicates the amount of packet not less than a threshold with the second mobile station the under the management of the ASN-GW 31, it is determined that the corresponding packet is to be registered as the target of the return of the packet.

2) Alternatively, when the type of protocol of the packet is monitored and the type is a predetermined one, it is determined that the corresponding packet is to be registered as the target of the return of the packet.

A description will be given of a method for periodically checking and determining the amount of packet of the specific mobile station with reference to FIG. 16.

Herein, the amount of passage packet of the specific mobile station is monitored. Upon detecting the passage of a prescribed amount of packet or more at the specific mobile station, it is determined that the corresponding packet is to be registered as the target of the return of the packet. The ASN-GW 31 continuously performs reception processing of a communication task (thread/process) allocated in advance to the mobile stations every mobile station (S41 to S45 in FIG. 16). Further, a task for checking the return as another task sequentially selects a specific one of the mobile stations as a monitoring target thereof, and determines the mobile station for selection on the basis of the amount of passage packet (S51 to S55 in FIG. 16).

Figure 16:
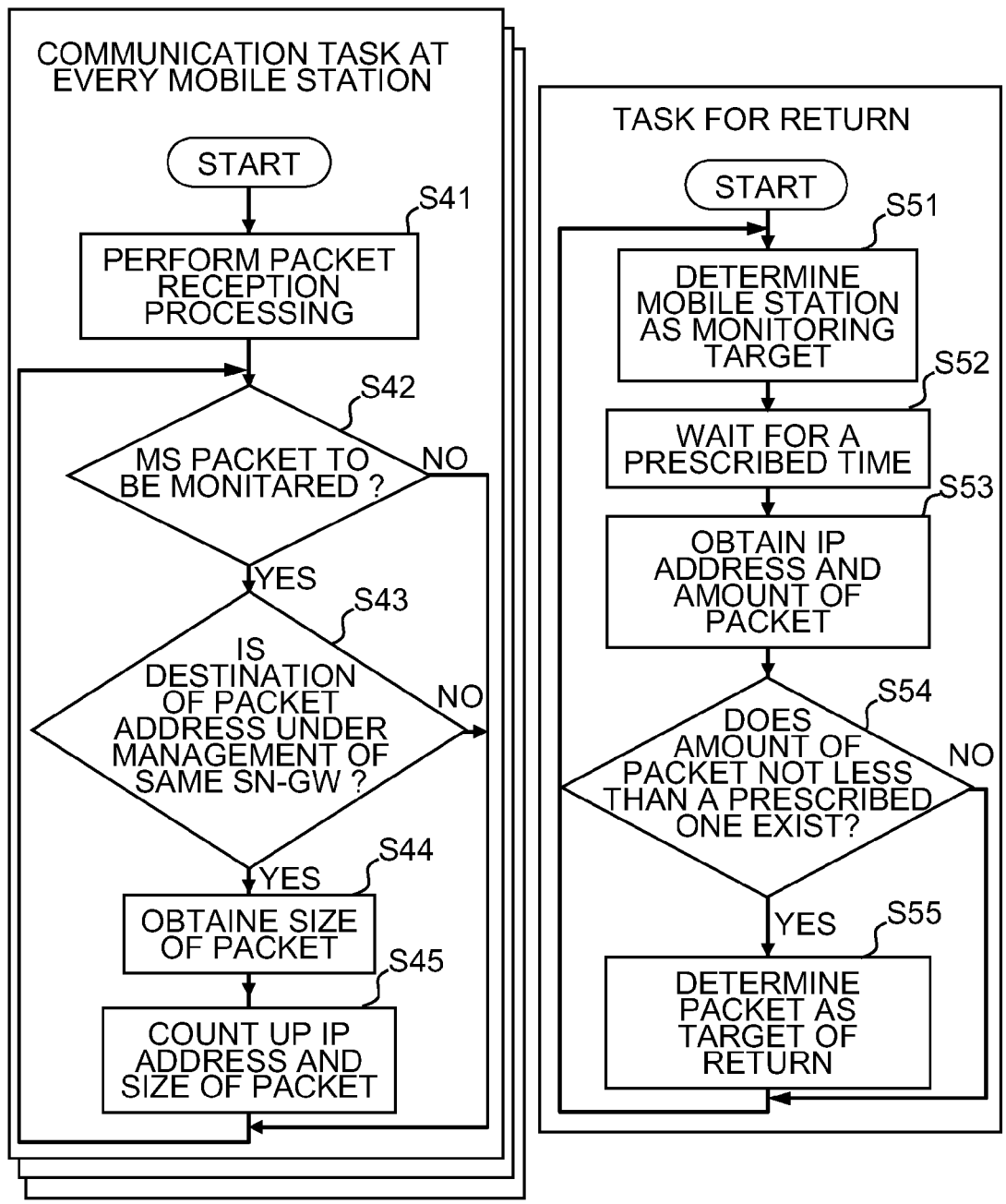
FIG. 16 is a flowchart for explaining a flow of processing for periodically checking the amount of packet of a specific mobile station in the communication system according to the first embodiment.

In FIG. 16, the ASN-GW 31 receives the packet (S41), the communication task every mobile station determines whether or not the packet is from the mobile station as the monitoring target determined in S51, which will be described later (S42). When the packet is from the mobile station as the monitoring target (Yes), it is determined whether or not the destination of the packet is the address under management of the ASN-GW 31 (S43). When the destination of the packet is the address under management of the ASN-GW 31 (Yes), the size of the packet is obtained (S44). The IP address as the destination and the size of packet are counted up, in accordance with the mobile station on the transmission side (S45).

The task for checking the return determines the mobile station as the monitoring target (S51), and waits for a prescribed time (S52). The IP address and the size of packet of the corresponding mobile station (obtained in S45) are obtained (S53). It is determined on the basis of the counting, whether or not the IP address for recording the amount of packet not-less-than a prescribed one exists (S54). When the IP address for recording the amount of packet not-less-than a prescribed one exists (Yes), it is determined that the packet of the communication between the corresponding mobile station and the mobile station at the IP address is to be registered as the target of the return of the packet (S55).

Next, a description will be given of a method for determining whether or not the packet is to be registered as the target of the return of the packet, depending on the type of protocol with reference to FIG. 17.

Upon determining whether or not the packet is to be registered as the target of the return of the packet, depending on the type of protocol, the protocol of the passage packet of the specific mobile station is monitored. When a large amount of packet in FTP or streaming is received and transmitted at the protocol, it is determined that the packet of the communication between the corresponding mobile stations is to be registered as the target of the return of the packet.

Figure 17:
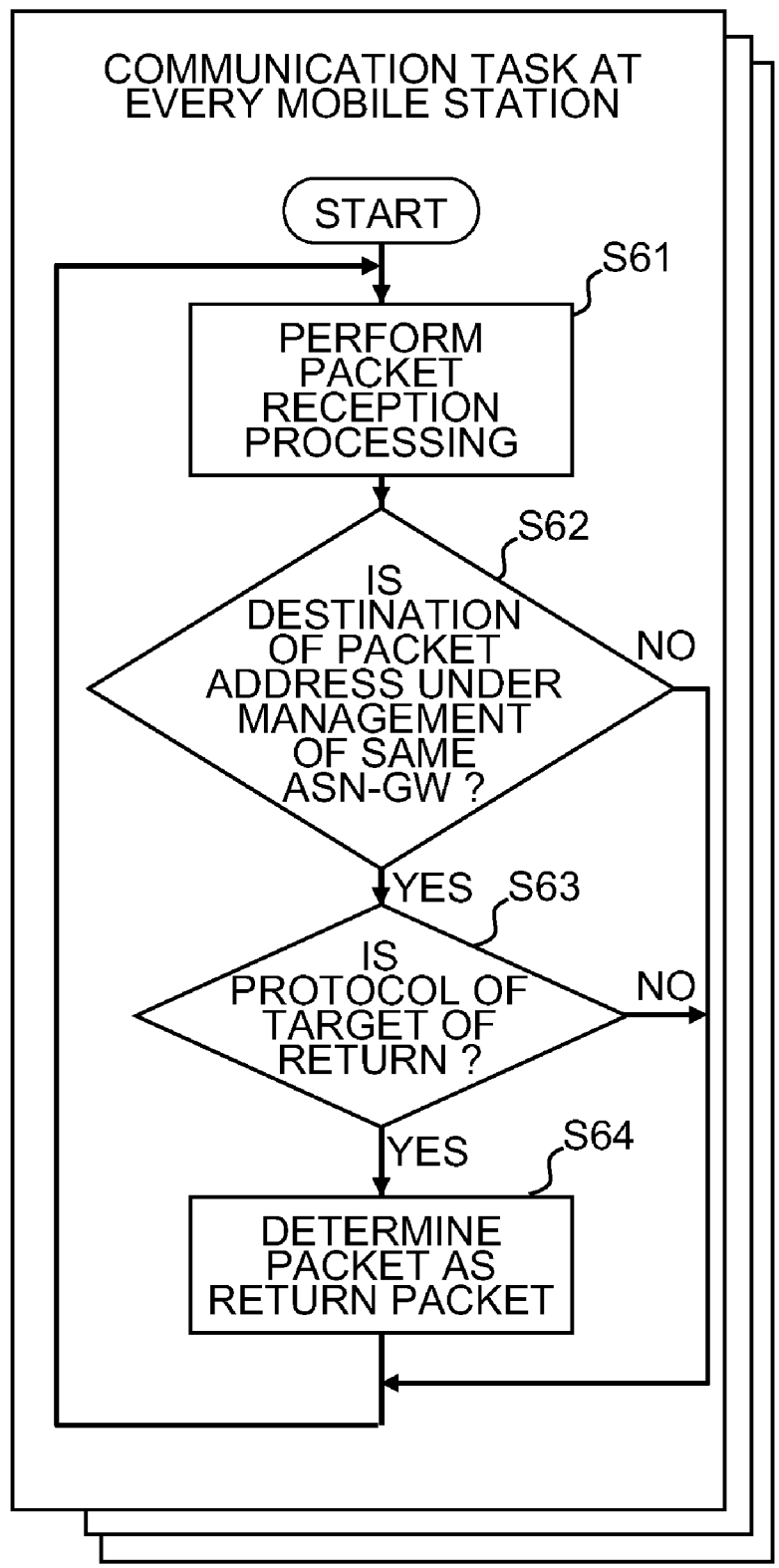
FIG. 17 is a flowchart for explaining a flow of processing for checking the type of protocol in the communication system according to the first embodiment.

In FIG. 17, the ASN-GW 31 receives the packet (S61), and it is determined whether or not the destination is the address under management of the ASN-GW 31 (S62). When the destination is the address under management of the ASN-GW 31 (Yes), the protocol is obtained. When a large amount of packet in FTP or streaming is received and transmitted at the protocol (Yes in S63), it is determined that the packet of the communication between the mobile stations is to be registered as the target of the return of the packet (S64).

Next, a description will be given of a communication system according to the second embodiment with reference to FIGS. 18 to 23.

Figure 18:
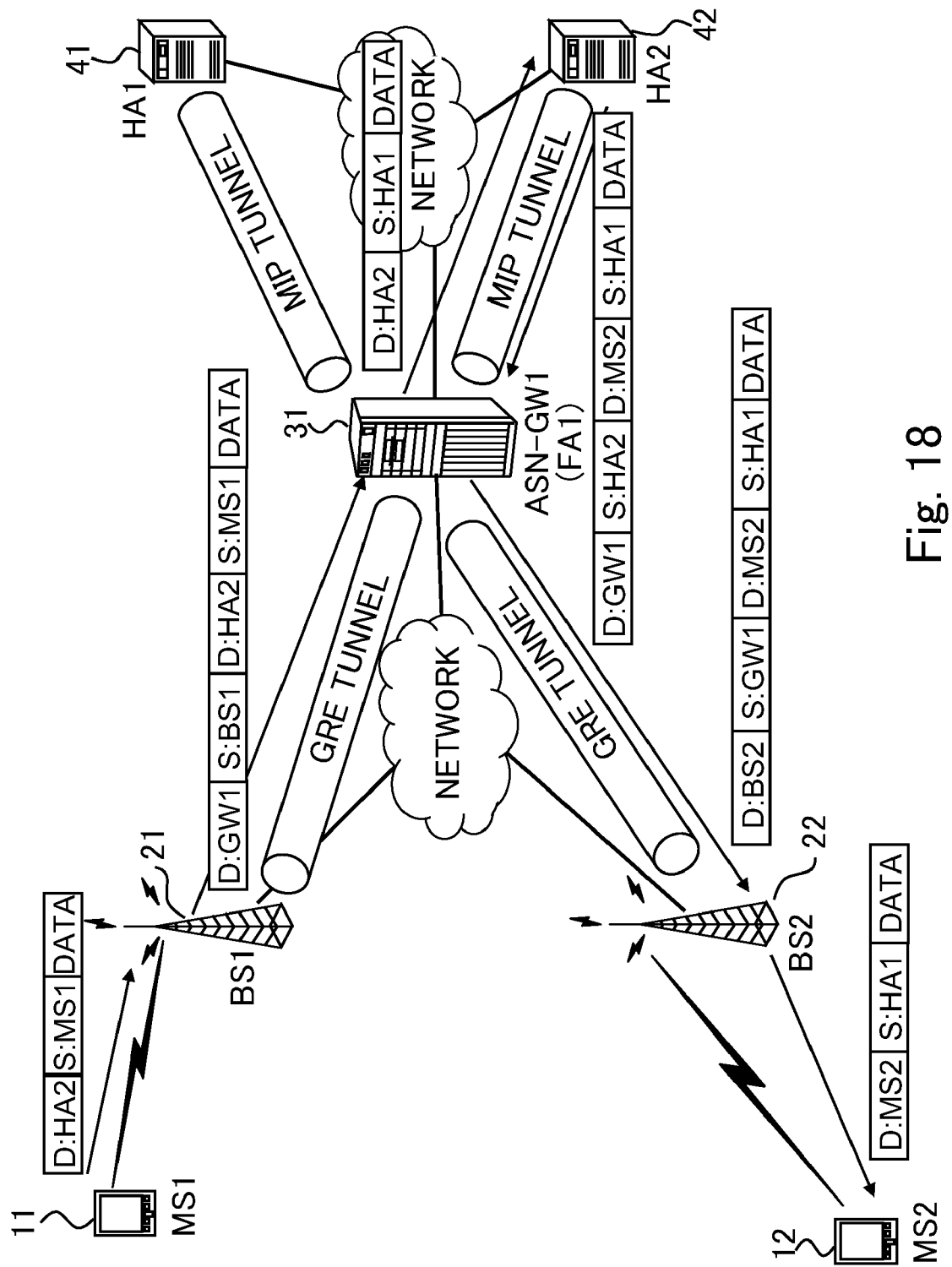
FIG. 18 is a diagram for explaining an operation of a communication system according to the second embodiment.

According to the second embodiment, as compared with the first embodiment, the packet is transferred from the mobile station 11 to the mobile station 12. As illustrated in FIG. 18, the mobile stations 11 and 12 are individually managed by the base stations 21 and 22, unlike the first embodiment. The structure other than that is similar to that according to the first embodiment, and overlapped portions are not described. The ASN-GW 31 and the base stations 21 and 22 may have the structures according to the first and second embodiments and, alternatively, may have the structure according to the first embodiment or the second embodiment.

1) In FIG. 18, the packet at the HA 42 (HA address on the mobile IP of the mobile station 12) as the destination is transferred at a wireless interval from the mobile station 11 to the base station 21.

2) The transfer from the base station 21 to the ASN-GW 31 is performed by the GRE tunnel with the encapsulation. Therefore, the destination of the packet is the address of ASN-GW 1. The internal header of the encapsulated packet is originally kept.

3) The ASN-GW 31 replaces the address on the transmission source of the packet from the address of the mobile station 11 to the address of an HA 41 in the mobile station 11 as the FA of the mobile station 11, and transfers the packet to the HA 42.

4) The HA 42 receives the transferred packet, and transfers the packet to the ASN-GW 31 as the FA of the mobile station 12 with encapsulation via an MIP tunnel. At the time, the HA 42 replaces the address of the internal header of the encapsulated packet of the HA from the address of the HA 42 to the address of the mobile station 12.

5) The ASN-GW 31 receives the replaced address and transfers the packet to the base station 22 via the GRE tunnel.

6) The base station 22 receives this, resets the encapsulation of the packet, and transfers the packet to the mobile station 12.

Figure 19:
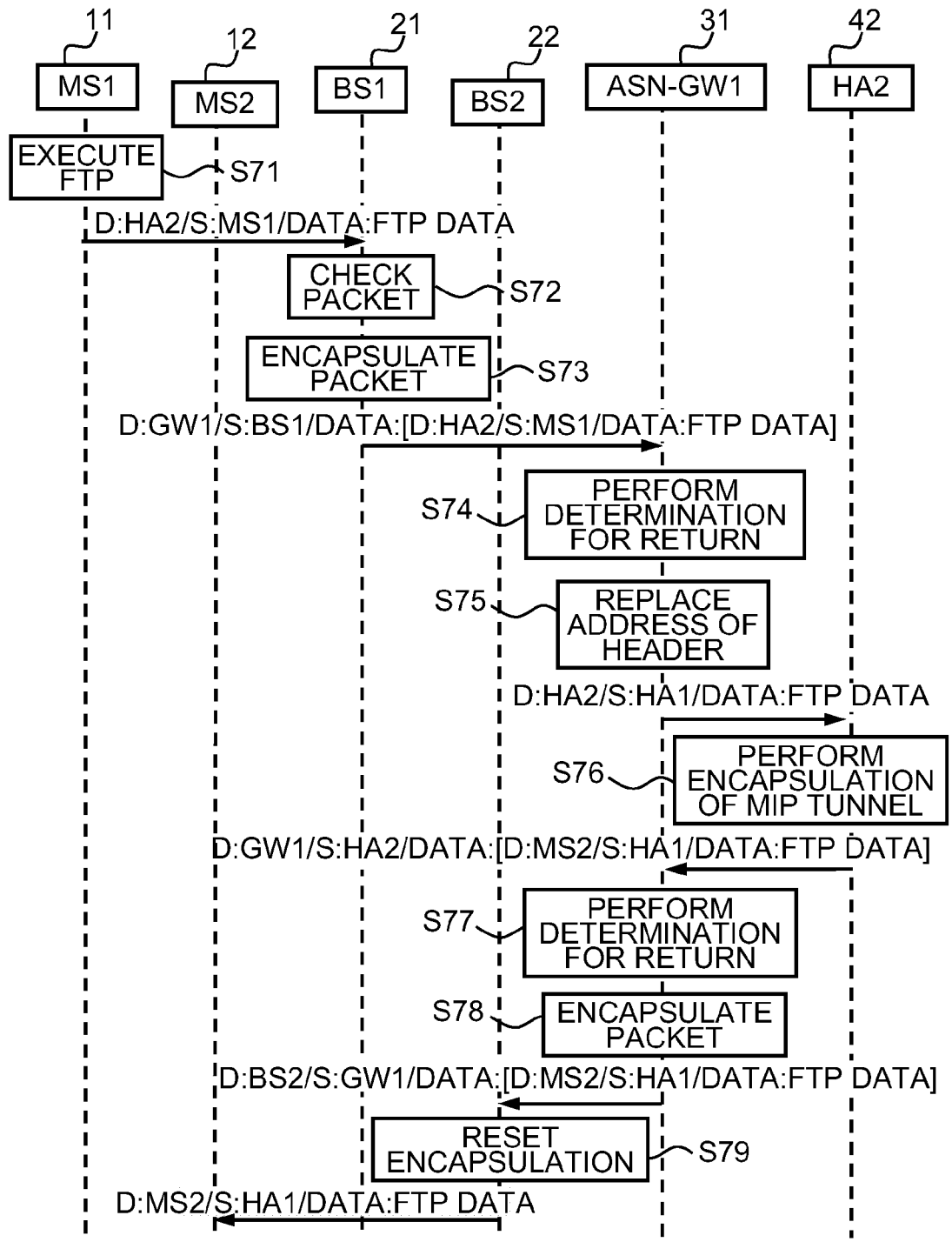
FIG. 19 is a sequence diagram for explaining the operation in FIG. 18.

FIG. 19 is a sequence diagram for explaining the operation of the communication system illustrated in FIG. 18.

In FIG. 19, in S71, the mobile station 11 executes the FTP, and transfers the packet to the base station 21. The base station 21 receives the packet and then determines whether or not the packet is registered as the target of the return of the packet (S72). When it is not determined that the packet is registered as the target of the return of the packet, the packet is encapsulated and the encapsulated packet is transferred to the ASN-GW 31 as the destination (S73).

The ASN-GW 31 receives the packet, and embodies the return adaptation determination (S74). The ASN-GW 31 replaces the address of the internal header subjected to the encapsulation from that of the mobile station 11 to that of the HA 41 as the FA (S75), and transfers the replaced address to the HA 42.

The HA 42 receives the transferred address, and encapsulates the MIP tunnel (S76), and transfers the packet to the ASN-GW 31.

The ASN-GW 31 receives the packet and similarly determines the return adaptation (S77), encapsulates the GRE tunnel (S78), and transfers the packet to the base station 22.

The base station 22 receives the packet and resets the encapsulation of the GRE tunnel (S79), and transfers the packet to the mobile station 12.

Similarly to the first embodiment, upon transmitting the packet to the HA 42 and upon receiving the packet from the HA 42, the ASN-GW 31 determines whether or not the destination of the packet or the address thereof on the transmission source is the address concerning the mobile IP, such as the HA 41 or the HA 42. When the destination of the packet or the address thereof on the transmission source is the address concerning the mobile IP, such as the HA 41 or the HA 42, the ASN-GW31 determines whether or not the packet under the condition (destination and transmission source) is registered as the target of the return of the packet by the base station under the management of the ASN-GW 31. In order to perform the determination, the ASN-GW 31 manages therein the return management table illustrated in FIG. 20.

Similarly to the first embodiment, the ASN-GW 31 analyzes the traffic situation of the packet used by itself or the protocol of the packet (FTP or streaming), thereby determining the return adaptation. In the determination of return adaptation, it is determined whether or not the packet of the communication matching the condition (destination and transmission source) is to be registered as the target of the return of the packet. When it is determined that the packet of the communication matching the condition is to be registered as the target of the return of the packet, the NAT information and routing information necessary for returning the packet is created on the basis of the return management table. Referring to FIG. 21, the return state of the return management table is updated. Further, referring to FIG. 22, the return of the packet is instructed to the base stations 21 and 22, thereby setting the return of the packet to the base stations 21 and 22.

With setting of the return of the packet, the base station 21 performs the NAT processing and routine processing of the packet from the mobile station 11 on the basis of the NAT information and routing information. As a consequence, the packet is directly transferred from the base station 21 to the base station 22 and is thereafter transferred to the mobile station 12. That is, in the case illustrated according to the second embodiment, the packet of the communication is returned in the base stations 21 and 22 of the mobile stations 11 and 12 in the communication.

Figure 22:
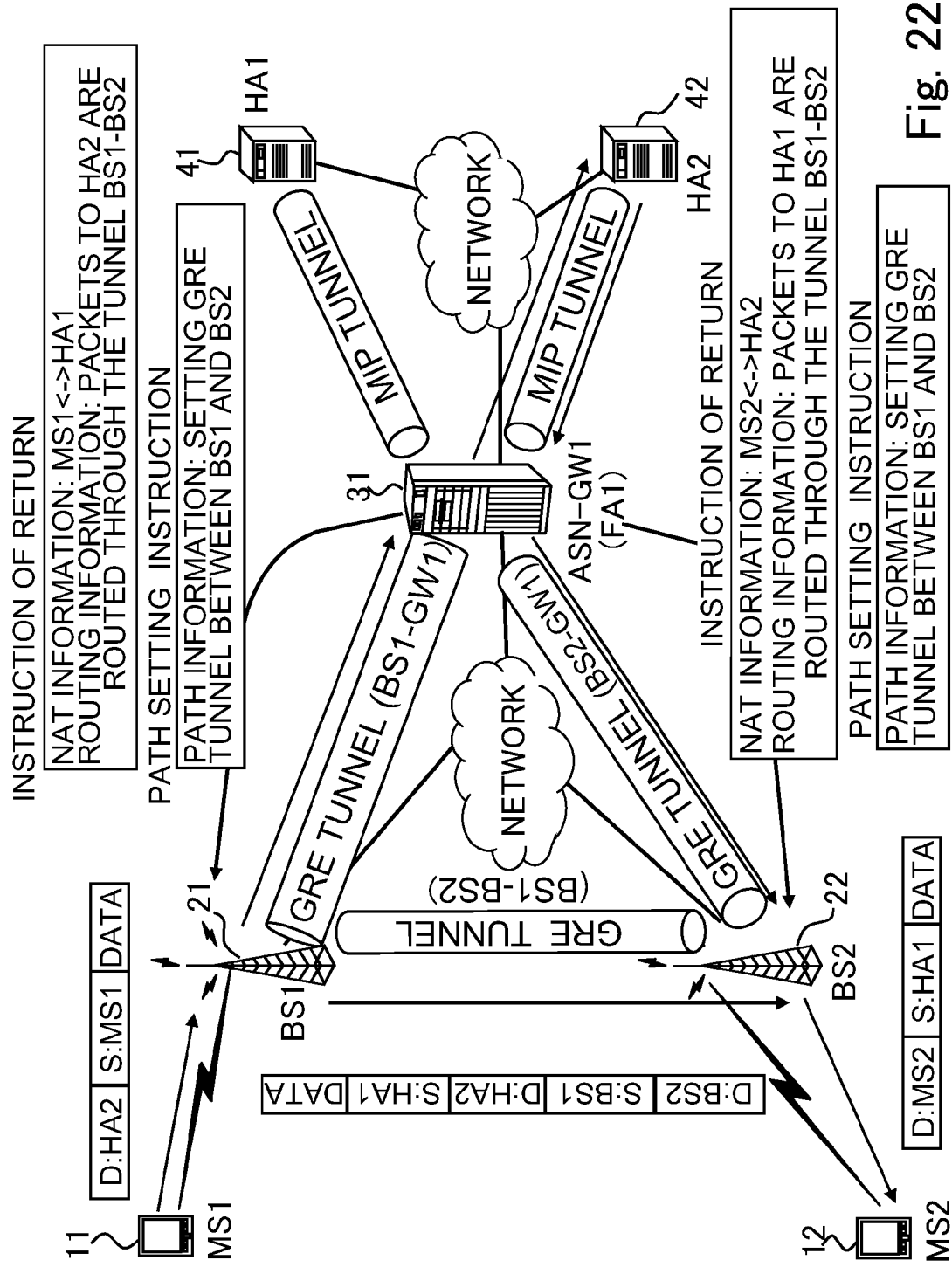
FIG. 22 is a diagram for explaining the operation of the communication system according to the second embodiment.
Figure 23:
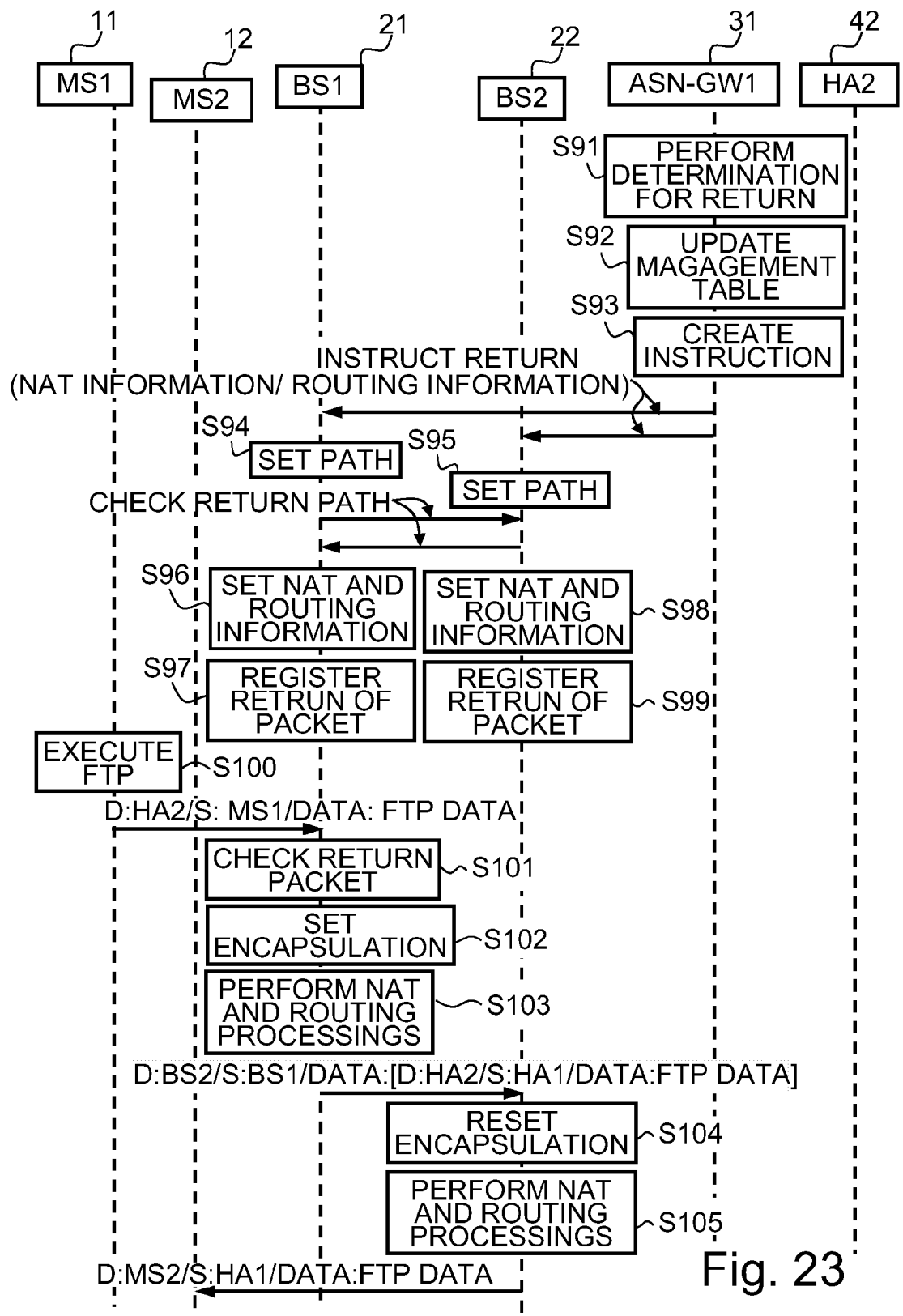
FIG. 23 is a sequence diagram for explaining the operation in FIG. 22.
Figure 24:
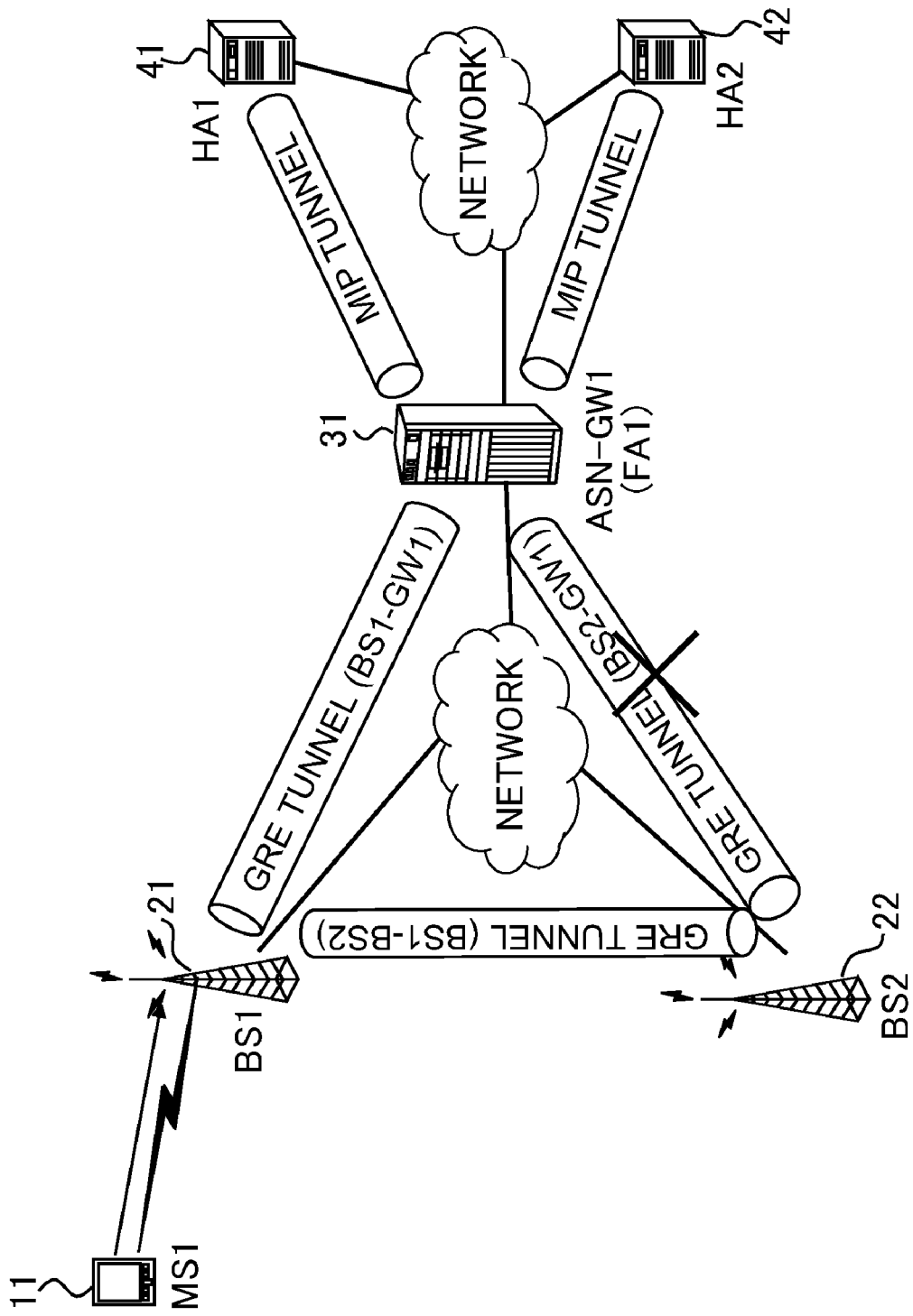
FIG. 24 is a diagram for explaining an operation in a communication system according to the third embodiment.

FIG. 23 illustrates an operation sequence of the packet return illustrated in FIG. 22.

In FIG. 23, the ASN-GW 31 determines the return adaptation. It is determined that the packet under a predetermined condition (destination and transmission source) is to be registered as a target of the return packet (S91). Then, the return management table is updated. That is, as illustrated in FIG. 21, "return to MS 2" and "return to MS 1" are written to a column of a return state of the corresponding record with respect to the packet of the communication between the mobile station 11 and the mobile station 12 (S92). Further, the ASN-GW 31 creates necessary NAT information and routing information so that the base stations 21 and 22 return the packet and transmits the created information to the base stations 21 and 22 (S93).

The base stations 21 and 22 that receive the information sets, thereto, a path for returning the packet (i.e., path for directly returning the corresponding packet between the base stations 21 and 22) (S94 and S95). Information is exchanged to mutually check the return of the packet between the base stations 21 and 22 ("Check return path" in the drawing). The base stations 21 and 22 set, thereto, the NAT information and routing information (S96 and S98). The corresponding packet (packet of the communication between the mobile stations 11 and 12) is registered as the target of the return of the packet (S97 and S99).

Thereafter, the mobile station 11 performs FTP processing, and transfers the packet addressed to the mobile station 12 to the base station 21 (S100). The base station 21 checks whether or not the packet is registered as the target of the return of the packet (S101). Further, the GRE tunnel is encapsulated (S102). It is determined in S101 that the packet matches the condition (destination and transmission source) registered in S97. Therefore, the NAT processing and routine processing for returning the packet is performed (S103). That is, the base station 21 sets the destination of the packet to the address of the base station 22, and also sets the transmission side to the address of the base station 21. Further, the address on the transmission source of the internal header of the encapsulated packet is replaced to the address of the HA 41 in the mobile station 11. As a consequence, the packet is transferred to the base station 22, and the base station 22 resets the encapsulation of the GRE tunnel (S104). Since the packet matches the condition (destination and transmission source) registered in S99, the NAT processing and routine processing is performed to returning the packet (S103). That is, the address at the destination of the packet is replaced to the address of the mobile station 12. As a consequence, the return of the packet is embodied, and the packet is returned at the base stations 21 and 22 and is then transferred to the mobile station 12.

Hereinbelow, a description will be given of a communication system according to the third embodiment with reference to FIGS. 24 to 28.

According to the third embodiment, the communication system according to the first embodiment or the second embodiment has a structure in which the return of the packet is set (S21 to S25 in FIG. 15 and S91 to S99 in FIG. 23) and the setting is thereafter reset. Other than the structure, the structure according to the third embodiment is similar to that according to the first embodiment or the second embodiment, and an overlapped description thereof will be omitted. The ASN-GW 31 may have the structure that can execute all processing according to the three first to third embodiments and alternatively may have the structure that can execute both the processing according to the third and first embodiments or both the processing according to according to the third and second embodiments.

Figure 26:
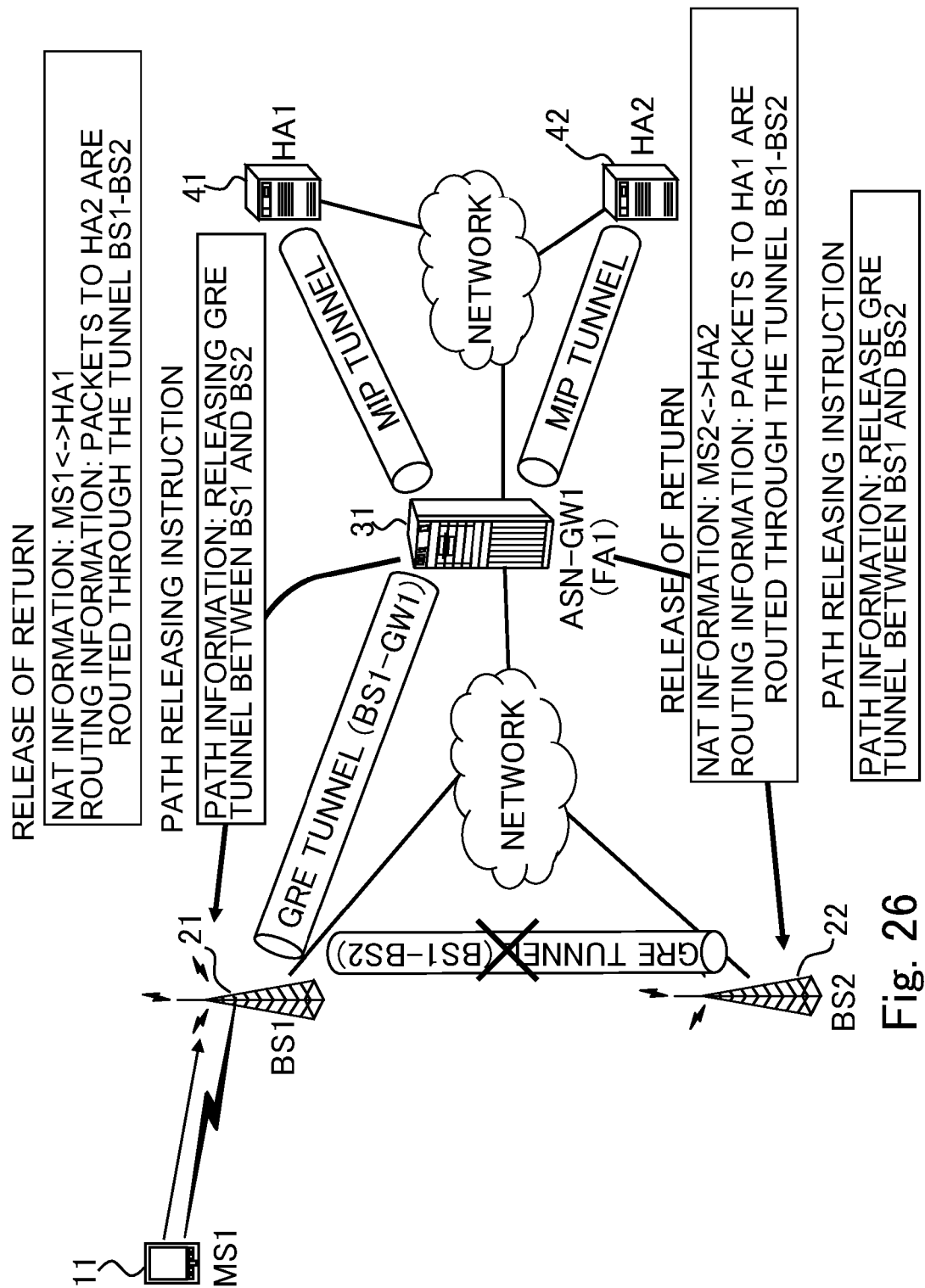
FIG. 26 is a diagram for explaining the operation of the communication system according to the third embodiment.

The setting of the return of the packet is basically reset when the existence of the mobile station at the communication destination cannot be checked. Specifically, as illustrated in FIG. 26, upon turning-off power of a PDA forming the mobile station 12, the base station 22 that manages the PDA may not check the existence of the mobile station 12. In this case, a Data path De-Registration Request of R6 as an interface between the base station 22 and the ASN-GW 31 is transmitted from the base station 22 to the ASN-GW 31. As a consequence, in the ASN-GW 31, processing for deleting the route management of the corresponding GRE tunnel is caused.

As a trigger as the occurrence of the processing, as illustrated in FIG. 25, the ASN-GW 31 deletes the corresponding record on the return management table. As a consequence, the return management table becomes a state illustrated in FIG. 27.

Figure 28:
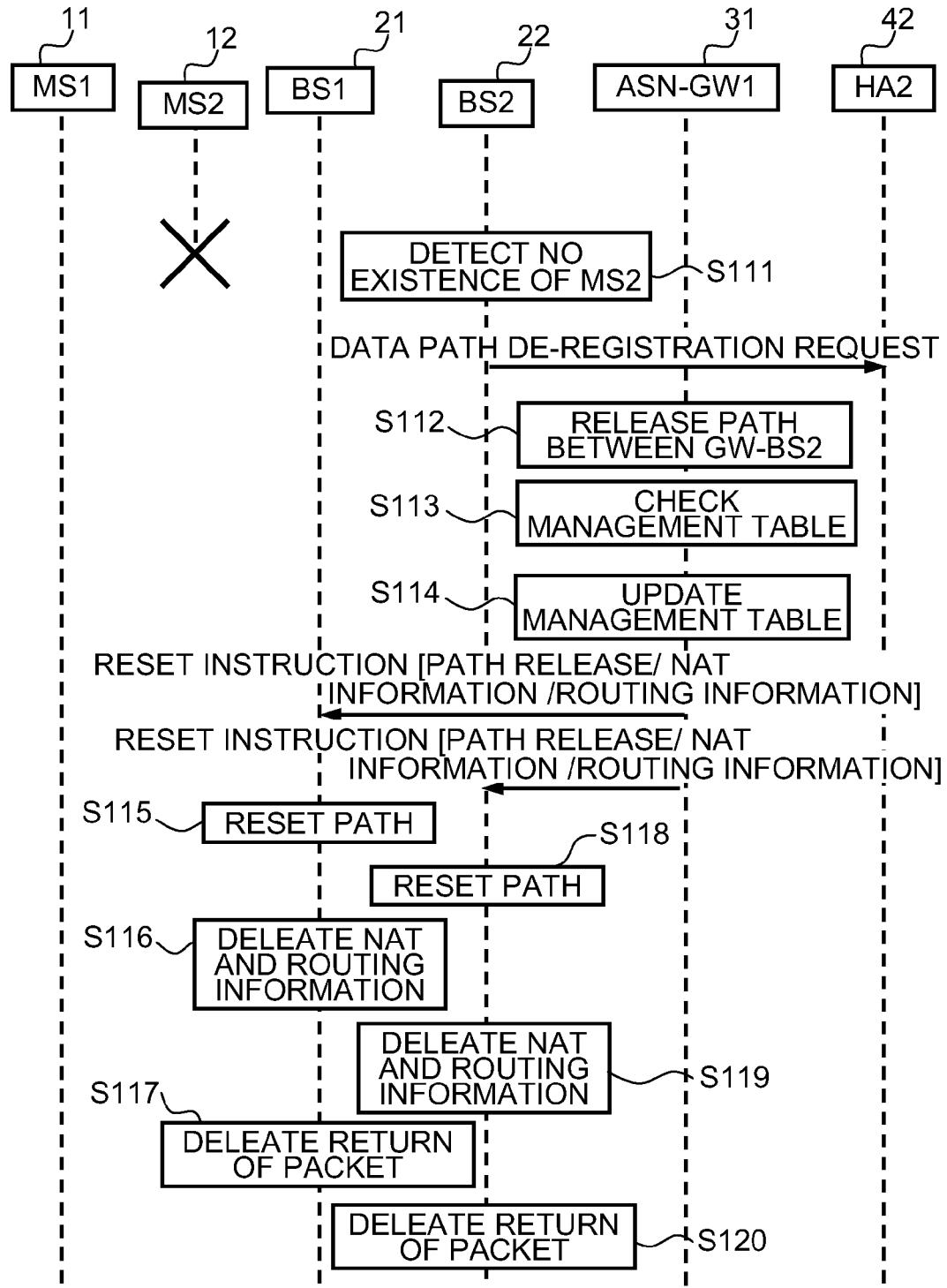
FIG. 28 is a sequence diagram for explaining the operation in FIG. 26.

FIG. 28 is a sequence diagram illustrating a flow of the operation of the communication system according to the third embodiment.

In FIG. 28, when the base station 22 for managing the mobile station 12 cannot check the existence of the mobile station 12 (S111), the base station 22 transmits the DataPath De-Registration Request to the ASN-GW 31. In response to the request, the ASN-GW 31 resets the corresponding communication path between the ASN-GW 31 and the base station 22 (S112). The return management table is checked (S113). As illustrated in FIGS. 25 and 27, the corresponding record is deleted and the return management table is updated (S114). Information for deleting the corresponding NAT information and routing information is created so that the base stations 21 and 22 reset the setting of the return of the corresponding packet, and is then transmitted to the base stations 21 and 22. The base stations 21 and 22 that receive the information reset the setting of a path (i.e., path for directly transferring the corresponding packet) for returning the packet between the base stations 21 and 22 (S115 and S118). The base stations 21 and 22 delete the corresponding NAT information and routing information (S116 and S119). The corresponding packet (packet of the communication between the mobile station 11 and the mobile station 12) is deleted from the target of the return of the packet (S117 and S120).

Hereinbelow, a description will be given of a communication system according to the fourth embodiment with reference to FIGS. 29 to 33.

According to the third embodiment, the communication system according to the first embodiment or second embodiment includes processing for setting the return of the packet (S21 to S25 in FIG. 15 and in S91 to S99 in FIG. 23) and executing the handover of one of the mobile stations. Herein, the handover means processing in which, when the mobile station is moved out of a cell managed by the base station for managing the mobile station, the base station for managing the mobile station is automatically switched to the base station for managing the cell after the movement. Except for the processing upon executing the handover, the structure according to the fourth embodiment is similar to the structure according to the first or second embodiment, and an overlapped description thereof will be omitted. The ASN-GW 31 may have the processing realized according to the three first, second, and fourth embodiments and alternatively may have the processing realized according to the fourth and second embodiments. Alternatively, in any of the cases, the ASN-GW 31 may additionally have the processing according to the third embodiment.

Figure 29:
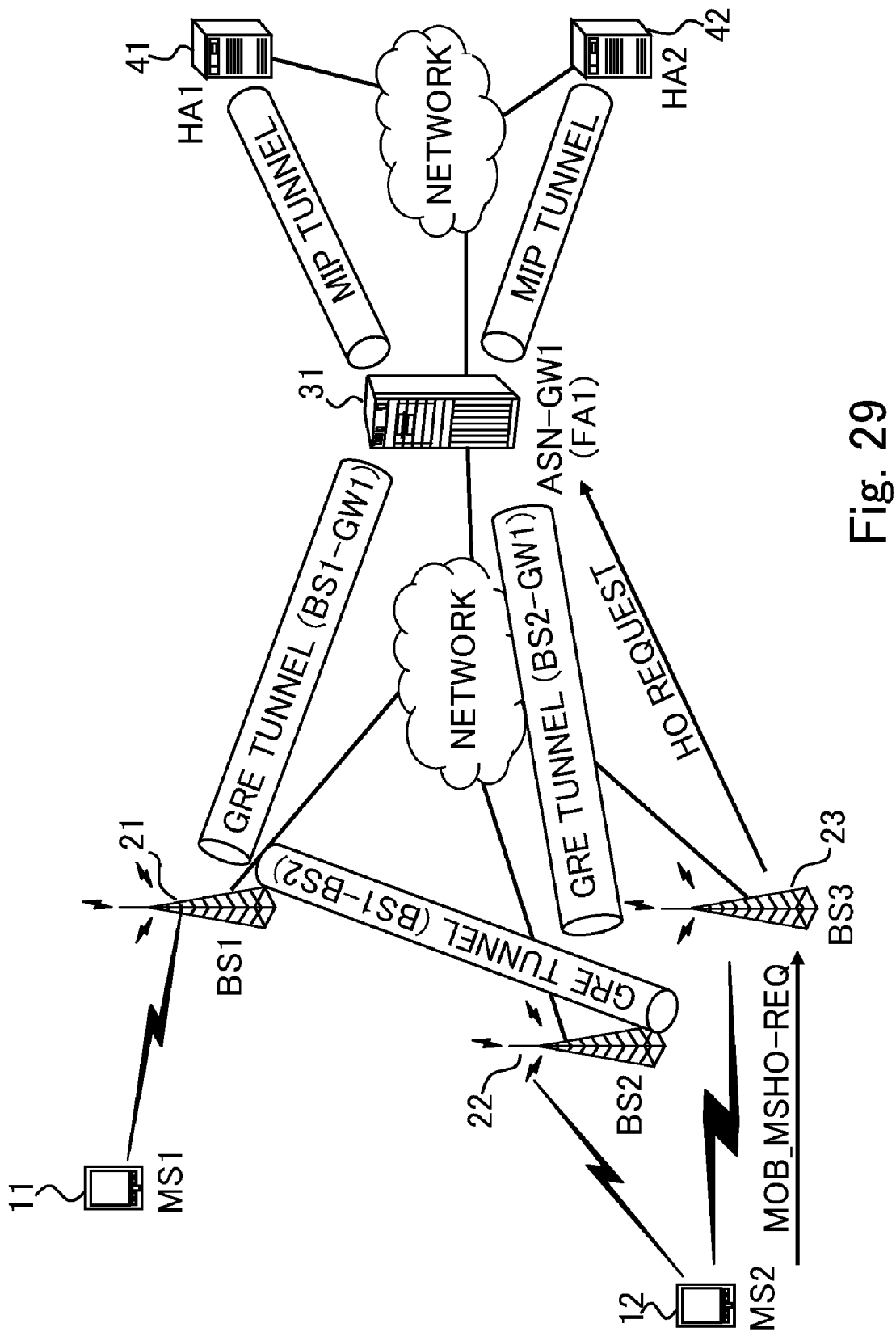
FIG. 29 is a diagram (No. 1) for explaining an operation in a communication system according to the fourth embodiment.

In an example illustrated in FIG. 29, the mobile station 11 exists under the management of the base station 21, and the mobile station 12 is switched under the management from the base station 22 to the base station 23 with the handover. In this case, the mobile station 12 transmits Mobile MS Handover Request (hereinafter, simply referred to as MOB_MSHO-REQ) to the base station 23 as the handover destination. The base station 23 that receives the MOB_MSHO-REQ transmits a Handover Request (hereinafter, simply referred to as HO request) to the ASN-GW 31. The ASN-GW 31 recognizes the mobile station 12 that transmits the HO request. It is checked by referring to the return management table illustrated in FIG. 30 to see if the return of the packet is set to the mobile station 12.

Figure 31:
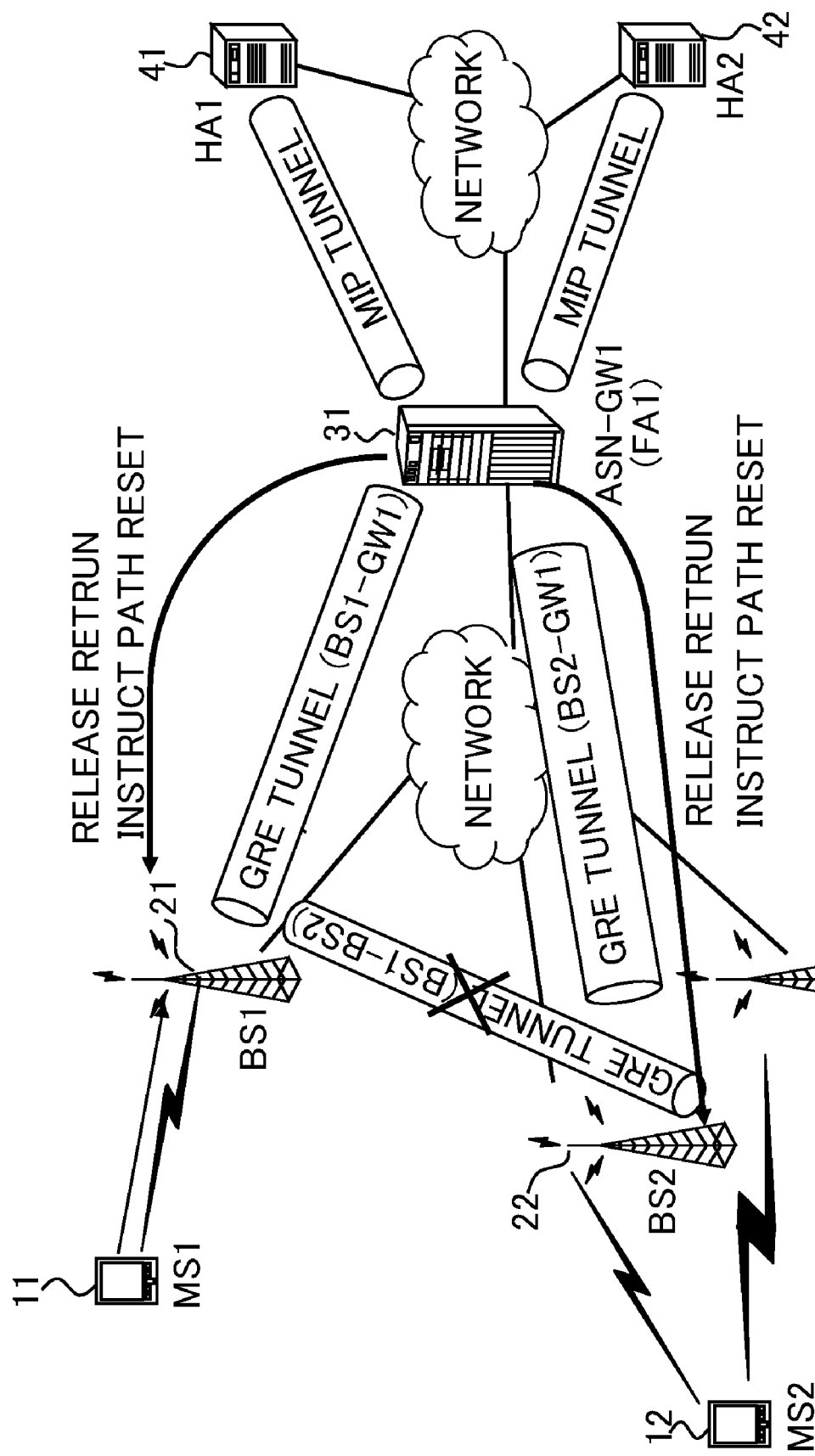
FIG. 31 is a diagram for explaining the operation of the communication system according to the fourth embodiment.

Herein, as illustrated in FIG. 30, the return of the packet is set to the mobile station 12. As illustrated in FIG. 31, the ASN-GW 31 that checks this resets the setting of the return of the corresponding packet. Then, the sequence of the handover continues. The resetting of the setting of the return of the packet enables the return management table to enter a state illustrated in FIG. 32.

Figure 33:
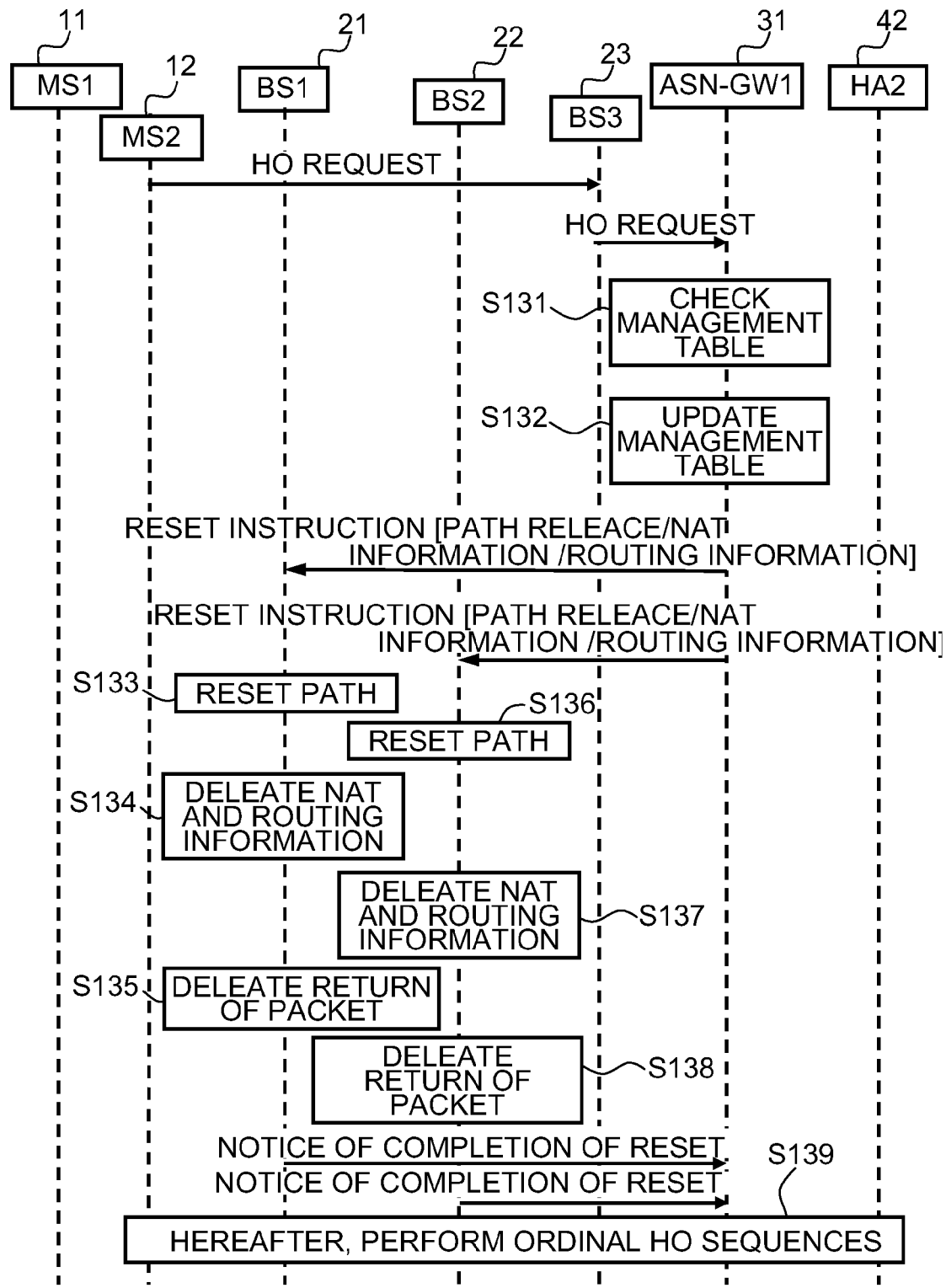
FIG. 33 is a sequence diagram for explaining the operation in FIG. 31.

FIG. 33 is a sequence diagram illustrating the resetting operation of the setting of the return of the packet illustrated in FIG. 31.

In FIG. 33, the HO request is transmitted to the base station 23 as the moving destination from the mobile station 12. Then, the base station 23 transmits the HO request to the ASN-GW 31. In response to the request, the ASN-GW 31 refers to the return management table (S131). Herein, as illustrated in FIG. 30, the return of the packet is set to the packet of the communication between the mobile station 12 and the mobile station 11. Therefore, this is updated as illustrated in FIG. 32 (S132). That is, in order to reset the setting of the return of the packet, in the return management table, "Null" is set to a column of the "return state". Information for deleting the corresponding NAT information and routing information is created so that the base stations 21 and 22 reset the setting of the return of the corresponding packet, and is then transmitted to the base stations 21 and 22. The base stations 21 and 22 that receive the information reset the setting of a path (i.e., path for directly transferring the corresponding packet between the base stations 21 and 22) for returning the packet (S133 and S136). The base stations 21 and 22 delete the corresponding NAT information and routing information (S134 and S137). The corresponding packet (packet of the communication between the mobile station 11 and the mobile station 12) is deleted from the target of the return of the packet (S135 and S138). Thereafter, the operation of the handover is executed (S139).

Upon embodying the handover as mentioned above, the setting of the return of the packet is reset, and a control operation of the handover is executed by using a packet transfer route via the HA. After ending the execution of the handover, with the structure according to the second embodiment, the return adaptation is determined again by checking the amount of transfer packets between the mobile station 11 and the mobile station 12 and the type of protocol. When it is determined that the packet of the communication between the mobile station 11 and the mobile station 12 is to be registered as the target of the return of the packet, with the structure according to the second embodiment, the return of the packet is set to the corresponding packet again.

Hereinbelow, a description will be given of the structure of devices as the communication system according to the embodiments with reference to a block diagram.

Figure 34B:
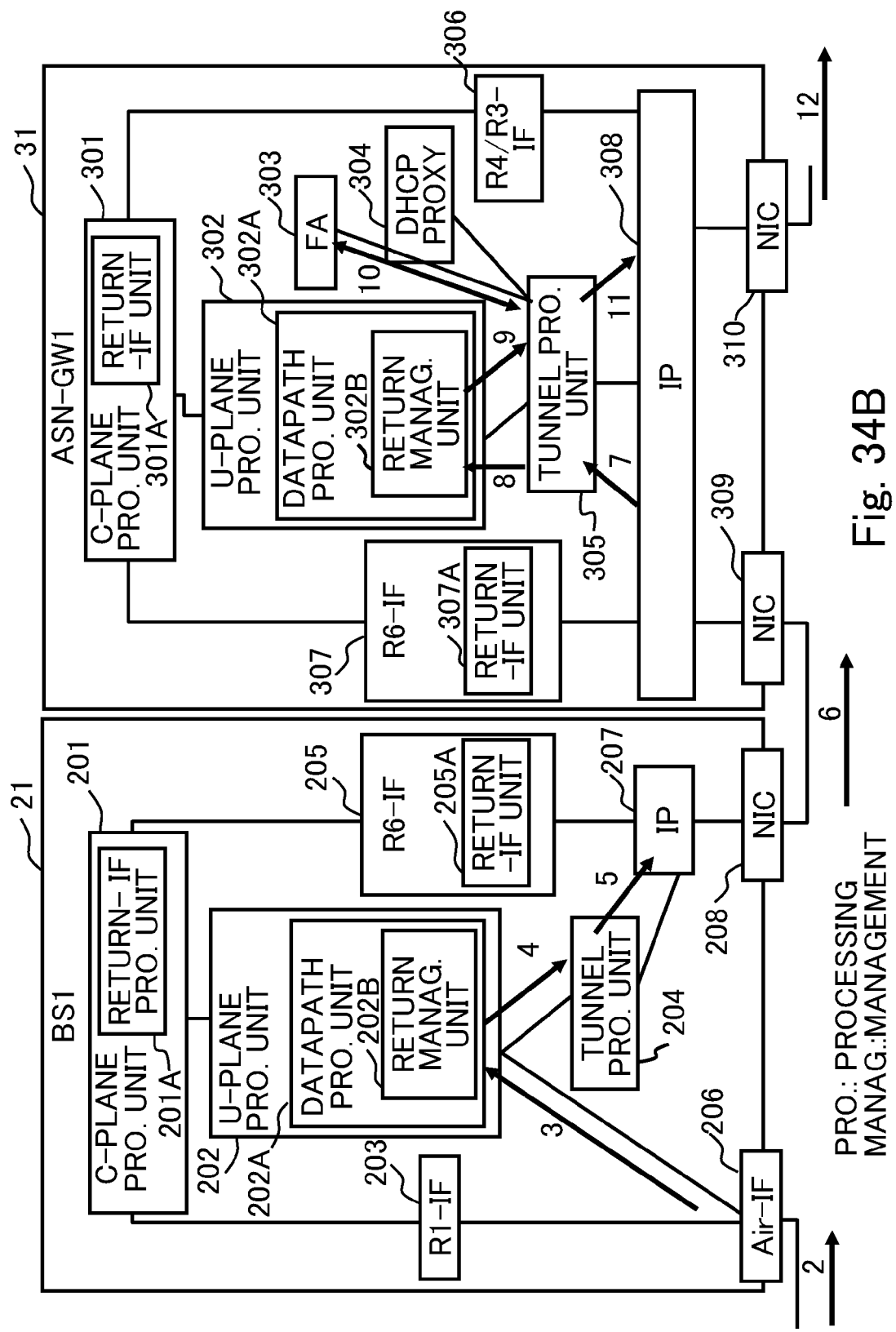

FIG. 34A is a block diagram illustrating communication apparatus 11, 21, and 31 having the structures as the mobile station 11, base station 21, and ASN-GW 31 according to the first embodiment. The base station 21 and the ASN-GW 31 are illustrated in detail in FIG. 34B. Incidentally, the communication apparatus 12 for performing the processing of the mobile station 12 has the block structure similar to that of the communication apparatus 11 for performing the processing of the mobile station 11, and an overlapped description thereof will be therefore omitted. Similarly, the communication apparatus 22 for performing the processing of the base station 22 has the block structure similar to that of the communication apparatus 21 for performing the processing of the base station 21, and an overlapped description thereof will be therefore omitted. Similarly, the communication apparatus 32 for performing the processing of the ASN-GW32 has the block structure similar to that of the communication apparatus 31 for performing the processing of the ASN-GW 31, and an overlapped description thereof will be therefore omitted.

As illustrated in FIG. 34A, the communication apparatus 11 for performing the processing of the mobile station 11 comprises: a C-Plane processing unit 102; a U-Plane processing unit 101 having an MS APL unit 101A; an R1-IF unit 103; an IP unit 104; and an Air-IF unit 105. The C-Plane processing unit 102 performs control processing. The U-Plane processing unit 101 performs processing of user data. The MS APL unit 101A performs processing of various applications (VoIP, Web browser, email, and the like). The R1-IF unit 103 performs processing of R1-interface processing (interface between the mobile station and the base station). The IP unit 104 performs IP processing (TCP/IF, UDP/IP, routing processing, and the like). The Air-IF unit 105 provides a wireless interface.

The communication apparatus 21 for performing the processing of the base station 21 comprises: a C-Plane processing unit 201; a U-Plane processing unit 202; an R1-IF unit 203; an R6-IF unit 205; a Tunnel processing unit 204; an IP unit 207; an NIC unit 208; and an Air-IF unit 206. The C-Plane processing unit 201 comprises a return IF processing unit 201A. The U-Plane processing unit 202 comprises a DataPath processing unit 202A. The DataPath processing unit 202A comprises a return management unit 202B. Alternatively, the R6-IF unit 205 comprises a return-IF unit 205A.

The C-Plane processing unit 201 performs control processing. The U-Plane processing unit 202 performs processing of the user data. The R1-IF unit 203 performs R1-interface processing (interface between the mobile station and the base station). The R6-IF unit 205 performs R6-interface processing (interface processing between the base station and the ASN-GW). The IP unit 207 performs IP processing (TCP/IF, UDP/IP, routing processing, and the like). The Air-IF unit 206 provides a wireless interface.

Further, the DataPath processing unit 202A performs route management of data transfer. The Tunnel processing unit 204 manages the GRE tunnel. The NIC unit 208 includes a function as a network interface card (hereinafter, referred to as Network Interface Card). The return-IF unit 205A analyzes a return instruction (setting/resetting/path setting/path resetting) obtained by expanding the R6-interface from the ASN-GW. The return-IF processing unit 201A transmits the received return instruction to the return management unit 202B. The return management unit 202B sets NAT/path/routing in accordance with the return instruction.

The communication apparatus 31 for performing the processing of the ASN-GW 31 comprises: a C-Plane processing unit 301; a U-Plane processing unit 302; an FA unit 303; a DHCP Proxy unit 304; an R6-IF unit 307; an R4/R3-IF unit 306; a Tunnel processing unit 305; an IP unit 308; and NIC units 309 and 310. The C-Plane processing unit 301 comprises a return-IF processing unit 301A. The U-Plane processing unit 302 comprises a DataPath processing unit 302A. The DataPath processing unit 302A comprises a return management unit 302B. The R6-IF unit 307 comprises a return-IF unit 307A.

The C-Plane processing unit 301 performs control operation. The U-Plane processing unit 302 performs processing of the user data. The R6-IF unit 307 performs processing of the R6-interface (interface processing between base station and the ASN-GW). The IP unit 308 performs IP processing (TCP/IF, UDP/IP, or routing processing). The DataPath processing unit 302A performs path management of the data transfer. The Tunnel processing unit 305 manages a GRE/MIP tunnel. The NIC units 309 and 310 are network interface cards. The FA unit 303 performs processing of the FA. The R4/R3-IF unit 306 performs processing of R4 (interface between the ASN-GW and another ASN-GW) and R3 (interface between the ASN-GW 31 and an upper-level). The return-IF unit 307A constructs and transmits a return instruction message to the base station via the R6 interface. The return-IF processing unit 301A issues an instruction to the base station, depending on the return state. The return management unit 302A checks the packet and determines the return thereof on the basis of the return management table.

Hereinbelow, a description will be given of operations of the blocks in the up-side of the communication system according to the first embodiment with reference to FIGS. 34A, 34B and 10. Incidentally, in FIGS. 34A and 34B, an arrow denotes a data flow, and a numeral illustrated by the arrow corresponds to an item number of the operation illustrated as follows (subsequently, similarly).

1) The MS APL unit 101A in the mobile station 11 transfers the data packet of the application of FTP or sound to the IP unit 104.

2) The packet to which the IP header is set by the IP unit 104 is transferred to the base station 21 via the Air-IF unit 105.

3) In the base station 21, the DataPath processing unit 202A performs the path management of the packet received from the Air-IF unit 206, and the tunneling processing corresponding to the corresponding path is determined.

4) The Tunnel processing unit 204 encapsulates the GRE tunnel.

5) The packet to which the GRE tunnel is encapsulated is transferred to the IP unit 207.

6) The IP unit 207 transfers the packet to the ASN-GW 31.

7) The ASN-GW 31 receives the packet transferred via the GRE tunnel.

8) The Tunnel processing unit 305 resets the encapsulation of the GRE tunnel, and transfers the packet information to the DataPath processing unit 302A.

9) The DataPath processing unit 302A performs the path management of the received packet, and transfers the packet to the Tunnel processing unit 305. Incidentally, the packet check and determination upon determining the return are performed by a return management unit 302b in the DataPath processing unit 302A.

10) The packet is transferred from the Tunnel processing unit 305 to the FA unit 303, the FA unit 303 executes the processing of the FA, and a local IP of the mobile station 11 is overwritten to the HA 1 as the HA address. The packet is transferred to the Tunnel processing unit 305.

11) The Tunnel processing unit 305 transfers the packet to the IP unit 308.

12) The packet is further transferred from the NIC unit 310 to the HA 42.

Figure 35A:
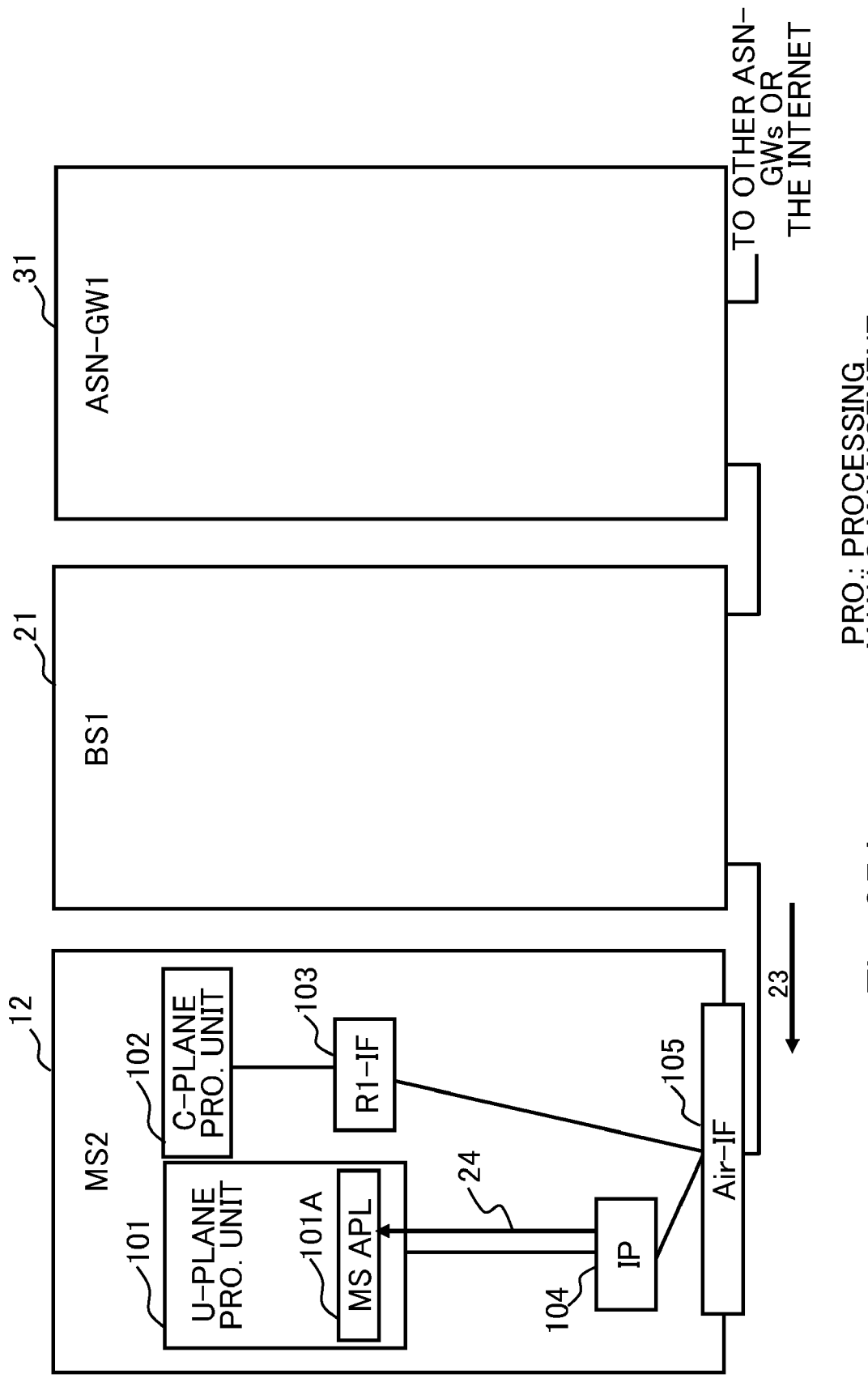
FIGS. 35A and 35B are diagrams for explaining the internal structure of the devices in the communication system according to the first embodiment.
Figure 35B:
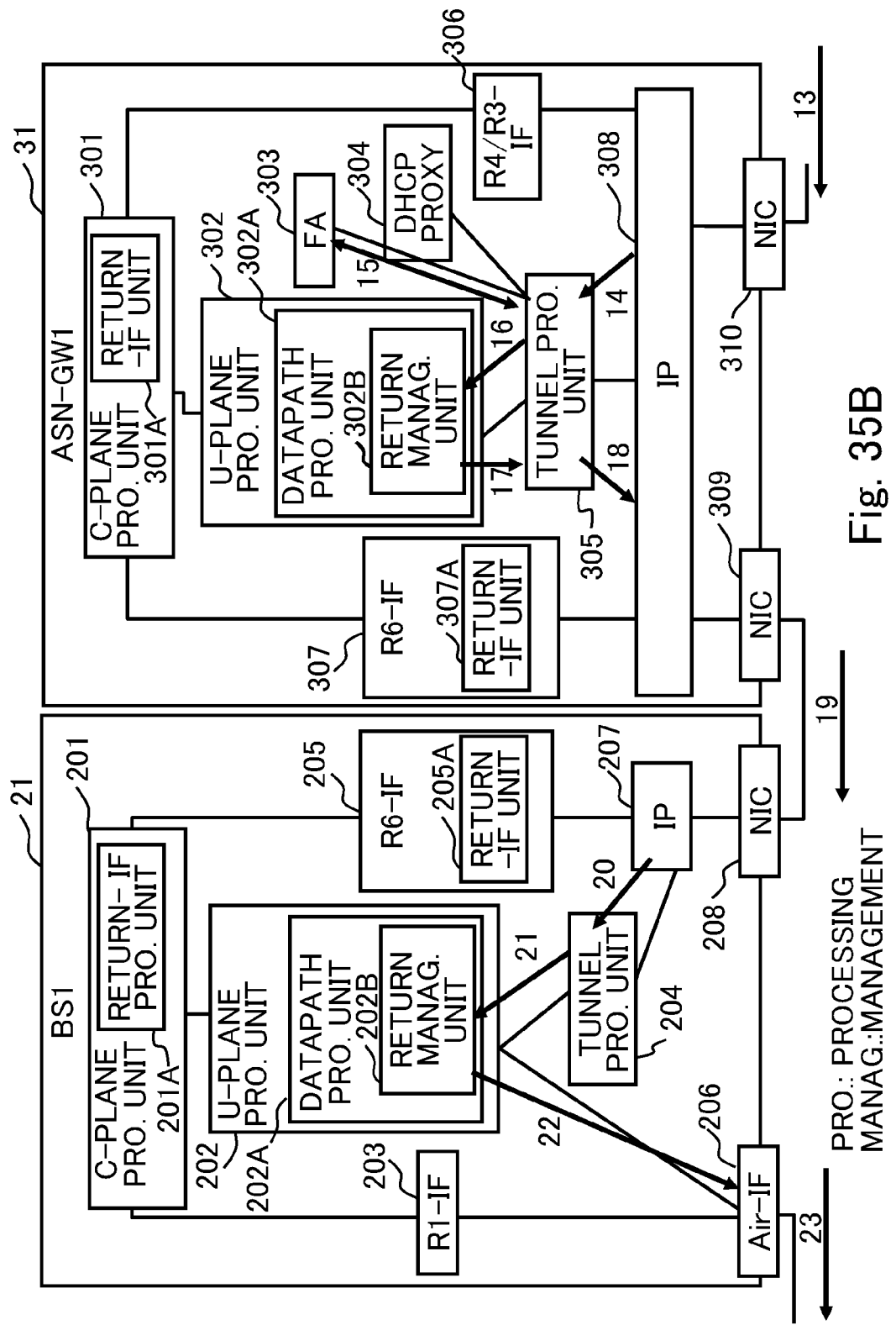

Next, a description will be given of operations of the blocks in the down-side of the structure according to the first embodiment with reference to FIGS. 35A and 35B, where the mobile station 12 is illustrated in FIG. 35A, and the base station 21 and the ASN-GW 31 are illustrated FIG. 35B in detail.

13) The HA 42 as the HA of the mobile station 12 transfers the packet to the NIC unit 310 in the ASN-GW 31 via the MIP tunnel.

14) The packet is transferred to the Tunnel processing unit 305.

15) The Tunnel processing unit 305 resets the MIP tunnel, and the FA 303 changes the IP address of the HA 42 as the FA to the IP address of the mobile station 12 (the IP address can be changed from the HA 42 to the mobile station 12 by the HA).

16) The packet to which the encapsulation is reset is transmitted to the DataPath processing unit 302A.

17) The packet subjected to the path management as a data path to the mobile station 12 is transferred to the Tunnel processing unit 305.

18) The Tunnel processing unit 305 encapsulates the GRE tunnel, and sets the address of the base station 21. Then, the Tunnel processing unit 305 transfers the packet to the IP unit 308.

19) The packet to which the GRE tunnel is encapsulated is transferred to the base station 21.

20) The base station 21 transfers the packet to which the GRE tunnel is encapsulated from the IP unit 207 to the Tunnel processing unit 204.

21) The Tunnel processing unit 204 resets the encapsulation of the GRE tunnel and transfers the packet to the DataPath processing unit 202A.

22) The packet to which the wireless interval is assigned as the data path by the DataPath unit 202A is transferred to the Air-IF unit 206.

23) The packet is transferred from the Air-IF unit 206 at the wireless interval.

24) In the mobile station 12 that receives the packet, the packet transferred at the wireless interval is transferred, as an IP packet, from the IP unit 104 to the MS APL unit 101A for performing application processing of the mobile station 12.

Figure 36A:
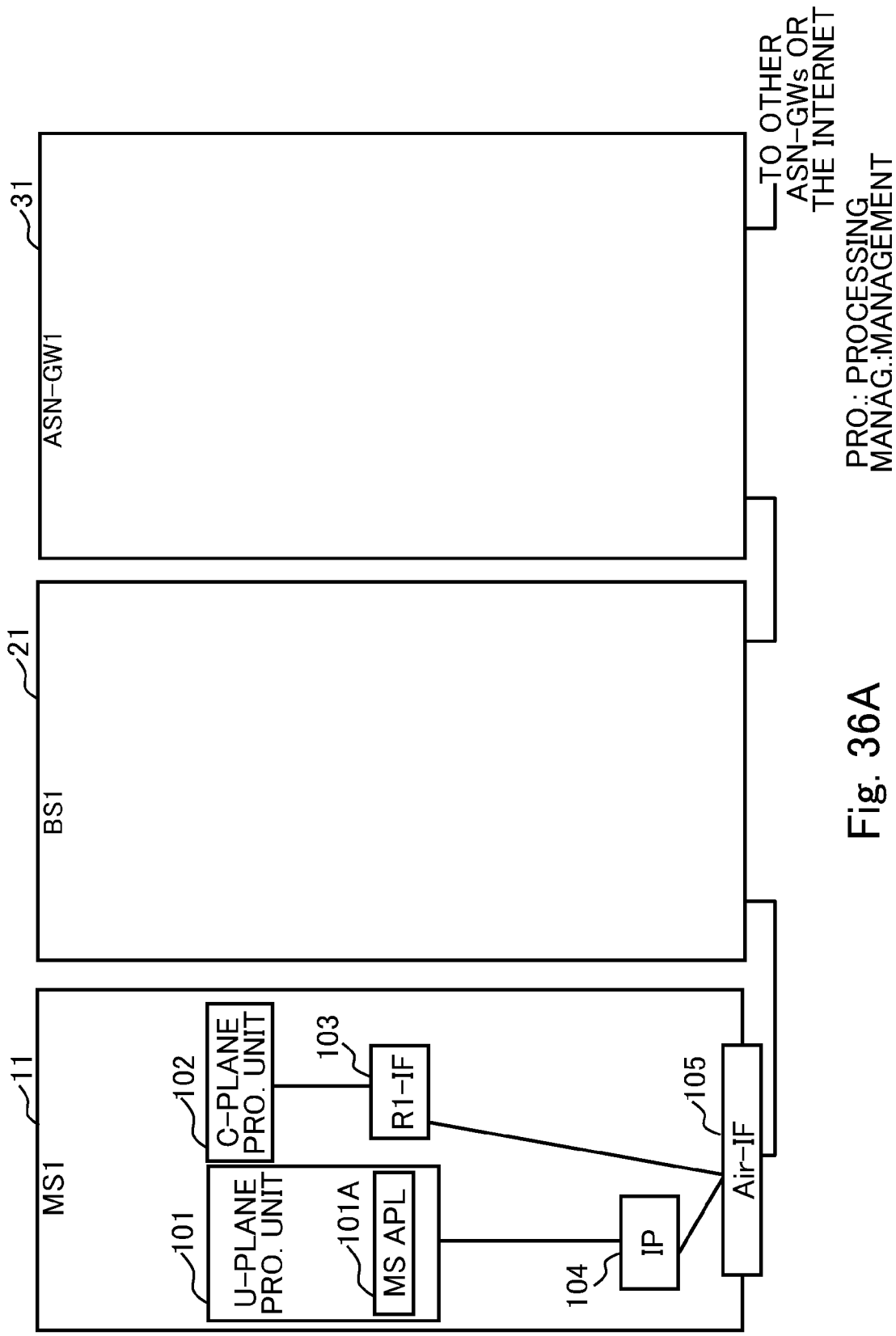
FIGS. 36A and 36B are diagrams for explaining the internal structure of the devices in the communication system according to the first embodiment.
Figure 36B:
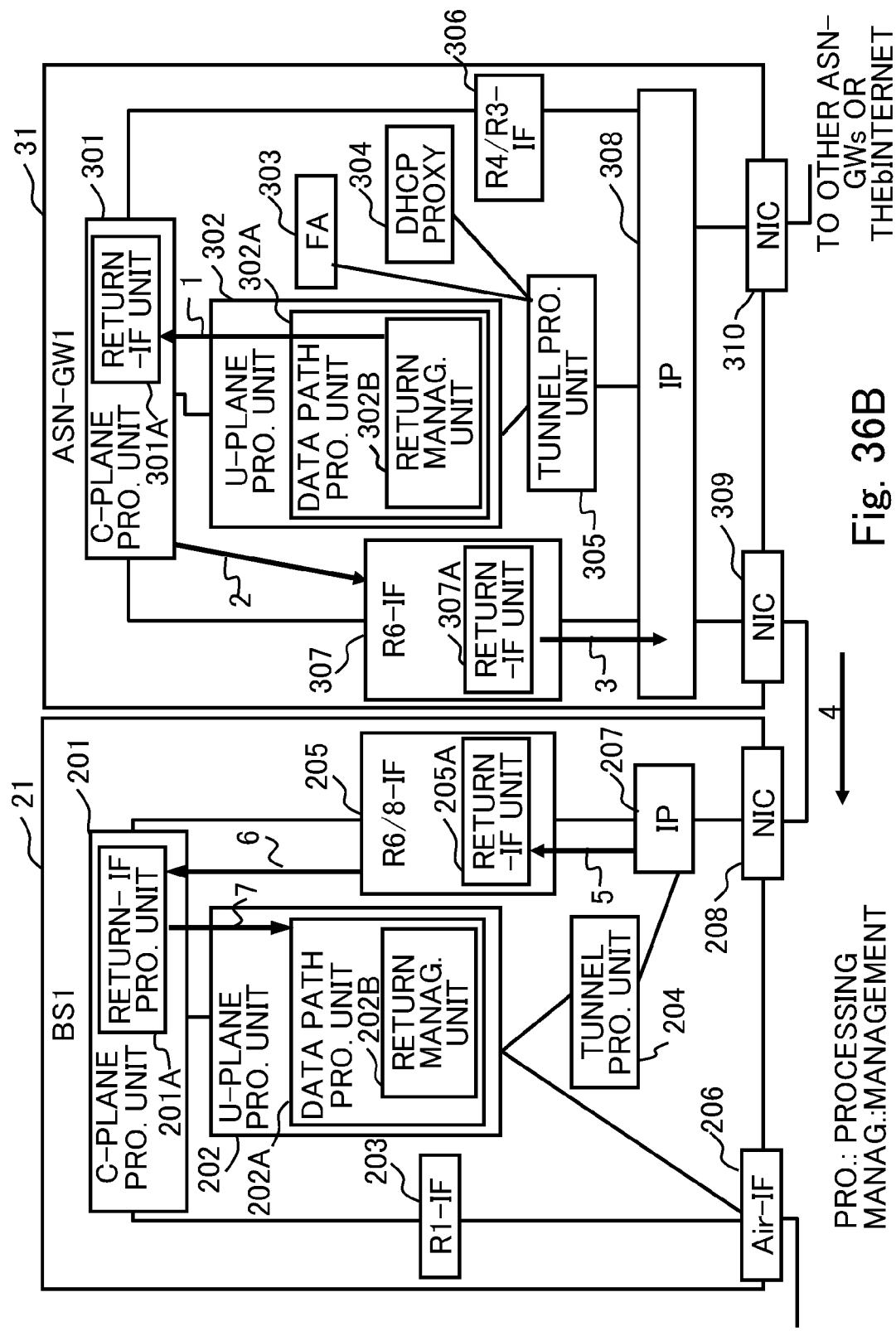

Next, a description will be given of operations of the blocks upon setting the return of the packet in the communication system according to the first embodiment with reference to FIGS. 36A, 36B and 14, where the mobile station 11 is illustrated in FIG. 36A in detail, and the base station and the ASN-GW 31 are illustrated in detail in FIG. 36B.

1) The return management unit 302B of the DataPath processing unit 302A in the ASN-GW 31 determines whether or not the packet of the communication between the mobile stations 11 and 12 is to be registered as the return target. When it is determined that the packet is to be registered as the return target, the return information (i.e., the NAT information, routing information, and path information) is extracted and a return instruction is issued to the return-IF processing unit 301A in the C-Plane processing unit 301.

2) The return-IF processing unit 301A constructs a return instruction message, and transfers the message to the R6-IF processing unit 307 as a control IF between the base station and the ASN-GW.

3) The R6-IF processing unit 307 constructs a message as a message via the R6, sets the base station 21 as the destination to the message, and transfers the message to the IP unit 308.

4) The IP unit 308 sets the message as the message via the R6 to the base station 21.

5) In the base station 21, the IP unit 207 receives the message, extracts the message via the R6, and transfers the message to the R6-IF processing unit 205.

6) The R6-IF processing unit 205 extracts the return instruction message, and transfers the return instruction message to the return IF processing unit 201A in the C-Plane processing unit 201.

7) The return IF processing unit 201A extracts the return information from the return instruction message, and issues a return instruction to the return management unit 202B in the DataPath processing unit 202A. In response thereto, the return management unit 202B sets NAT necessary for executing the return of the packet, and embodies the setting of routing.

Figure 37A:
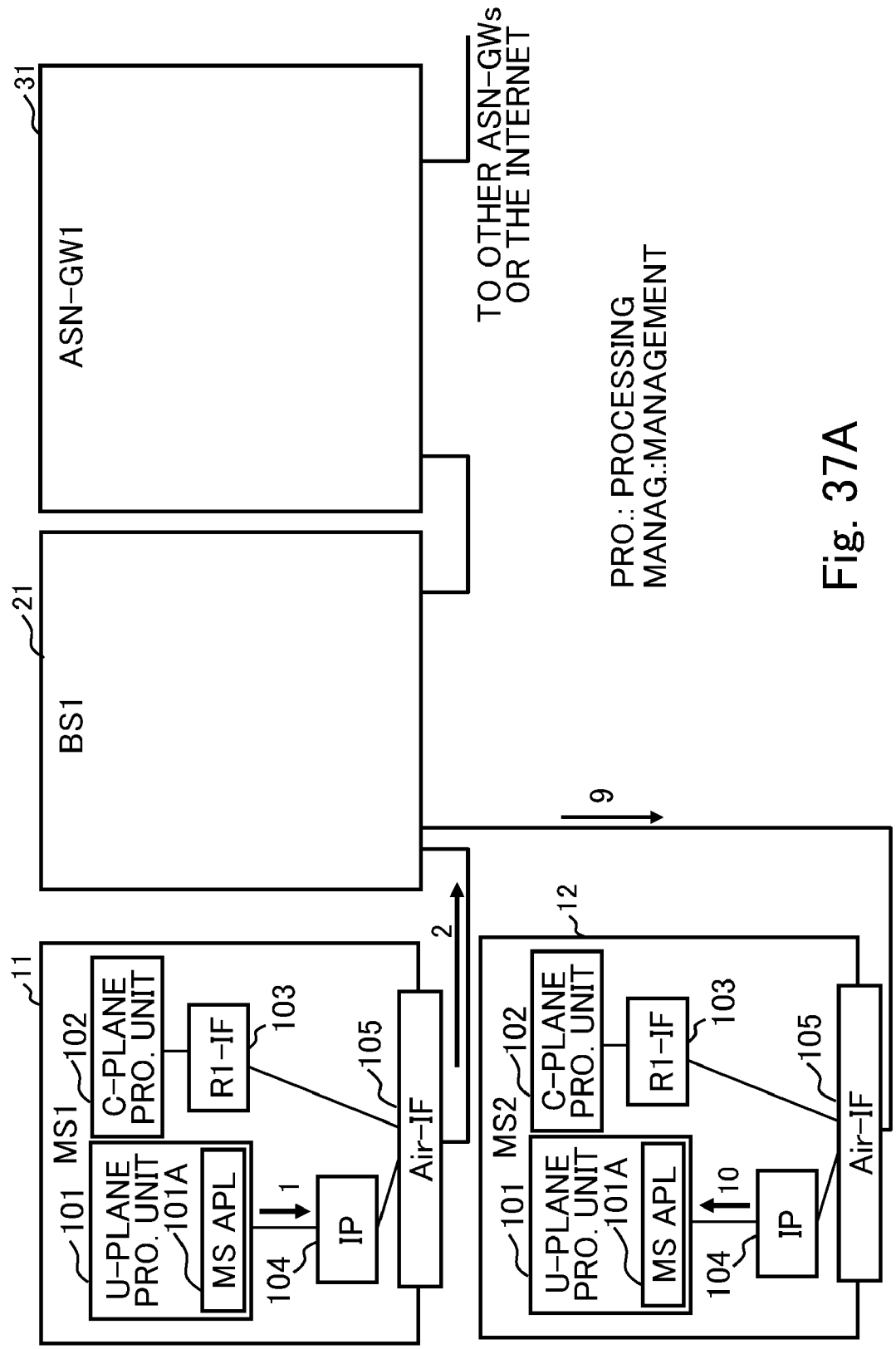
FIGS. 37A and 37B are diagrams for explaining the internal structure of the devices in the communication system according to the first embodiment.
Figure 37B:
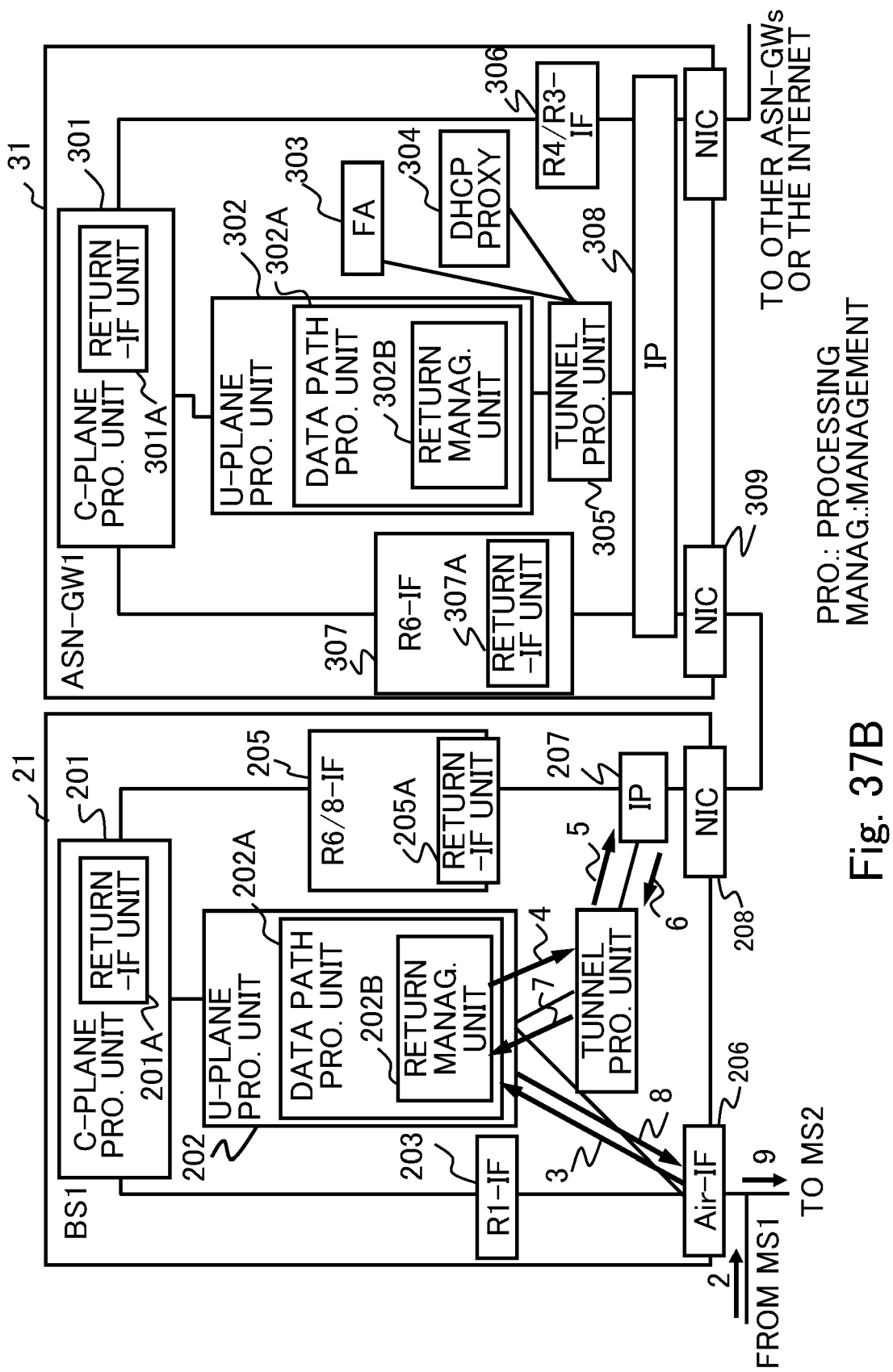

Next, a description will be given of operations of the blocks in the operations of the return of the packet embodied after setting the return of the packet in the communication system according to the first embodiment with reference to FIGS. 37A, 37B and 14, where the mobile stations 11 and 12 are illustrated in detail in FIG. 37A and the base station 21 and the ASN-GW 31 are illustrated in detail in FIG. 37B.

1) Data of application such as FTP or sound is created by the MS APL unit 101A in the mobile station 11, and is transferred as a packet of the data to the IP unit 104.

2) The IP unit 104 sets an IP header to the packet, and transfers the packet to the base station 21 via the Air-IF unit 105.

3) In the base station 21, the Air-IF unit 206 receives the packet, and the DataPath processing unit 202B executes the path management of the packet.

4) The return management unit 202B determines the packet that is registered as a target of the return of the packet on the basis of the IP address of the destination of the packet, and performs processing for returning the packet. Specifically, in NAT processing, the destination address is replaced from the HA 42 to the mobile station 12, the address on the transmission source is replaced from the mobile station 11 to the HA 31, and the packet is transferred to the Tunnel processing unit 204.

5) The Tunnel processing unit 204 does not perform the encapsulation, but transfers the packet to the IP unit 207.

6) The IP unit 207 performs the routing processing of the packet in accordance with the destination header portion, and transfers the packet to the Tunnel processing unit 204. That is, the packet is returned.

7) The packet is not encapsulated but is transferred to the DataPath processing unit 202A.

8) The DataPath processing unit 202A assigns a path to the mobile station 12 as a path of the packet, and transfers the packet to the Air-IF unit 206.

9) The Air-IF unit 206 transfers the packet to the mobile station 12 at the wireless interval.

10) The mobile station 12 receives the packet, and the IP unit 104 transfers the packet as the IP packet to the MS APL unit 101A.

Figure 38A:
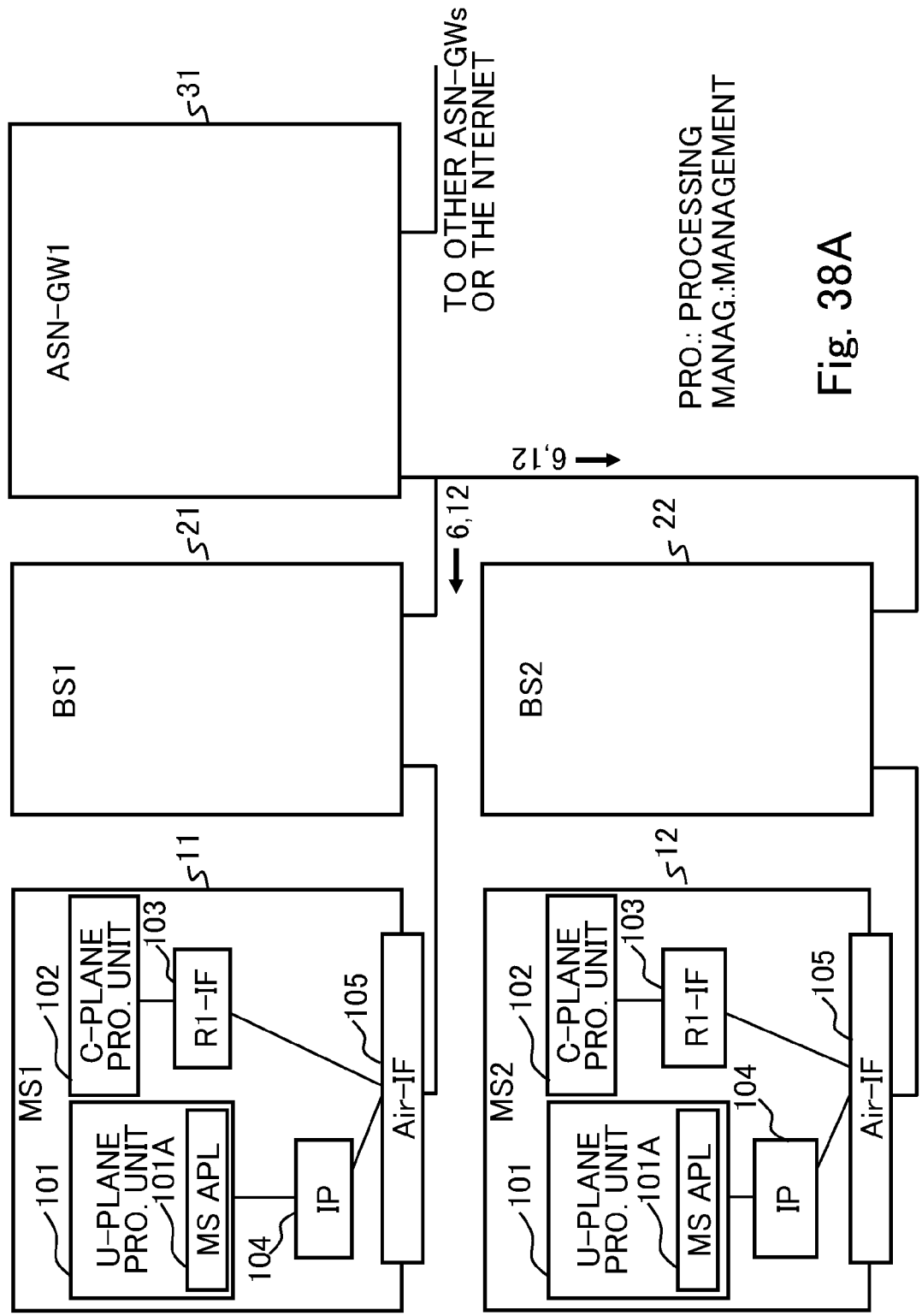
FIGS. 38A, 38B, and 38C are diagrams for explaining the internal structure of devices in the communication system according to the second embodiment.
Figure 38B:
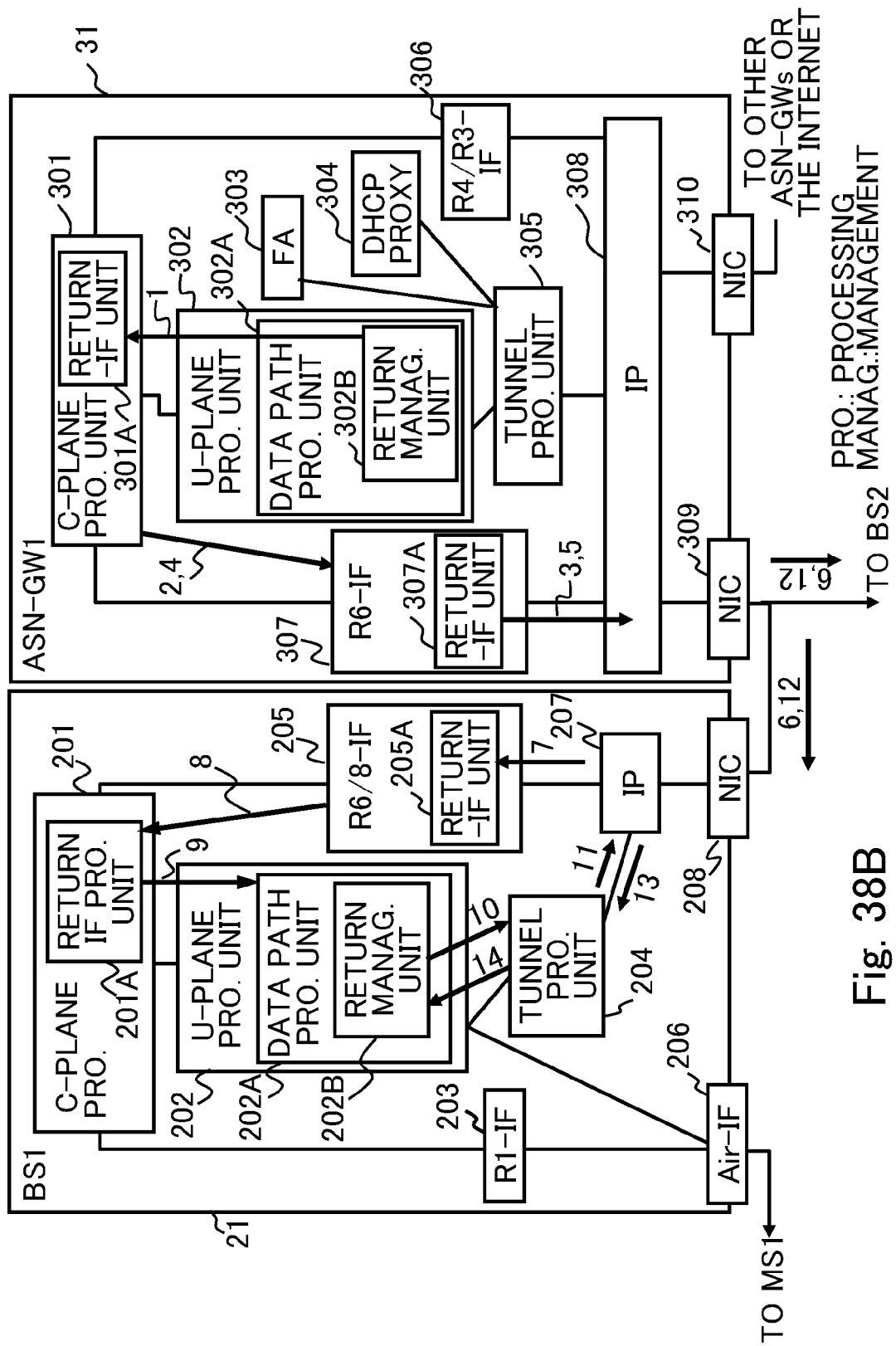
Figure 38C:
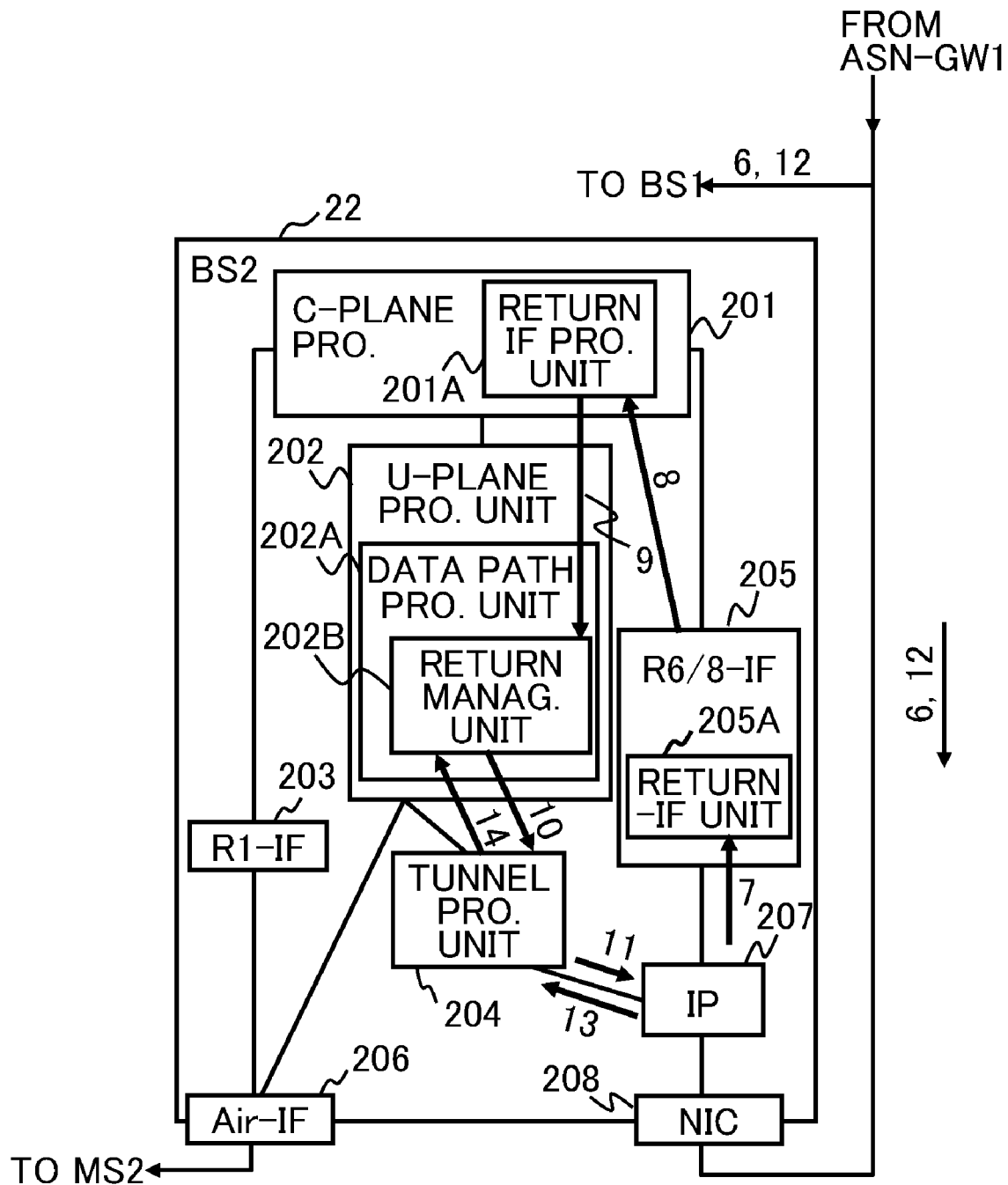

Next, a description will be given of operations of the blocks in the operation for setting the return of the packet in the communication system according to the second embodiment with reference to FIGS. 38A, 38B, 38C and 22, where the mobile stations 11 and 12 are illustrated in detail in FIG. 38A, the base station 21 and the ASN-GW 31 in FIG. 38B, and the base station 21 in FIG. 38C.

1) The return management unit 302B of the DataPath processing unit 302A in the ASN-GW 31 determines that the packet of the communication between the mobile stations 11 and 12 is to be registered as the target of the return of the packet. After the determination, the DataPath processing unit 302A extracts information necessary for embodying the return of the packet, i.e., the NAT information, routing information, and path information, and issues an instruction for returning the packet to the return-IF processing unit 301A in the C-Plane processing unit 301.

2) The return-IF processing unit 301A constructs the return instruction message for returning the packet for the base station 21 as the destination, and transfers the packet to the R6-IF processing unit 307 as the control IF between the base station and the ASN-GW.

3) The R6-IF processing unit 307 constructs a message via the R6 as the R6-IF processing for the base station 21, sets the address of the message to the base station 21, and transfers the message to the IP unit 308.

4) The return-IF processing unit 301A constructs a return instruction message as IF processing for returning the packet to the base station 22, and transfers the message to the R6-IF processing unit 307 as the control IF (the control interface) between the base station and the ASN-GW.

5) On the other hand, the R6-IF processing unit 307 constructs the message via the R6 as the R6-IF processing for the base station 22, sets the address of the message to the base station 22, and transfers the message to the IP unit 308.

6) The return instruction message is transferred as the message via the R6 from the IP unit 308 to the base stations 21 and 22.

7) The base stations 21 and 22 receive the message, and the IP unit 207 extracts the message via the R6 and transfers the message to the R6-IF processing unit 205.

8) The R6-IF processing 205 extracts the return instruction message, and transfers the message to the return IF processing unit 201A in the C-Plane processing unit 201A.

9) The return IF processing unit 201A extracts the return information from the transferred message, issues an instruction for returning the packet to the return processing unit 202B in the DataPath processing unit 202A, and performs path setting.

10) Further, the return processing unit 201A constructs a packet for checking the return path, and transfers the packet to the Tunnel processing unit 204.

11) The Tunnel processing unit 204 encapsulates the GRE tunnel for the packet for checking the return path, and transfers the packet to the IP unit 207.

12) The IP unit 207 transfers the packet to which the GRE tunnel is encapsulated to another base station. That is, the base station 21 transfers the packet for checking the return path to the base station 22, the base station 22 transfers the packet for checking the return path to the base station 21.

13) The base stations 21 and 22 receive the packet. The packet is transferred from the IP unit 207 to the Tunnel processing unit 204 in the base stations.

14) The Tunnel processing unit 204 resets the encapsulation of the GRE tunnel, and transfers the packet after the resetting to the return management unit 202B. The return management unit 202B sets return information (i.e., NAT information and the routing information).

Figure 39A:
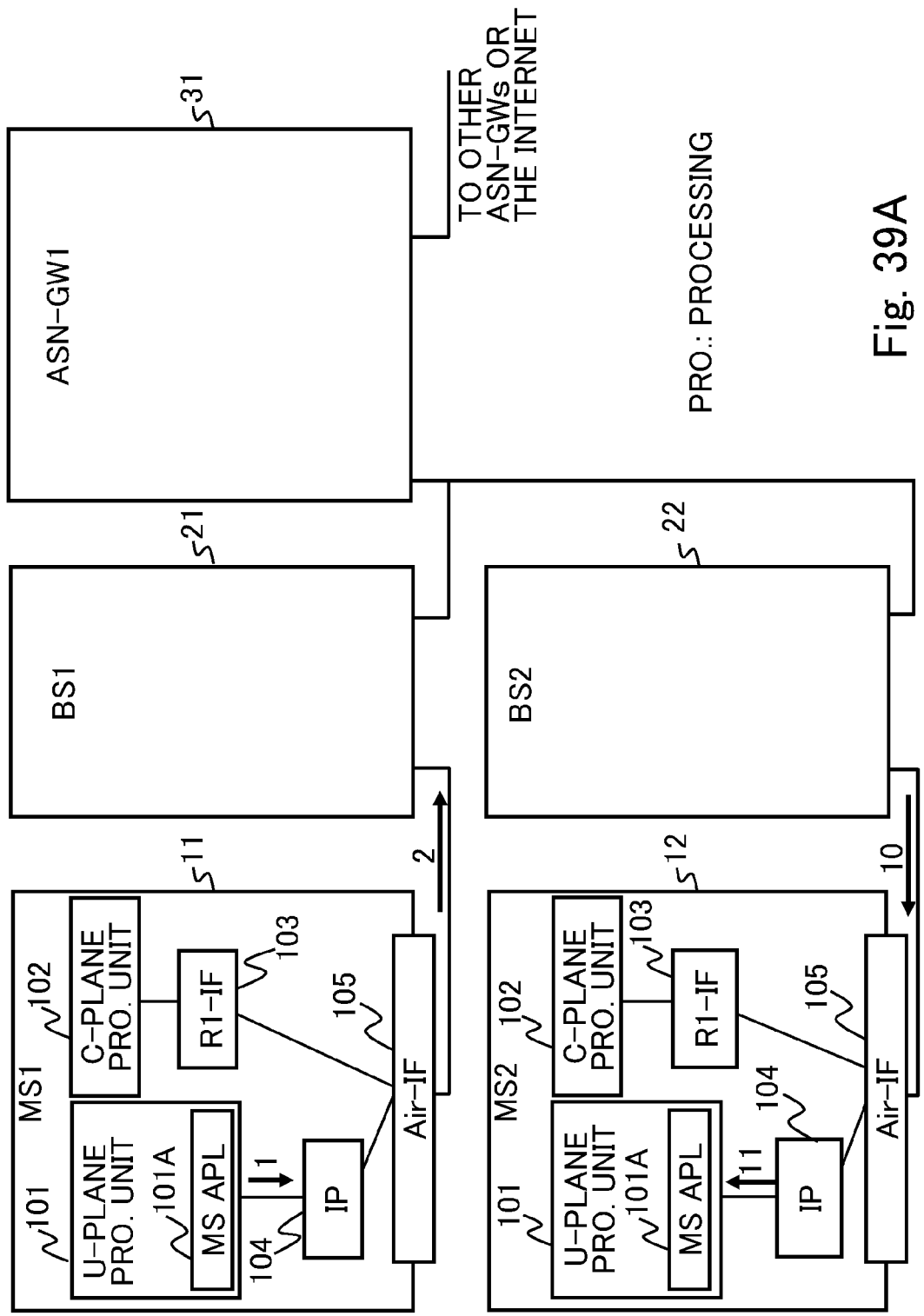
FIGS. 39A, 39B, and 39C diagram for explaining the internal structure of devices in the communication system according to the second embodiment.
Figure 39B:
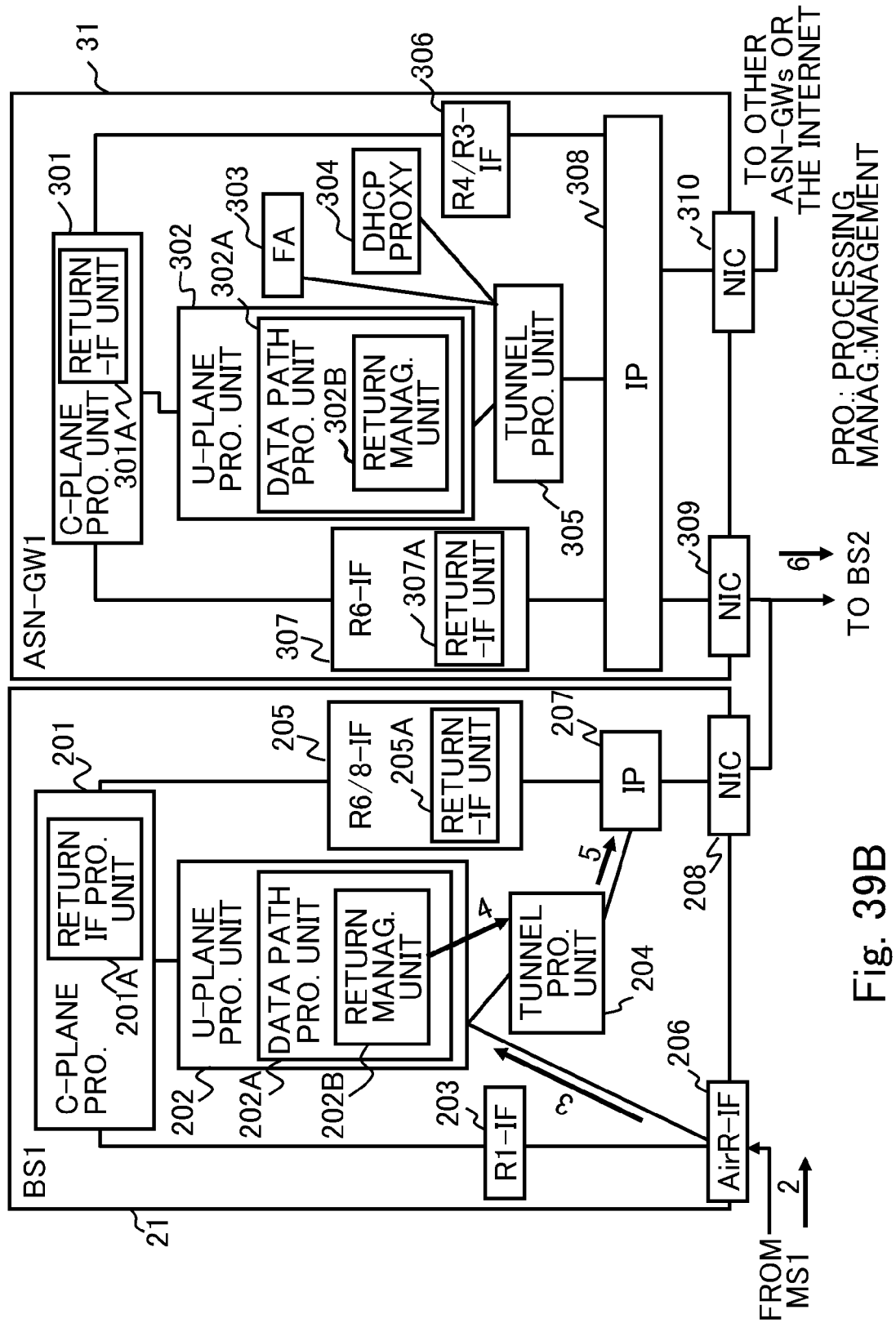
Figure 39C:
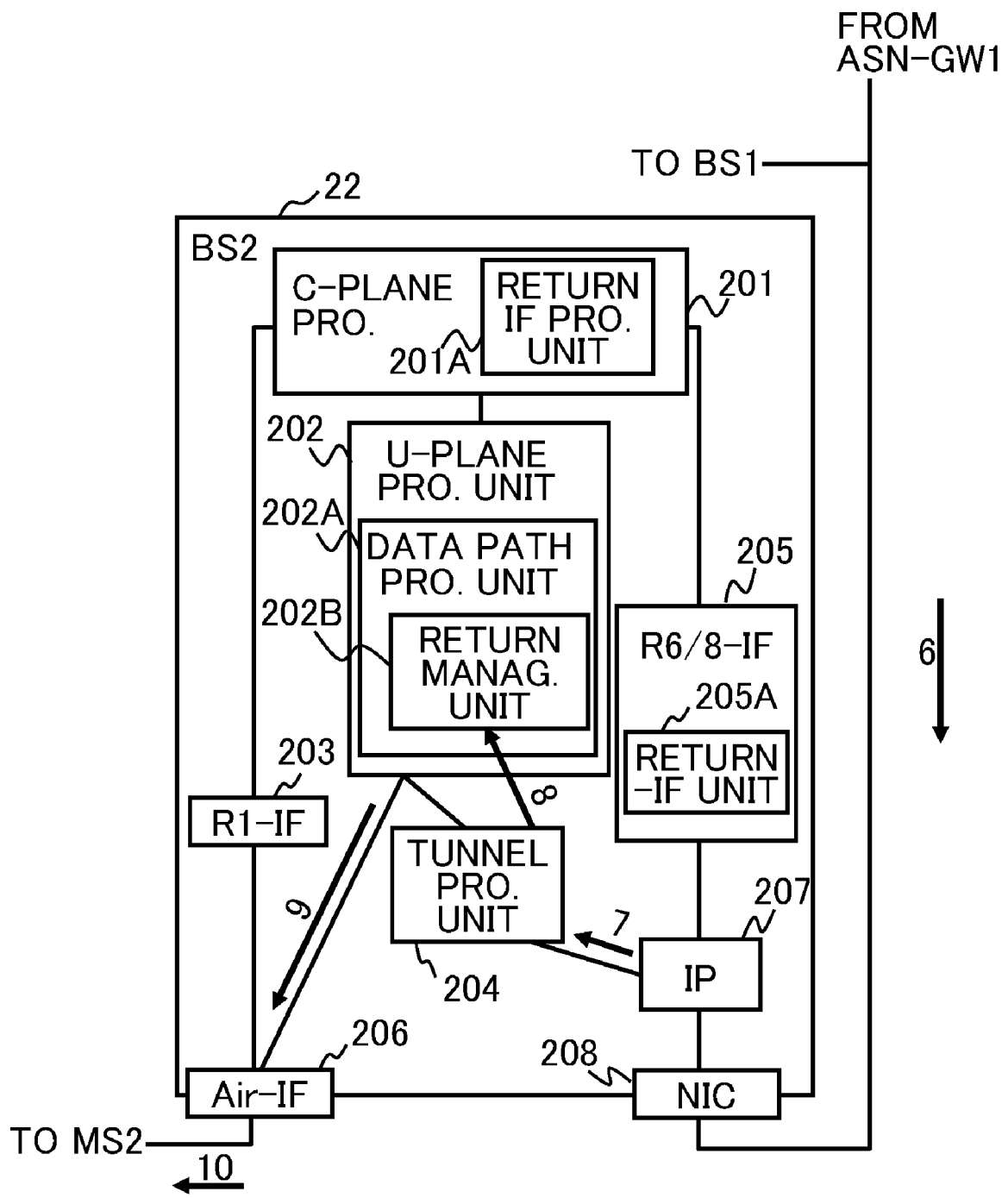

Next, a description will be given of operations of the blocks in the operation for returning the packet, embodied after setting the return of the packet in the communication system according to the second embodiment with reference to FIGS. 39A, 39B, 39C and 22, where the mobile stations 11 and 12 are illustrated in detail in FIG. 39A, the base station 21 and the ASN-GW 31 in FIG. 39B, and the base station 22 in FIG. 39C.

1) In the mobile station 11, the MS APL unit 101A creates data on application such as FTP and sound, and transfers the data as the packet to the IP unit 104.

2) The IP unit 104 sets an IP header to the data and transfers the data to the base station 21 via the Air-IF unit 105.

3) In the base station 21, the Air-IF 206 receives the packet, and transfers the packet to the DataPath processing unit 202A. The DataPath processing unit 202A embodies the route management of the packet.

4) The DataPath processing unit 202A determines, on the basis of the IP address of the destination of the packet, whether or not the packet is registered as the target of the return of the packet. The return management unit 202B of the DataPath processing unit 202A embodies processing necessary for performing the return of the packet. That is, the NAT processing is performed, the address on the transmission source is replaced from the mobile station 11 to the HA 41, and the encapsulation of the GRE tunnel is executed from the base station 21 to the base station 22. Thereafter, the packet is transferred to the Tunnel processing unit 204.

5) The Tunnel processing unit 204 transfers the packet to which the GRE tunnel is encapsulated to the IP unit 207.

6) The IP unit 207 transfers the packet to the base station 22 on the basis of the GRE tunnel.

7) The base station 22 receives the packet, and transfers the received packet to the Tunnel processing unit 204.

8) The Tunnel processing unit 204 resets the encapsulation of the GRE tunnel, and transfers the packet to the DataPath processing unit 202A. The return management unit 202B of the DataPath processing unit 202A embodies the return management so as to perform processing for returning the packet. That is, return management unit 202B of the DataPath processing unit 202A performs the NAT processing, thereby replacing the destination of the packet address from the HA 42 to the mobile station 12.

9) As a consequence, the DataPath processing unit 202A assigns a path to the mobile station 12 as a path of the packet, and transfers the packet to the Air-IF unit 206.

10) The Air-IF unit 206 transfers the packet to the mobile station 12 at the wireless interval.

11) The mobile station 12 receives the packet, and the IP unit 104 transfers the packet to the MS APL unit 101A as the IP packet.

Figure 40A:
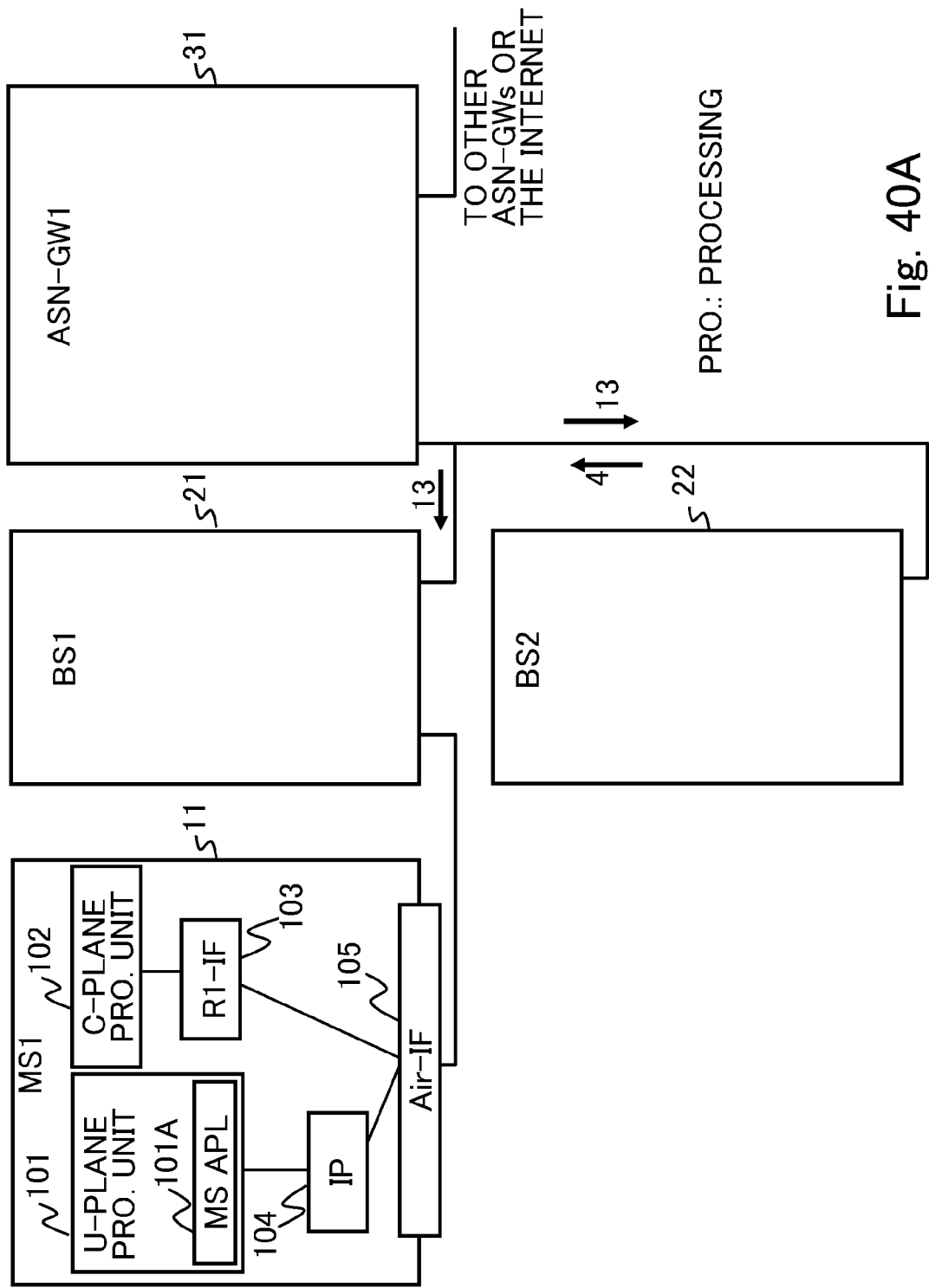
FIGS. 40A, 40B, and 40C are diagrams for explaining the internal structure of devices in the communication system according to the third embodiment.
Figure 40B:
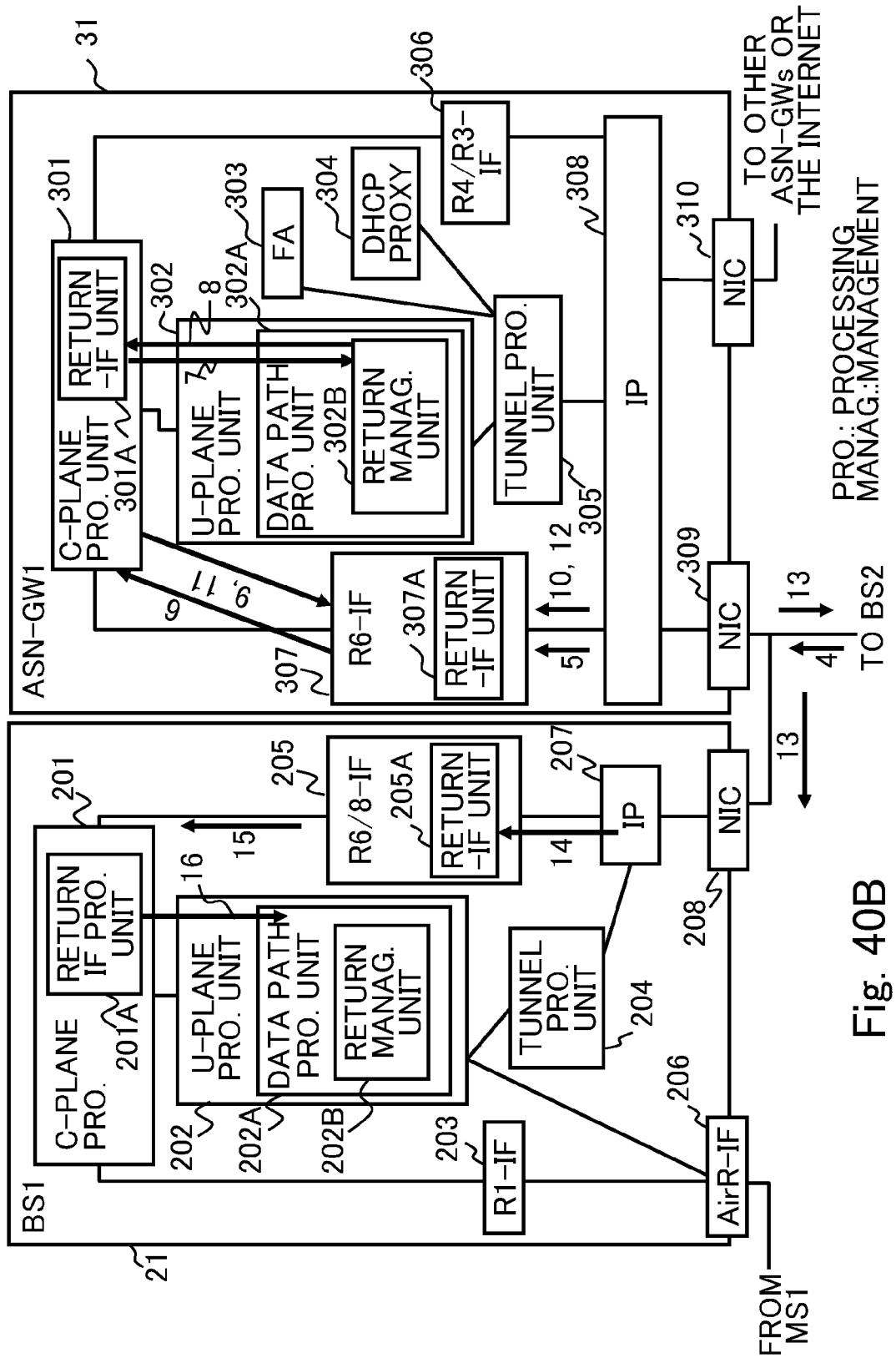
Figure 40C:
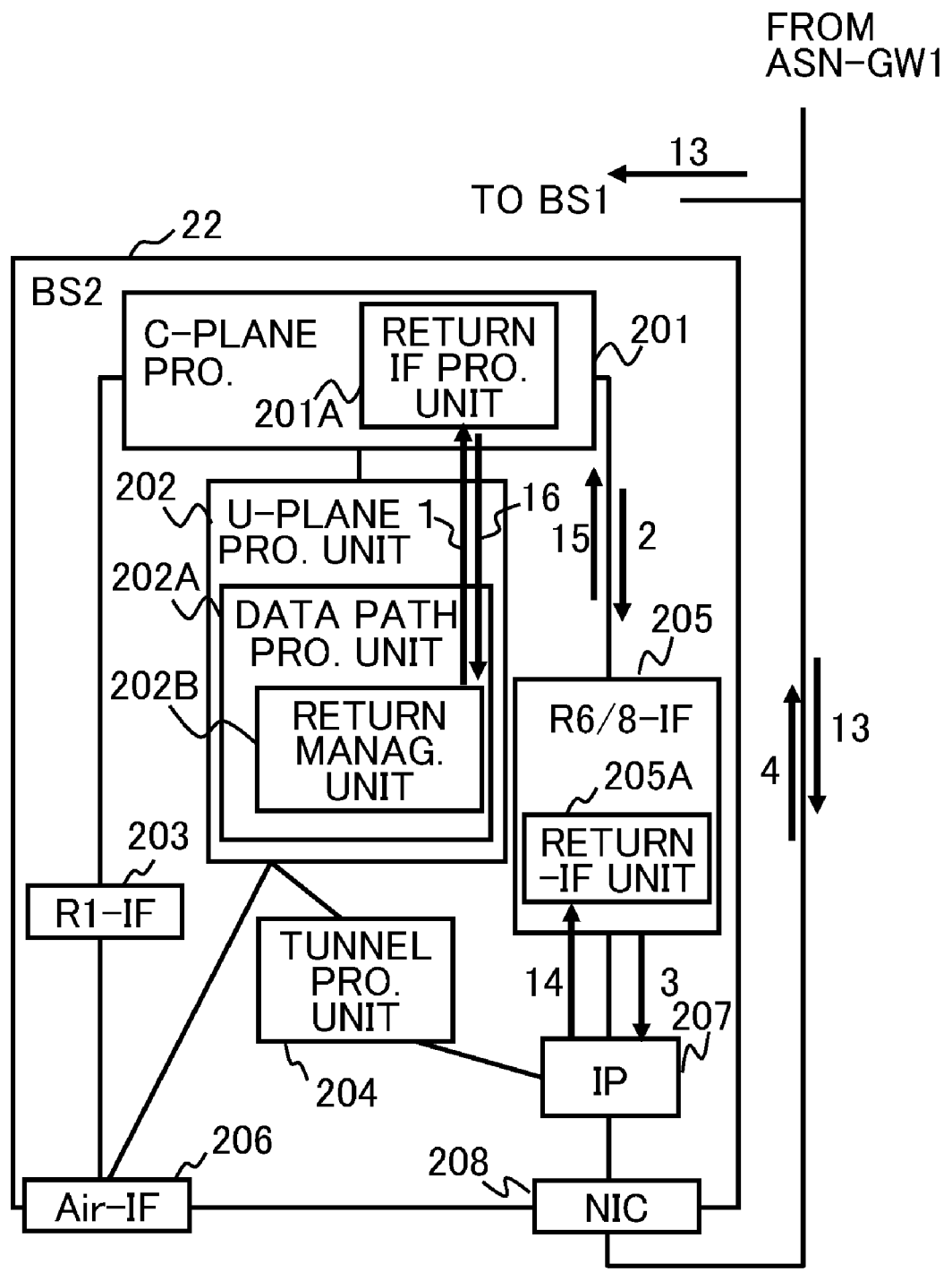

Next, a description will be given of operations of the blocks in the operation for resetting the setting of the return of the packet in the communication system according to the third embodiment with reference to FIGS. 40A, 40B, 40C and 26, where the mobile station 11 is illustrated in detail in FIG. 40A, the base station 21 and the ASN-GW 31 in FIG. 40B, and the base station 22 in FIG. 40C.

1) Power of the mobile station 12 is shut off, thereby erasing the corresponding data path. This is detected by the DataPath processing unit 202A in the base station 22, and the DataPath processing unit 202A then issues an instruction for deleting the data path to the C-Plane processing unit 201.

2) As a consequence, the C-Plane processing unit 201 creates a DataPath De-Registration Request message, and transfers the created message to the R6-IF processing unit 205.

3) The R6-IF processing unit 205 constructs the message as the message via the R6, and transfers the message to the IP unit 207.

4) The IP unit 207 transfers the message to the ASN-GW 31.

5) Since the message is the message via the R6, the ASN-GW 31 transfers the message to the R6-IF processing 307.

6) The R6-IF processing unit 307 extracts the DataPath De-Registration Request message from the messages, and transfers the extracted message to the C-Plane processing unit 301.

7) The C-Plane processing unit 301 analyzes the DataPath De-Registration Request message, and obtains path deleting information of the mobile station 12. The information is transferred to the return management unit 302B of the DataPath processing unit 302A via the return-IF processing unit 301A. The return management unit 302B determines whether or not the setting of the return of the corresponding packet needs to be reset.

8) As a consequence, when the setting of the return of the packet is necessary, the return management unit 302B creates information for resetting the setting of the return of the corresponding packet, transfers the information to the return-IF processing unit 301A, and issues an instruction for resetting the setting of the return of the packet.

9) In response to the instruction, the return-IF processing unit 301A constructs a return resetting message, and transfers the message to the R6-IF processing unit 307, as return IF processing to the base station 21.

10) The R6-IF processing unit 307 constructs the message as a message via the R6 to the base station 21, and transfers the message to the IP unit 308.

11) The return-IF processing unit 301A constructs the return resetting message for the base station 22, and transfers the message to the R6-IF processing unit 307.

12) The R6-IF processing unit 307 constructs the return resetting message as the message via the R6 to the base station 22, and transfers the message to the IP unit 308.

13) As a consequence, the return resetting message is transferred as the message via the R6 to the base stations 21 and 22 from the IP unit 308.

14) The base stations 21 and 22 receives the return resetting message, and the IP unit 207 extracts the message via the R6 from the messages and transfers the message to the R6-IF unit 205.

15) The R6-IF unit 205 extracts the return resetting message from the messages, and transfers the message to the return IF processing unit 201A in the C-Plane processing unit 201.

16) The return IF processing unit 201A extracts information for resetting the setting of the return of the packet from the messages. The return IF processing unit 201A instructs the resetting of the setting of the return of the packet to the return management unit 202A in the DataPath processing unit 202 on the basis of the information. In response to the instruction, the return management unit 202A performs the resetting of the path, NAT, and routing of the return of the corresponding packet.

Figure 41A:
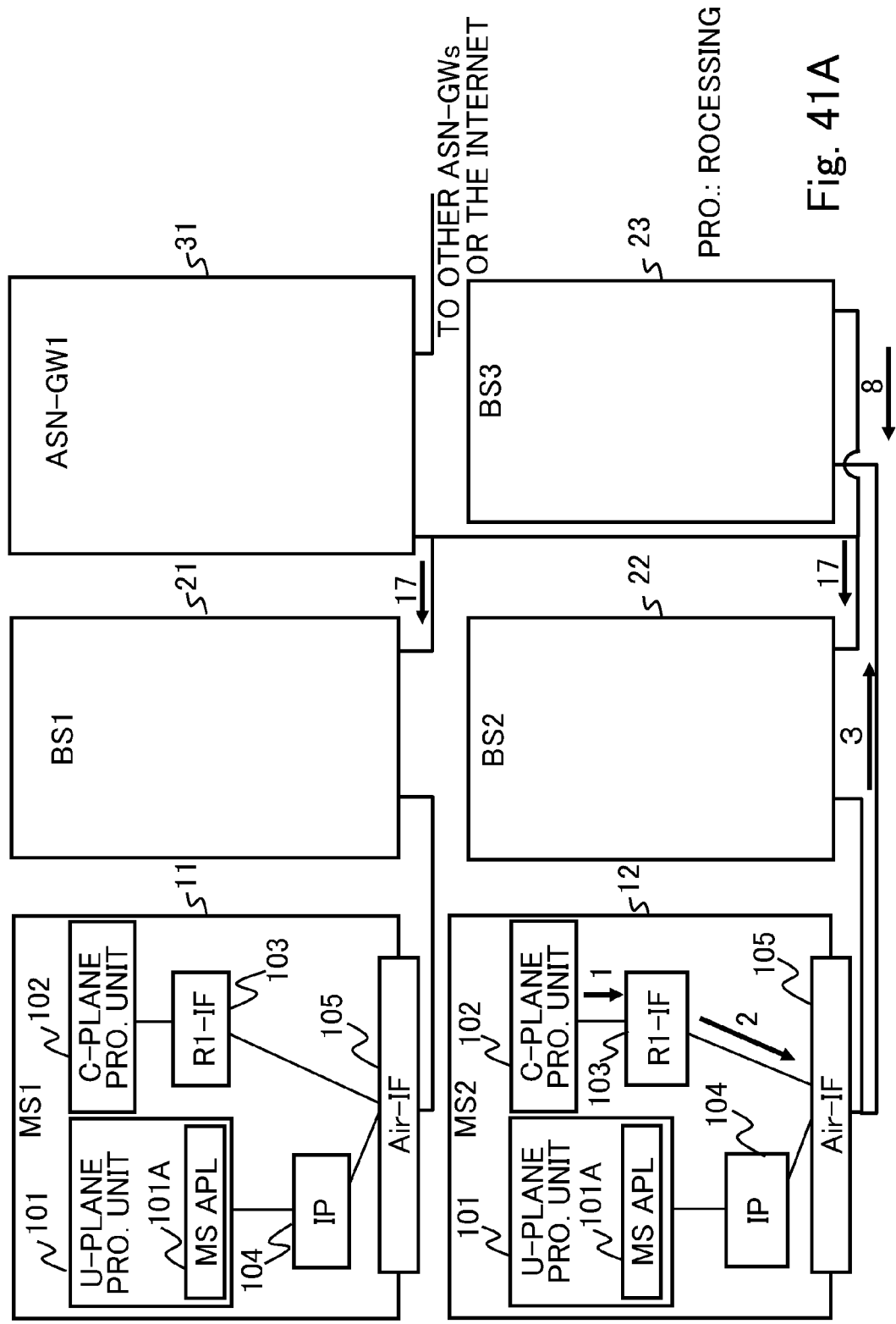
FIGS. 41A, 41B, and 41C are diagrams for explaining the internal structure of devices in a communication system according to the fourth embodiment.
Figure 41B:
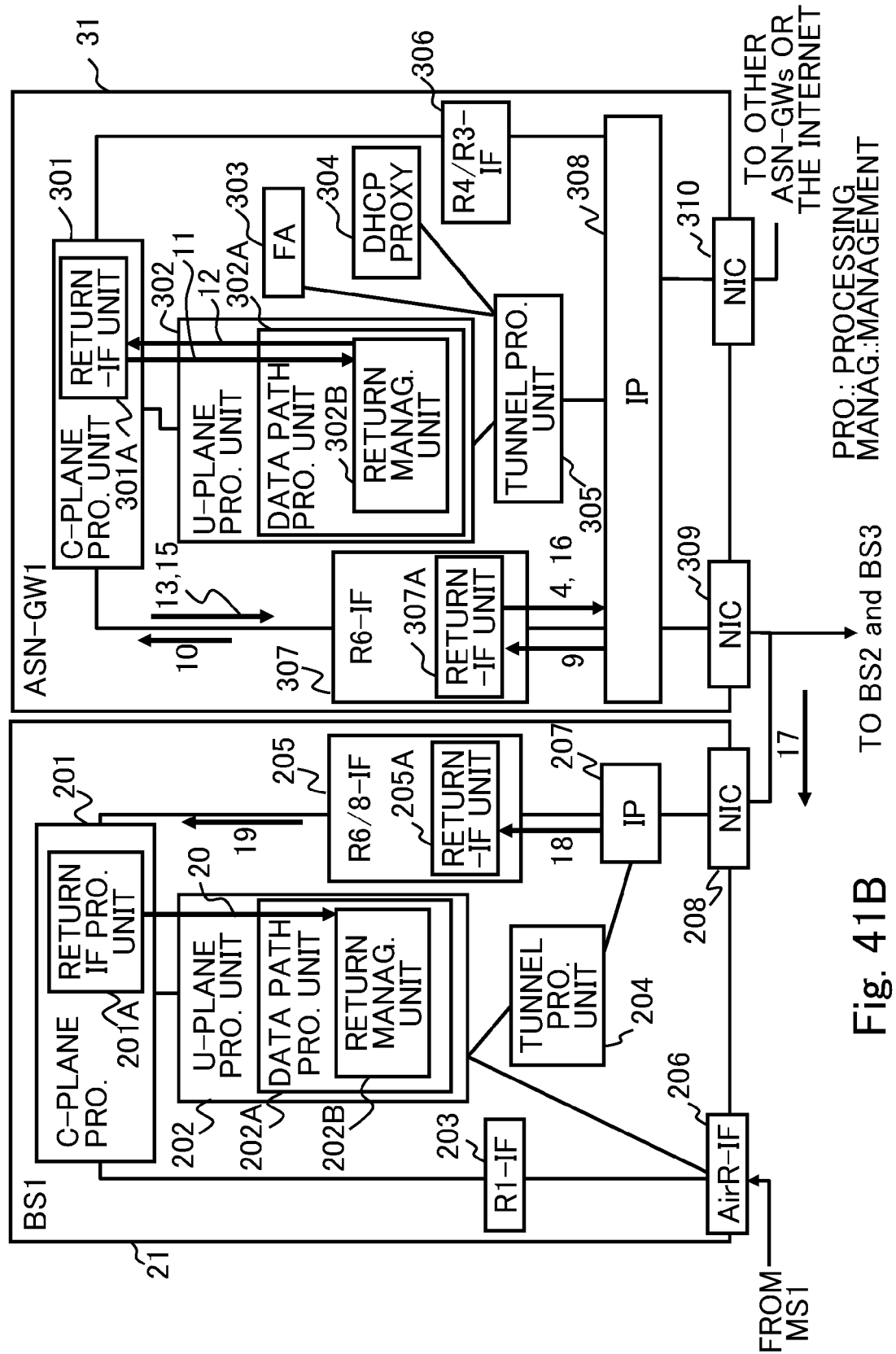
Figure 41C:
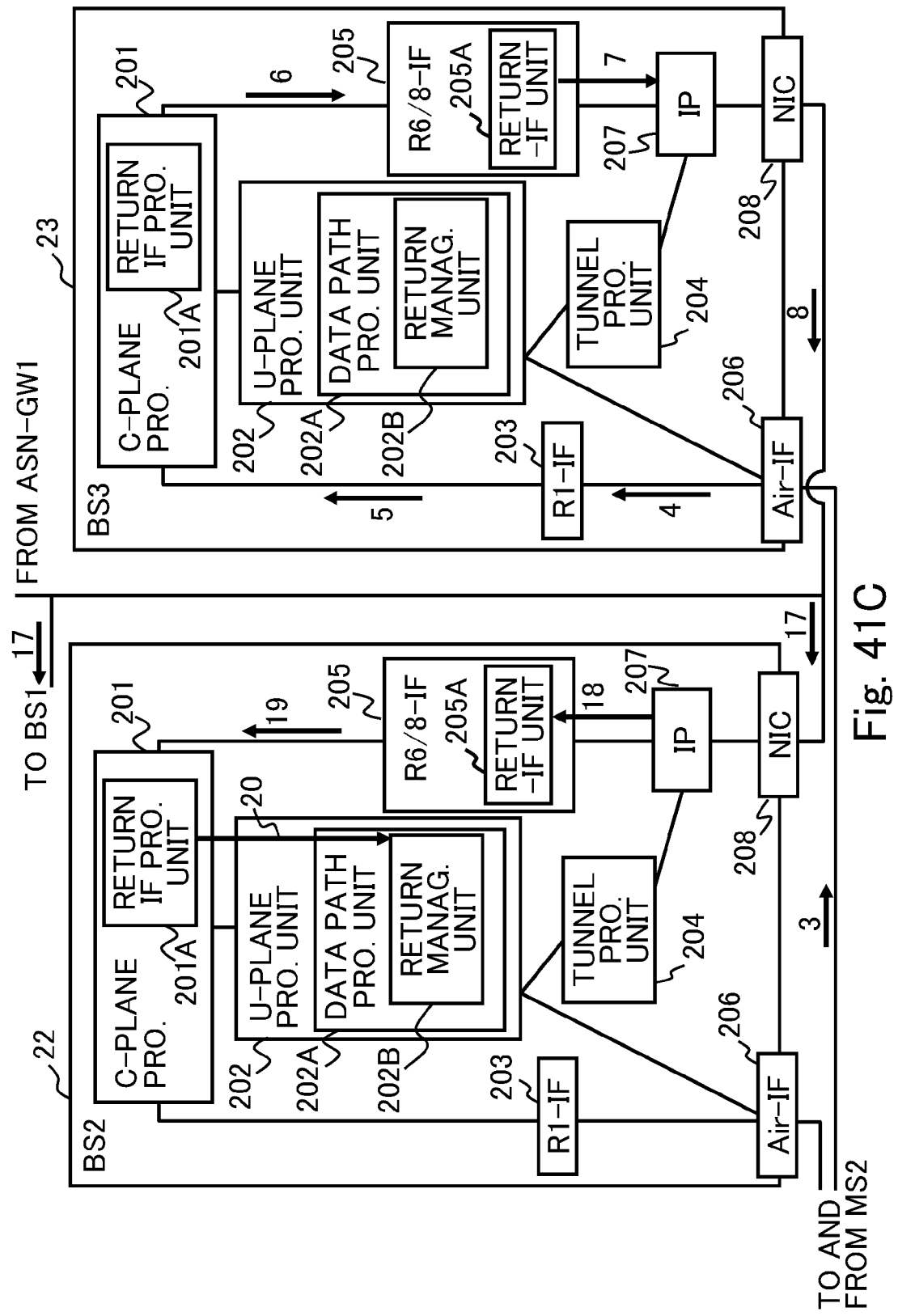

Next, a description will be given of operations of the blocks upon executing the handover in the communication system according to the fourth embodiment with reference to FIGS. 41A, 41B, 41C and 33, where the mobile stations 11 and 12 are illustrated in detail in FIG. 41A, the base station 21 and the ASN-GW 31 in FIG. 41B, and the base stations 22 and 23 in FIG. 41C.

1) The mobile station 12 moves under the management of the base station 23 and the handover is thus executed. Then, the C-Plane processing unit 102 in the mobile station 12 creates an HO request message, and transfers the message to the R1-IF processing unit 103.

2) The R1-IF processing unit 103 creates a message via the R1 from the messages, and transmits the created message via the Air-IF unit 105.

3) The Air-IF unit 105 transfers the HO request message as the message via the R1 to the base station 23 at the wireless interval.

4) The base station 23 receives the message. Since the message is one via the R1, the message is transferred from the Air-IF unit 206 to the R1-IF processing unit 203.

5) The R1-IF processing unit 203 extracts the HO request message, and transfers the extracted message to the C-Plane processing unit 201.

6) The C-Plane processing unit 201 transfers the HO request message without change to the R6-IF processing unit 205.

7) The R6-IF processing unit 205 constructs the HO request message as the message via the R6, and transfers the created message to the IP unit 207.

8) The IP unit 207 transfers the HO request message to the ASN-GW 31.

9) Since the HO request message is the message via the R6, in the ASN-GW 31, the HO request message is transferred from the IP unit 308 to the R6-IF processing unit 307.

10) The R6-IF processing unit 307 extracts the HO request message, and transfers the extracted message to the C-Plane processing unit 301.

11) The C-Plane processing unit 301 analyzes the HO request message, and transfers information for embodying the handover to a path of the mobile station 12 to the return management unit 302B of the DataPath processing unit 302A via the return-IF processing unit 301A. The return management unit 302B refers to the information so as to determine whether or not the setting of the return of the corresponding packet needs to be reset.

12) As a consequence, when it is determined that the setting of the return of the corresponding packet needs to be reset, the return management unit 302B creates return resetting information, and transmits a return resetting instruction to the return IF processing 301A.

13) In response to the instruction, the return IF processing 301A constructs a return resetting message to the base station 21, and transfers the return resetting message to the R6-IF processing unit 307.

14) The R6-IF processing unit 307 constructs the return resetting message as the message via the R6, and transfers the created message to the IP unit 308.

15) Similarly, in response to the instruction, the return IF processing 301A constructs a return resetting message to the base station, and transfers the return resetting message to the R6-IF processing unit 307.

16) The R6-IF processing unit 307 constructs the return resetting message as the message via the R6, and transfers the created message to the IP unit 308.

17) As mentioned above, the return resetting message is transferred to the base stations 21 and 22.

18) In the base stations 21 and 22, the message is extracted, and is transferred to the R6-IF processing unit 205.

19) In the base stations 21 and 22, the R6-IF processing unit 205 extracts the return resetting message, and the message is transferred to the return IF processing unit 201A in the C-Plane processing unit 201.

20) In the base stations 21 and 22, the return IF processing unit 201A extracts the return resetting information, and instructs the resetting of the setting of the return of the packet to the return management unit 202B of the DataPath processing unit 202A. The return management unit 202B embodies the resetting of the path, NAT, and routing of the return of the corresponding packet in response to the instruction.

Hereinbelow, a description will be given of the communication system according to the fifth and sixth embodiments with reference to FIGS. 42 to 61.

In the communication system according to the fifth and sixth embodiments, the basic thinking of the communication system according to the first to fourth embodiments is applied to the 3GPP technology. In the communication system according to the first to fourth embodiments, the packet is returned by controlling the transfer path of the packet performed in the base station and the ASN-GW with the WiMAX technology. As a consequence, a data processing load of the base station and the ASN-GW is reduced and a load of transmission resources is reduced. On the other hand, according to the fifth and sixth embodiments, the packet is returned by packet transfer path control performed by an eNB corresponding to the base station and an aGW corresponding to ASN-GW with the WiMAX technology. As a consequence, a data processing load of the eNB and the aGW is reduced and a load of transmission resources is also reduced.

In the communication system with the 3GPP technology, packet distributing processing is concentrated to the aGW for collecting the communication packets on the fast wireless side, and a machine load is large. Further, in the communication system with the 3GPP technology, a communication network under management of the aGW for collecting the communication packets on the fast wireless side usually has a data transfer speed of 1 Gbps. Therefore, as the data transfer speed is faster on the wireless side, the resources run short. Further, the packet communication between the mobile stations performed between a plurality of the aGWs is assumed to have the two problems.

In the communication system according to the fifth and sixth embodiments, the aGW monitors the communication state of the mobile station under management of the aGW, and performs the setting for the return of the packet according to the necessity as mentioned above. Further, the eNB sets a transfer path of the packet between the eNBs so as to set the return of the packet from the aGW. Further, upon embodying the handover, the aGW resets the transfer path for returning the packet. The aGW also sets the return of the packet in cooperation with aGW devices in the communication between the mobile stations between a plurality of the aGWs.

That is, in the communication system according to fifth and sixth embodiments, the aGW that manages the eNB checks the destination of the packet from the mobile station such as a PDA. When the destination is the mobile station under management of the eNB under management of the aGW, the aGW performs, for the eNB device, NAT (i.e., change/replacement of the IP address) processing, structures a tunnel between the eNBs, and instructs the change of the routing table. That is, the transfer path of the packet is changed in the eNB and between the eNBs, and the return of the packet is embodied. As mentioned above, the processing load and the load of transmission resources in the aGW are reduced.

Hereinbelow, a description will be given of a specific method for realizing the communication system according to the fifth and sixth embodiments by applying the basic thinking of the communication system with the WiMAX technology according to the first to fourth embodiments to the communication system with the 3GPP technology.

Figure 4:
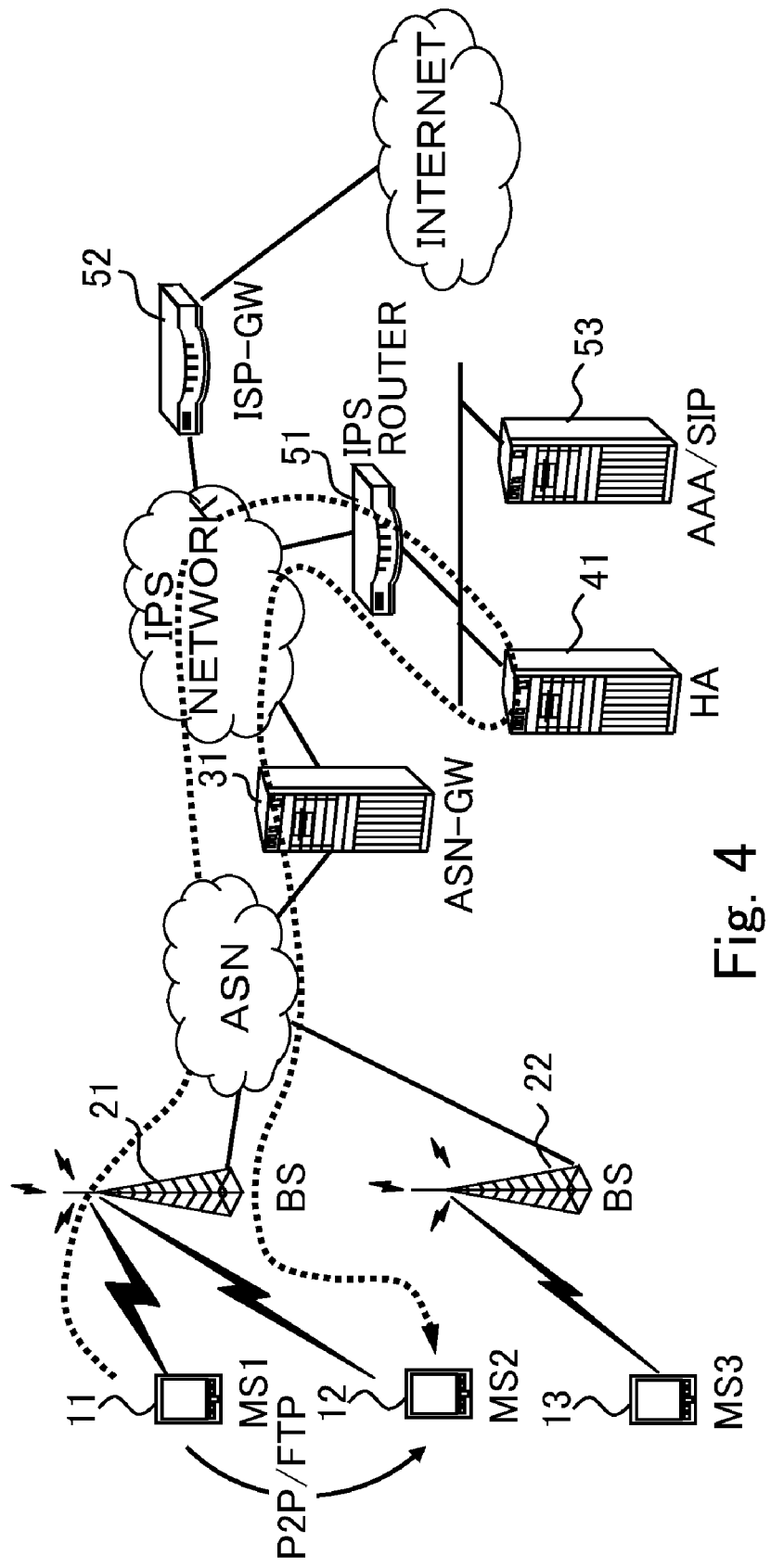
FIG. 4 is a diagram for explaining the difference between the WiMAX technology and a 3GPP technology in the flow of an IP packet.
Figure 5:
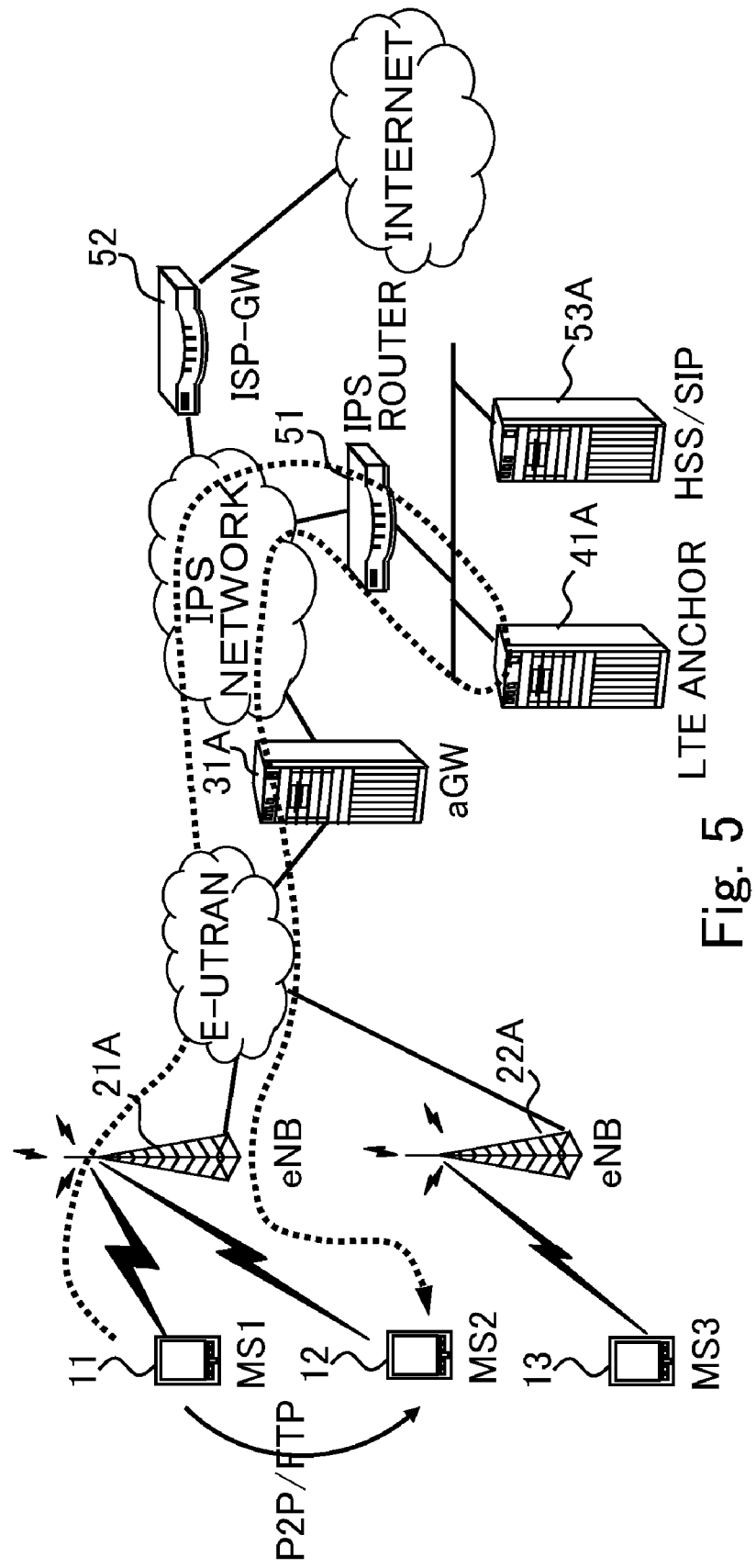
FIG. 5 is a diagram for explaining the difference between the WiMAX technology and the 3GPP technology in the flow of the IP packet.
Figure 6:
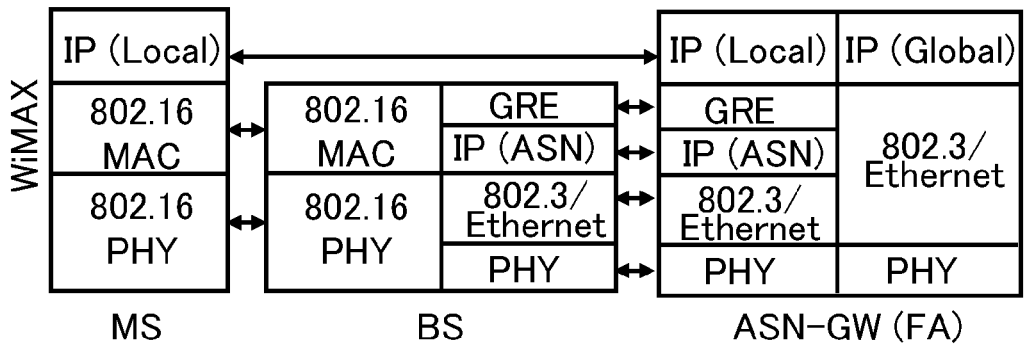
FIG. 6 is a diagram for explaining the difference between the WiMAX technology and the 3GPP technology upon implementing a protocol stack.

As mentioned above with reference to FIGS. 4 and 5, the 3GPP system technology and the wireless LAN system (i.e., WiMAX) technology are integrated. Therefore, the main device structure and the processing executed by devices with the 3GPP technology are similar to those with the WiMAX technology. However, with respect to an interface between devices, interface prescriptions are individually provided for the WiMAX technology and the 3GPP technology. Therefore, a message needs to be added to the following interface (Reference Point) so as to apply the basic thinking of the communication system according to the first to fourth embodiments to the 3GPP technology.

Figure 42:
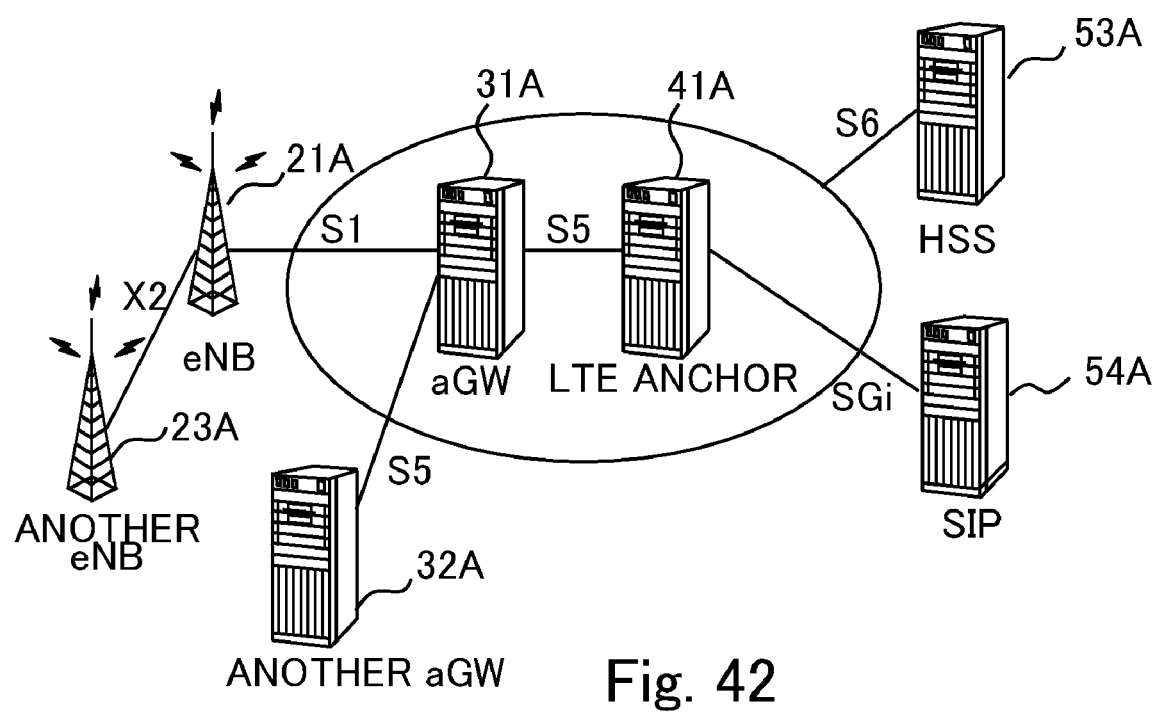
FIG. 42 is a diagram for explaining a message to be added to an interface in a communication system according to the fifth embodiment.

That is, in FIG. 42, at Reference Point X2, a message for establishing a transfer path or resetting the path is added for the return of the packet between the eNBs 21A and 23A. FIG. 42 illustrates an example of the Reference Point with the 3GPP technology.

At Reference Point S1, a message for instructing the execution of the return of the packet (i.e., setting or resetting of the return of the packet) between the eNB 21A and the aGW 31A is added.

At Reference Point S5, a message for cooperation of an instruction to execute the return of the packet between the aGWs 31A and 32A is added.

Incidentally, since the recommendation of the 3GPP technology is in progress of being currently created, the following device can be expressed as the following different name.

That is, the aGW can be also referred to as Serving GW. Further, the LTE anchor can be also referred to as PDN (Packet Data Network or Public Data Network) GW.

Figure 7:
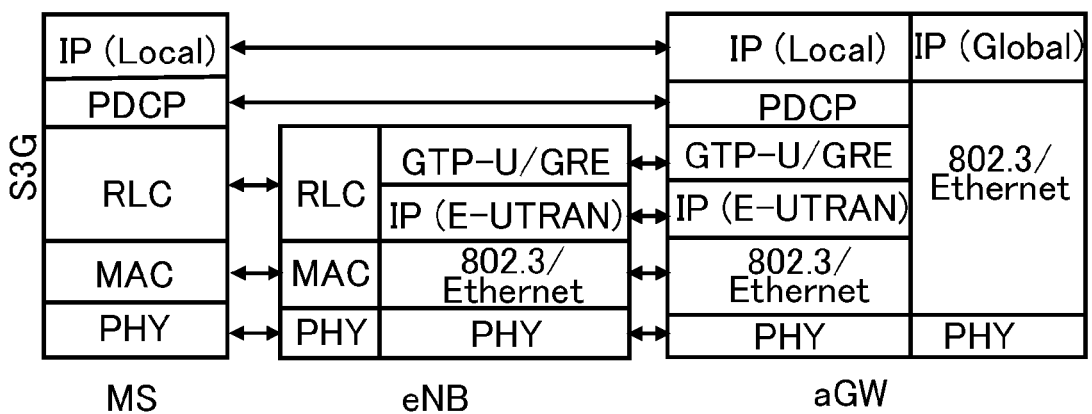
FIG. 7 is a diagram for explaining the difference between the WiMAX technology and the 3GPP technology upon implementing the protocol stack.
Figure 8:
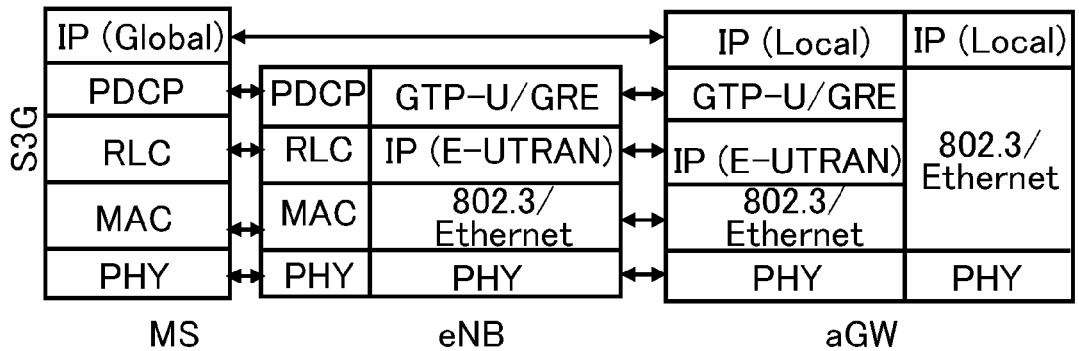
FIG. 8 is a diagram for explaining the difference between the WiMAX technology and the 3GPP technology upon implementing the protocol stack.

Upon implementing a protocol stack from the mobile station to the aGW with the 3GPP technology illustrated in FIGS. 7 and 8, a protocol for compressing the header referred to as PDCP in the 3GPP and performing sequence number management is positioned under a layer of the IP packet. Therefore, when the eNB extracts or creates the IP packet, PDCP information is needed. Therefore, the PDCP information needs to be added to transfer information instructing that the packet is returned from the aGW to the eNB.

Herein, since the protocol stack is in progress of being prescribed, the structure illustrated in FIG. 8 can be used. In this case, the PDCP is terminated to the eNB and, therefore, the PDCP information does not need to be transferred from the aGW to the eNB.

Hereinbelow, a description will be given of the structure of the communication system according to the fifth embodiment in accordance with FIGS. 43 to 49.

Figure 43:
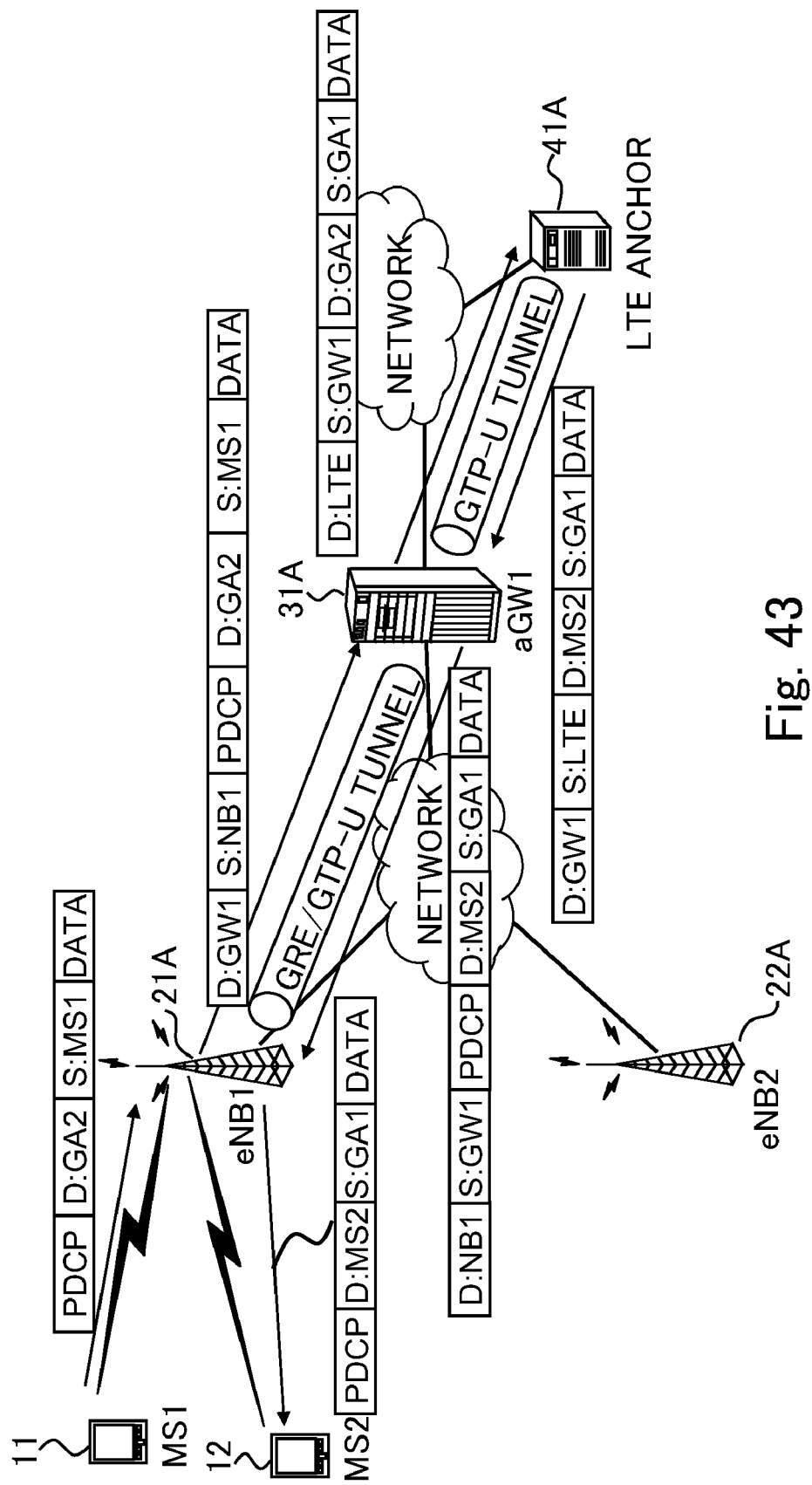
FIG. 43 is a diagram for explaining an operation in the communication system according to the fifth embodiment.

FIG. 43 illustrates a flow of the packet in the communication between the mobile stations 11 and 12 under management of the eNB.

A path illustrated by an arrow in the drawing will be sequentially described when the packet is transferred from the mobile station 11 to the mobile station 12.

1) The packet whose destination address is set to GA 2 (global IP address corresponding to a local IP address of the mobile station 12) is transferred at the wireless interval from the mobile station 11 to the eNB 21A. Further, the IP packet is subjected to PDCP setting processing (encoding), and a PDCP packet header is added to the IP packet.

2) In the transfer from the eNB 21A to the aGW 31A, the packet is encapsulated by the GRE tunnel or GPRS Tunneling Protocol for the U-Plane (hereinafter, simply referred to as GTP-U). The destination address thereof is set to the address of the aGW 31A. The internal header of the encapsulated packet is kept.

3) The aGW 31A receives the packet, performs PDCP resetting processing (decoding), and extracts the IP packet. The address of the packet from the mobile station 11 on the transmission side is replaced from the address of the mobile station 11 to GA 1 as the global IP address of the mobile station 11. The packet is transferred via a GTP-U tunnel to the LTE anchor 41A. Incidentally, processing for changing the address of the packet on the transmission source to GA 1 as the global IP address of the mobile station 11 can be performed on the LTE anchor 41A side.

4) The LTE anchor 41A encapsulates the packet and transfers the encapsulated packet to the aGW 31A as the aGW for managing the mobile station 12 via the GTP-U tunnel. In this case, the LTE anchor 41A replaces the destination address of the header from GA 2 to the mobile station 12. The aGW 31A may perform the operation for replacing the destination address of the header from GA 2 to the mobile station 12, as mentioned above.

5) The aGW 31A performs the PDCP setting processing of the IP packet, and transfers the packet to the eNB 21A via the GRE tunnel or GTP-U.

6) The eNB 21A that receives the packet resets the encapsulation of the GRE tunnel or GTP-U, and transfers the packet to the mobile station 12.

7) The mobile station 12 receives the packet, performs the PDCP resetting processing, and extracts the IP packet.

Incidentally, when the PDCP is terminated between the mobile station and the eNB as mentioned above, the resetting of the PDCP in Item 3) and the setting of the PDCP in Item 5) move to the processing of the eNB 21A in Item 2) and Item 6). Further, the PDCP header is not set to the packet between the eNB 21A and the aGW 31A illustrated in FIG. 43.

Next, a description will be given of a sequence for transferring and processing the IP packet when the PDCP is terminated between the mobile station and the aGW with reference to FIG. 44 and when the PDCP is terminated between the mobile station and the eNB with reference to FIG. 45.

Figure 44:
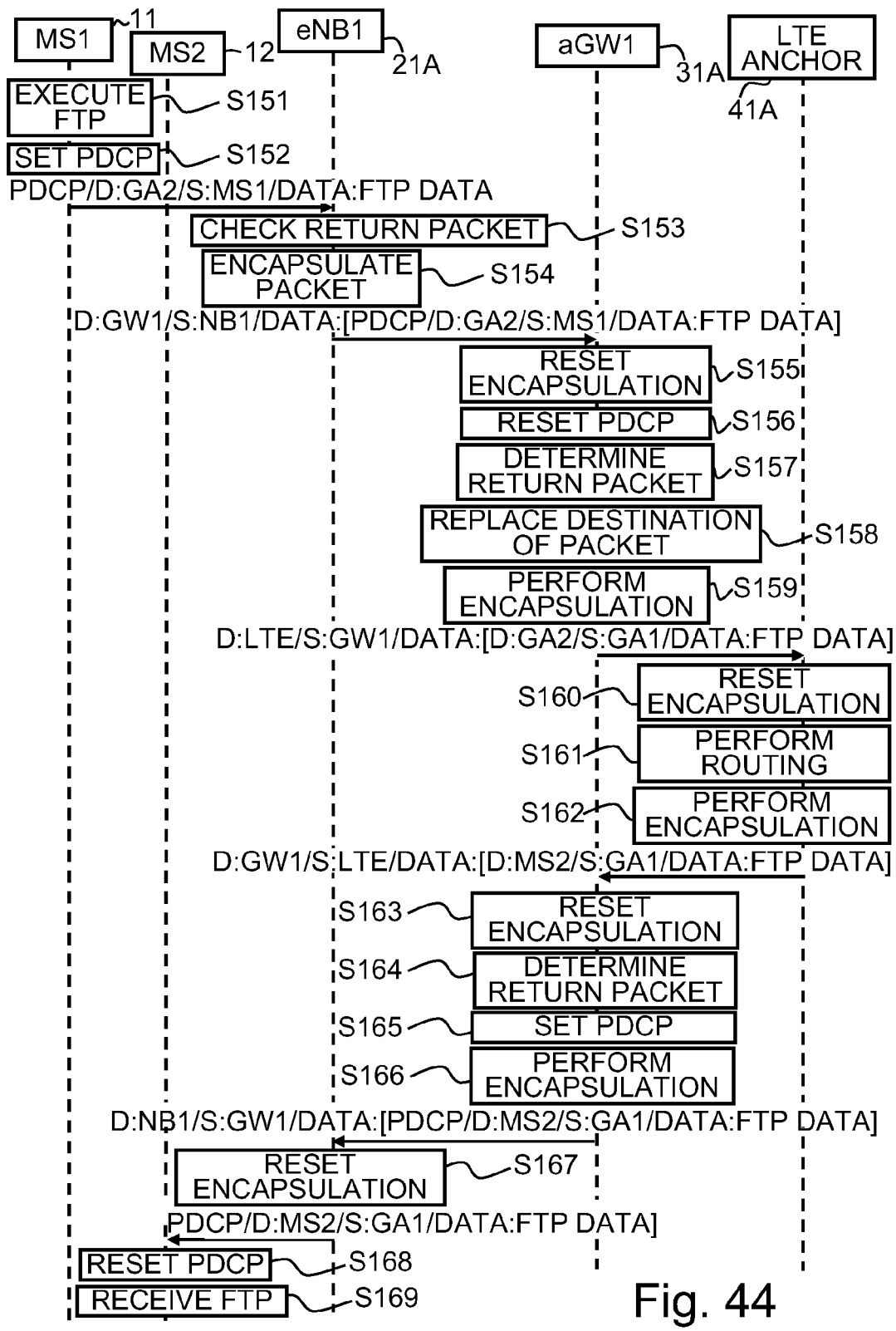
FIG. 44 is a sequence diagram for explaining the operation in FIG. 43.

In the sequence of FIG. 44, the mobile station 11 executes the FTP in S151. The PDCP is set (S152), and the packet is transferred to the eNB 21A. The eNB 21A receives the packet, and then determines whether or not the packet is registered as the target of the return of the packet (S153). It is not determined that the packet is registered as the target of the return of the packet, the packet is encapsulated and the packet is transferred to the aGW 31A as the destination (S154).

The aGW 31A receives the packet and then resets the encapsulation (S155), and resets the PDCP (S156). Similarly to the first embodiment, the return adaptation determination is embodied (S157). Further, the aGW 31A replaces the destination of the packet from the mobile station 11 to GA 1 (S158), performs the encapsulation (S159), and transfers the packet to the LTE anchor 41A.

The LTE anchor 41A receives the packet and resets the encapsulation (S160), and performs routing for setting the destination of the packet to the address of the mobile station 12 (S161). The encapsulation is performed (S162), and the packet is transferred to the aGW 31A.

The aGW 31A receives the packet and resets the encapsulation (S163). Similarly, the aGW 31A performs the return adaptation determination (S164), and sets the PDCP (S165). The encapsulation is performed (S166), and the packet is transferred to the eNB 21A.

The eNB 21A receives the packet, and resets the encapsulation (S167), and transfers the packet to the mobile station 12.

The mobile station 12 receives the packet, and resets the PDCP (S168), and obtains data of the packet (S169).

Figure 45:
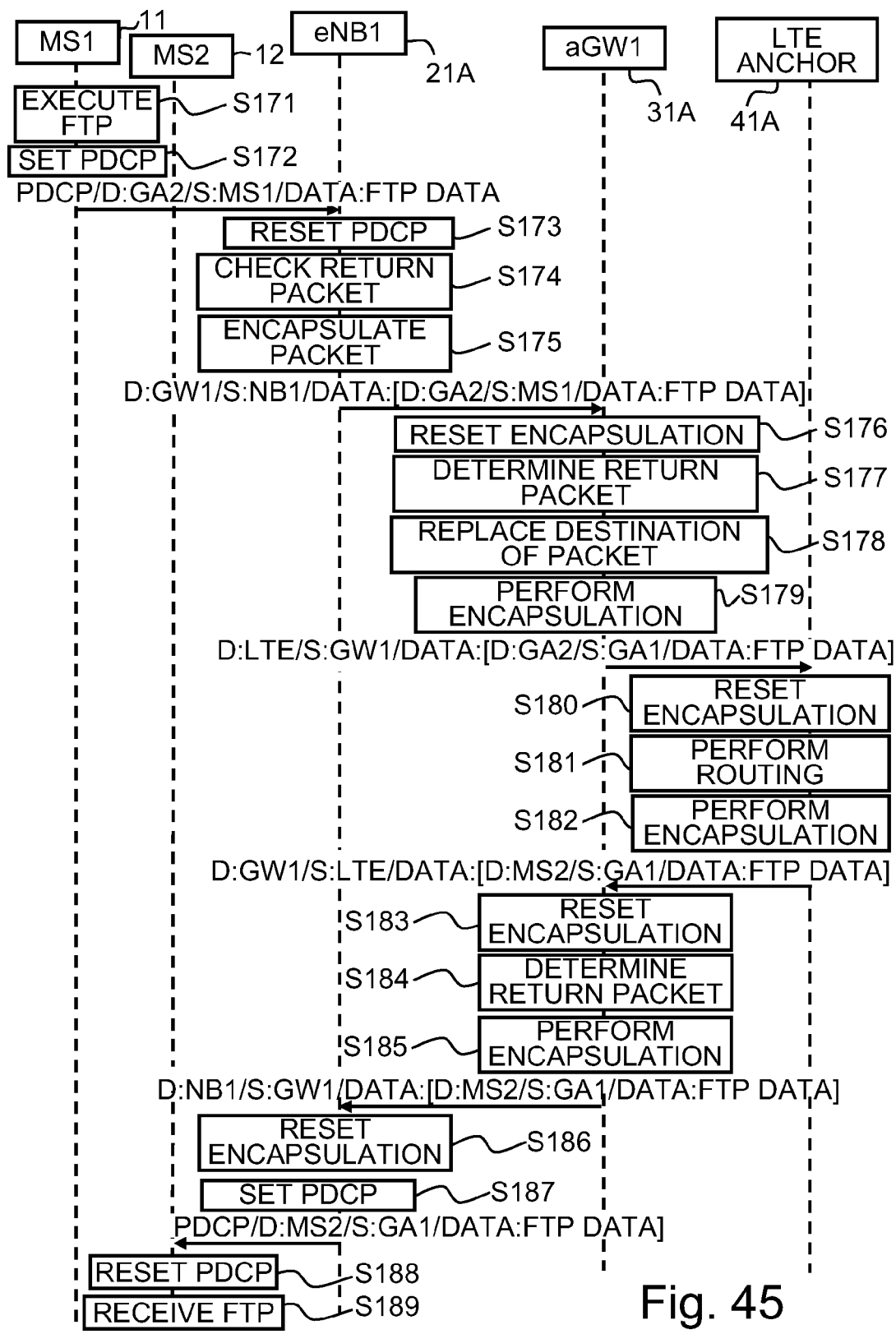
FIG. 45 is a sequence diagram for explaining the operation in FIG. 43.

In the sequence of FIG. 45, in S171, the mobile station 11 executes the FTR The PDCP is set (S172), and the packet is transferred to the eNB 21A. The eNB 21A receives the packet, and resets the PDCP (S173). It is determined whether or not the packet is registered as the target of the return of the packet (S174). It is not determined that the packet is registered as the target of the return of the packet, the packet is encapsulated and the encapsulated packet is transferred to the aGW 31A as the destination (S175).

The aGW 31A receives the packet and resets the encapsulation (S176). Similarly to FIG. 44, the return adaptation determination is embodied (S177). Further, the aGW 31A replaces the destination of the packet from the mobile station 11 to GA 1 (S178), performs the encapsulation (S179), and transfers the packet to the LTE anchor 41A.

The LTE anchor 41A receives the packet and resets the encapsulation (S180), and performs the routing for setting the destination of the packet to the address of the mobile station 12 (S181). The encapsulation is performed (S182), and the packet is transferred to the aGW 31A.

The aGW 31A receives the packet and resets the encapsulation (S183). Similarly, the return adaptation determination is performed (S184), the encapsulation is performed (S185), and the packet is transferred to the eNB 21A.

The eNB 21A receives the packet, and resets the encapsulation (S186), sets the PDCP (S187), and transfers the packet to the mobile station 12.

The mobile station 12 receives the packet, resets the PDCP (S188), and obtains data of the packet (S189).

Upon transmitting the packet from the aGW 31 A to the LTE anchor 41A and upon receiving the packet from the LTE anchor 41A to the aGW 31A, the destination of the packet or address of the transmission side is checked. When the address is the IP address, such as GA 1 or GA 2, under management of the LTE anchor 41A, the aGW 31A determines whether or not the eNB under management of the aGW 31A performs the return of the packet.

Figure 48:
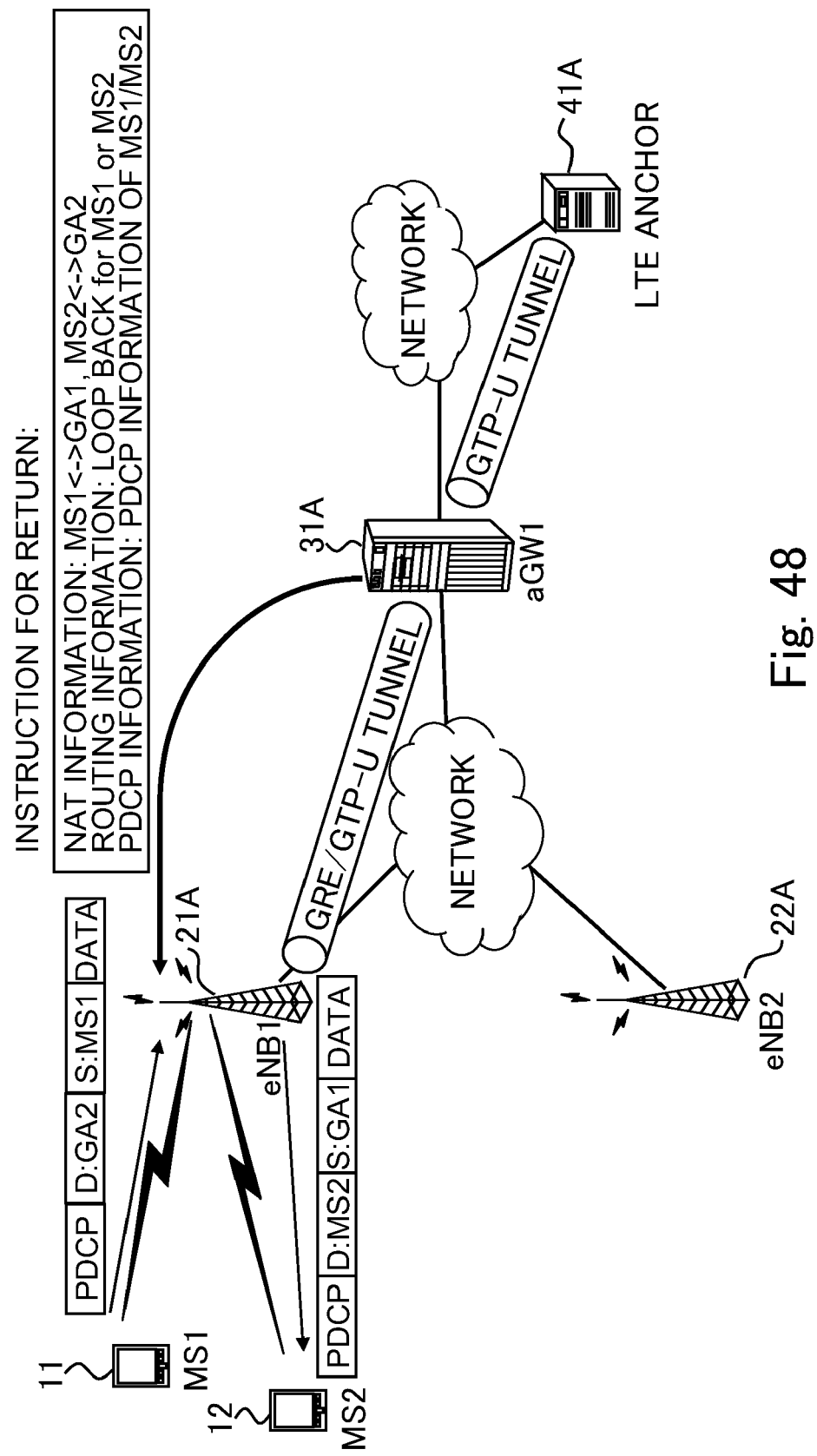
FIG. 48 is a diagram for explaining the operation in the communication system according to the fifth embodiment.

For the purpose of executing the determination, the aGW 31A has the return management table illustrated in FIG. 46, as performed by the ASN-GW 31 according to the first embodiment. Thereafter, the aGW 31A analyzes the traffic situation and the protocol (FTP or streaming) of the packet, and performs the return adaptation determination. It is determined that the return of the packet of the communication between the mobile station 11 and 12 is set, the aGW 31A creates the NAT information and routing information for embodying the return of the corresponding packet on the basis of the return management table illustrated in FIG. 46, similarly to the ASN-GW 31 according to the first embodiment. Further, the return state of the return management table is changed, as illustrated in FIG. 47. As illustrated in FIG. 48, an instruction for embodying the return of the packet is issued to the eNB 21A.

Figure 49:
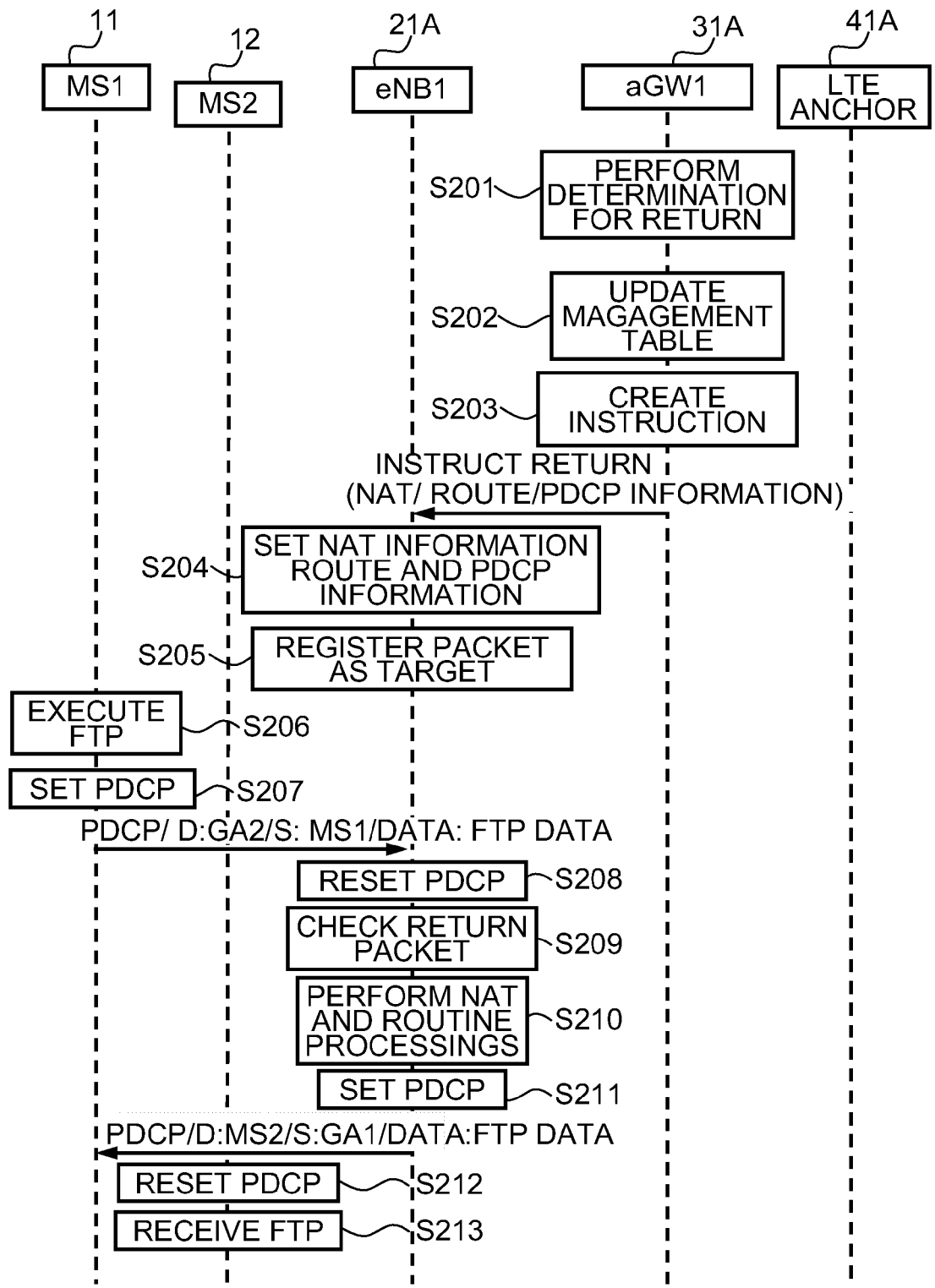
FIG. 49 is a sequence diagram for explaining the operation in FIG. 48.

FIG. 49 illustrates the operation for instructing the return of the packet and the subsequent operation sequence of the packet transfer from the mobile station 11 to the mobile station 12.

In FIG. 49, the aGW 31A performs the return adaptation determination. If it is determined that the packet under a predetermined condition (destination and transmission source) is to be registered as the target of the return of the packet (S201), the return management table is updated. In this case, with respect to the packet of the communication between the mobile station 11 and the mobile station 12, "return to MS 2" and "return to MS 1" are written to a return state column of the corresponding record as illustrated in FIG. 47 (S202). Further, the aGW 31A creates the NAT information and routing information necessary for embodying the return of the packet by the eNB 21A, and transmits the information to the eNB 21A (S203).

The eNB 21A that receives the information sets the NAT information and routing information to the eNB 21A (S204), and registers the corresponding packet of the communication between the mobile station 11 and the mobile station 12 as the target of the return of the packet (S205).

Thereafter, the mobile station 11 performs the FTP processing (S206), and further sets the PDCP (S207). The packet addressed to the mobile station 12 is transferred to the eNB 21A.

The eNB 21A checks to see if the packet is registered as the target of the return of the packet (S208). The packet matches the condition (destination and transmission source) registered in S205. Therefore, the NAT processing and routine processing for returning the packet is performed (S209). As a consequence, the eNB 21A replaces the destination address of the packet to the address of the mobile station 12, and replaces the address on the transmission source to GA 1 of the mobile station 11. As a consequence, the return of the packet is embodied, and the packet is directly transferred to the mobile station 12.

The mobile station 12 receives the packet and resets the PDCP (S212), and obtains data of the packet (S213).

The packet from the mobile station 11 is returned by the NAT processing and routine processing for returning the packet in the eNB 21A, and is directly transferred to the mobile station 12.

Incidentally, when the PDCP is terminated between the mobile station and the eNB, the PDCP information does not need to be transferred upon transferring information having an instruction indicating that the return of the packet is performed from the aGW 31A to the eNB 21A or the setting thereof is reset. Thereafter, the setting of the PDCP information is not necessary.

Next, a description will be given of the communication system according to the sixth embodiment.

The communication system according to the sixth embodiment has the same structure as that of the communication system according to the fifth embodiment. However, according to the sixth embodiment, the mobile station 11 as the transfer source of the packet and the mobile station 12 as the transfer destination are respectively managed by the aGWs 31A and 32A, unlike the fifth embodiment.

In the communication system according to the first to fourth embodiments, i.e., the communication system with the WiMAX technology, an operation for searching the mobile stations managed by all ASN-GWs from the IP addresses can have a high load. Therefore, the execution of the return of the packet is limited within the managing range of the ASN-GW. However, if the address of the mobile station under which of the aGW or eNB can be searched from the IP address of the packet with a low load, the limiting of the execution range is not necessary. That is, the return of the packet can be also embodied for the communication between the mobile stations via a plurality of the aGWs. Hereinbelow, two specific methods for realizing this will be sequentially described.

Figure 50:
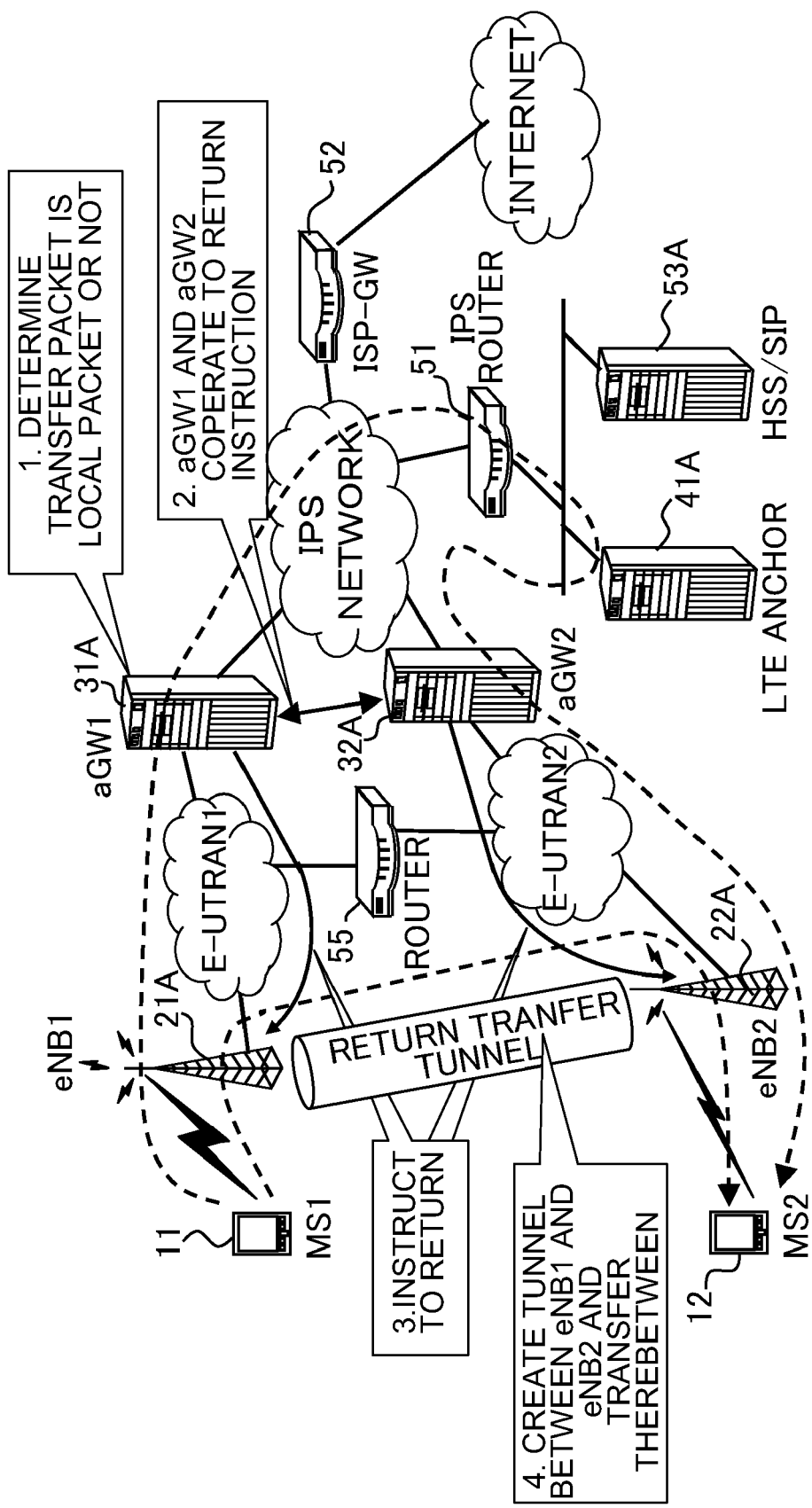
FIG. 50 is a diagram for explaining an operation in a communication system according to the sixth embodiment.

First of all, the first method will be described. With the first method, E-UTRANs (hereinafter, referred to as Evolved Universal Terrestrial Radio Access Network) under management of a plurality of the aGWs are mutually connected thereto, thereby performing the cooperation of the plurality of the aGWs. FIG. 50 illustrates a flow of the packet with the first method.

In FIG. 50, a router 55 mutually connects an E-UTRAN (E-UTRAN 1) under management of the aGW 31A and an E-UTRAN (E-UTRAN 2) under management of the aGW 32A. As a consequence, the cooperation between the aGWs 31A and 32A is established and this enables reception and transmission of information indicating an instruction of the return of the packet or an instruction of the resetting of the setting between the aGWs 31A and 32A. As illustrated in FIG. 50, for the structure between a plurality of aGWs, a tunnel for embodying the return of the packet can be structured between the eNB 21A and the eNB 22A, the packet can be transferred via the tunnel.

The second method will be described. The second method performs specification from the IP address of the packet by using a low load at the position of the aGW or eNB for managing the corresponding mobile station. In the case of the first method, the aGW 31A determines whether or not the packet addressed to the mobile station 12 is a local one. In this case, the aGW 31A specifies the position of the mobile station (i.e., determines whether or not the mobile station 12 is under management of the eNB 22 of the aGW 32A) from the destination IP address of the packet that is in progress of the transfer with a lower load as much as possible. As a specific one of the second method, the following third method and fourth method are considered.

The third method is as follows. The position of the aGW for managing the mobile station is obtained from user information management database such as HSS. That is, with the HSS (corresponding to HA or AAA in the case of the WiMAX technology), the structure is provided to manage the correspondence between the IP address and the aGW/eNB. The position of the aGW/eNB for managing the corresponding mobile station is obtained from the IP address of the packet on the basis of the correspondence. The method can be realized by expanding an interface of Reference Point S6 illustrated in FIG. 42.

Figure 51:
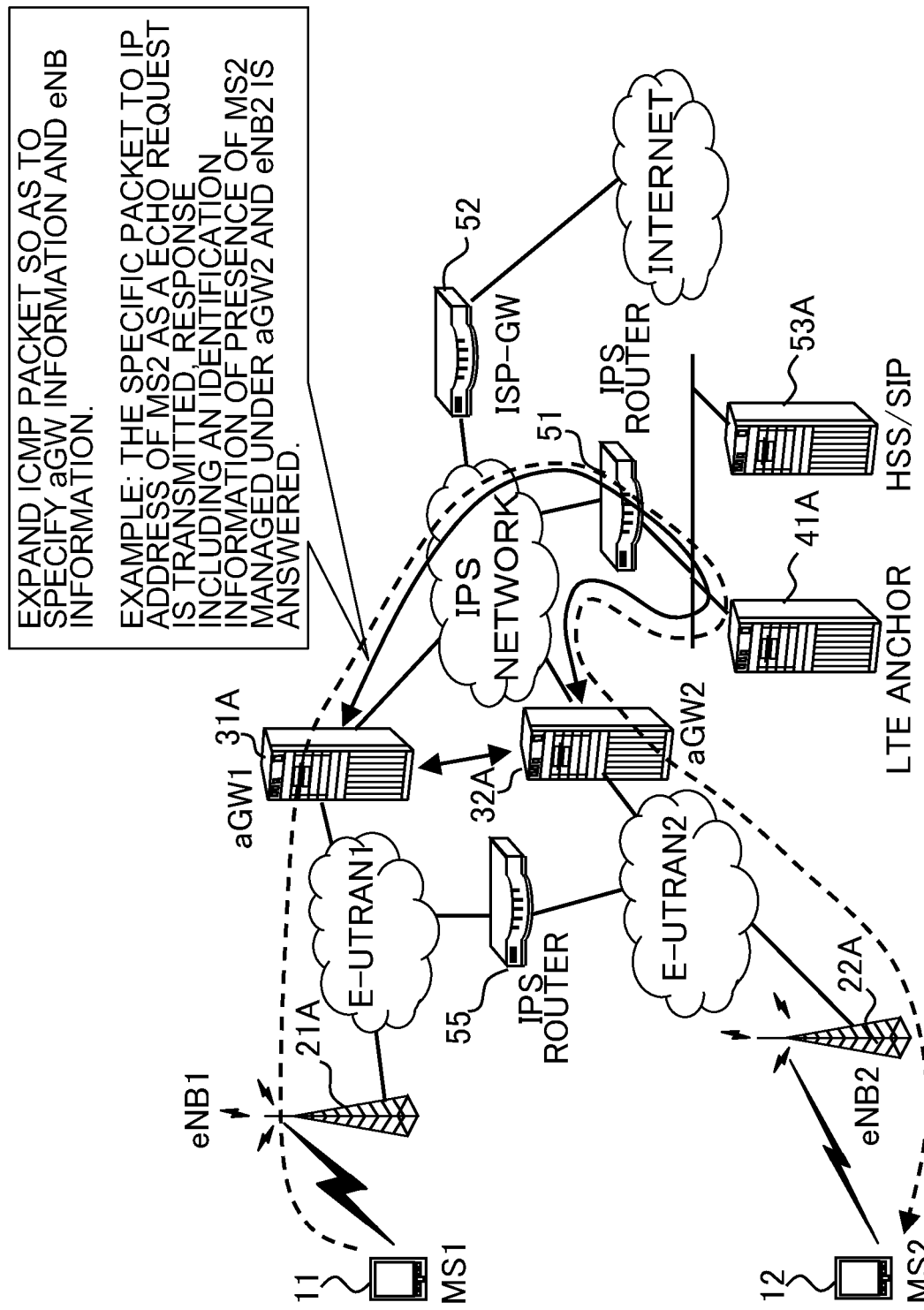
FIG. 51 is a diagram for explaining the operation in the communication system according to the sixth embodiment.

Further, the fourth method is as follows. That is, a specific packet to the mobile station is transmitted. As illustrated in FIG. 51, an echo request is transmitted to the IP address of the mobile station 12 relayed by the aGW 31A. The echo request means that the expanded packet such as ICMP is transmitted to the aGW 32A side as a partner. The corresponding aGW information and eNB information is transmitted as an echo response to the request of the aGW 32A. The aGW 31A refers to the aGW information and eNB information, thereby specifying the aGW 32A and the eNB 22A for managing the mobile station 12 of the IP address.

Hereinbelow, a description will be given of a flow of the packet in the communication system according to the sixth embodiment with reference to FIG. 52.

Figure 52:
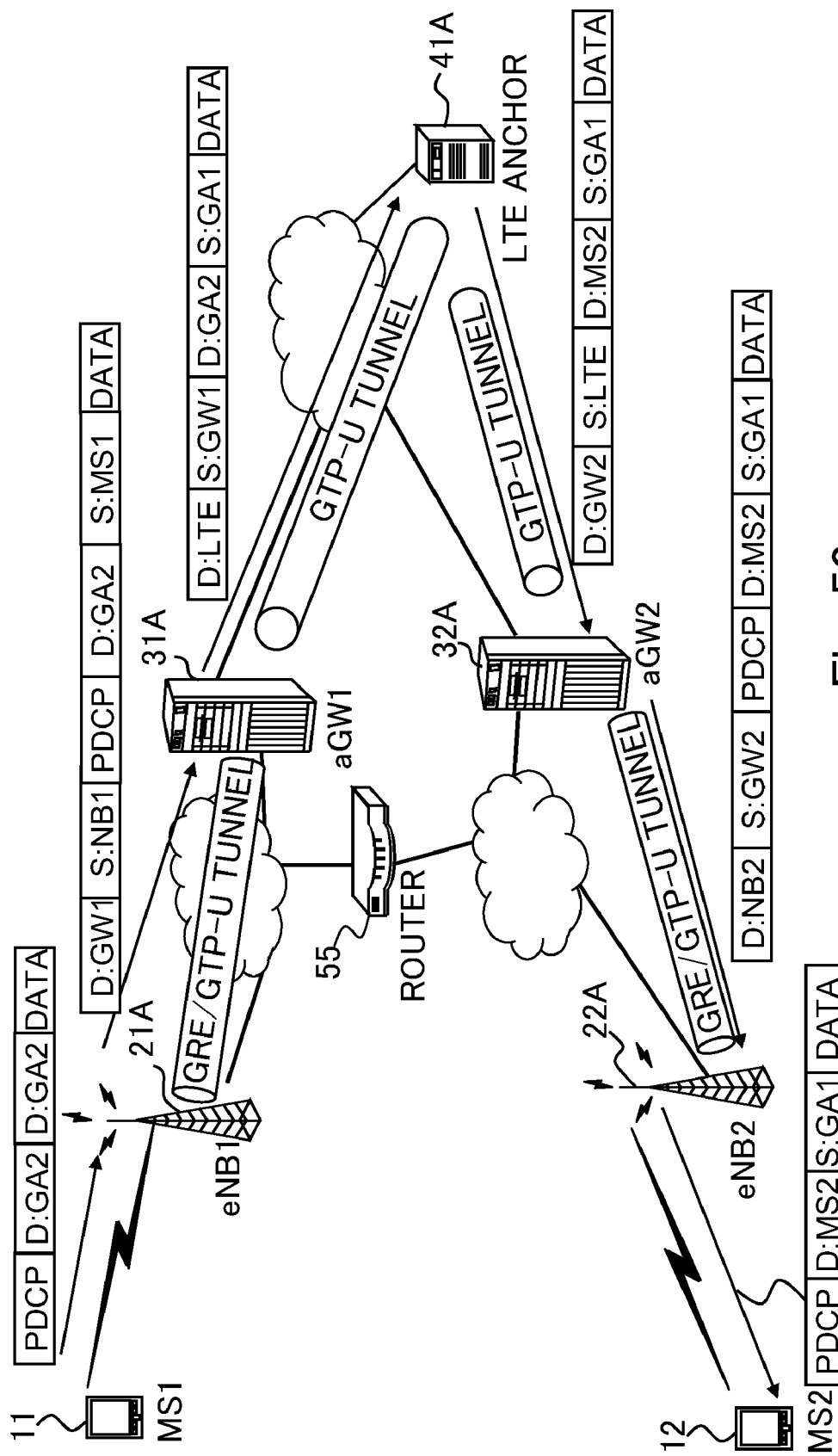
FIG. 52 is a diagram for explaining the operation in the communication system according to the sixth embodiment.

FIG. 52 illustrates the case of the communication between the mobile stations 11 and 12 under management of the aGWs 31A and 32A different from each other. A description will be given of the case of transferring the packet from the mobile station 11 to the mobile station 12 along a path illustrated by an arrow in FIG. 52.

1) The destination address is set as GA 2 (global IP address corresponding to the local IP address of the mobile station 12) and the packet is transferred from the mobile station 11 to the eNB 21A at the wireless interval. Further, the IP packet is subjected to the PDCP setting processing (encoding), and the PDCP packet header is added to the IP packet.

2) The transfer from the eNB 21A to the aGW 31A is realized by the encapsulation of GRE or GTP-U tunnel, and the destination of the packet address is set as the address of the aGW 31A. The internal header of the encapsulated packet is kept.

3) The aGW 31A receives the packet, resets the PDCP (decoding), extracts the IP packet, and replaces the address on the transmission source of the packet from the mobile station 11 from the address of the mobile station 11 to GA 1 as a global IP address of the mobile station 11. The packet is transferred to the LTE anchor 41A by using the GTP-U tunnel. Incidentally, processing for changing the address of the packet on the transmission source to GA 1 as the global IP address of the mobile station 11 can be performed on the LTE anchor 41A side.

4) The LTE anchor 41A receives the packet, encapsulates the packet, and transfers the encapsulated packet to the aGW 32A as the aGW for managing the mobile station 12 via the GTP-U tunnel. In this case, the LTE anchor 41A replaces the destination of the header of the packet from GA 2 to the address of the mobile station 12. Incidentally, the aGW 32A can replace the address.

5) The aGW 32A performs the PDCP setting processing of the IP packet, and transfers the packet to the eNB 22A via the GRE tunnel or GTP-U tunnel.

6) The eNB 22A receives the packet, resets the encapsulation of the GRE tunnel or GTP-U tunnel, and transfers the packet to the mobile station 12.

7) The mobile station 12 receives the packet, performs the PDCP resetting processing, and extracts the IP packet.

Incidentally, when the PDCP is terminated between the mobile station and the eNB, the PDCP resetting processing in Item 3) and the PDCP setting processing in Item 5) move to the processing of the eNB 21A in Item 2) and Item 6), respectively. In this case, referring to FIG. 52, the PDCP header is not set to the packet for transfer between the eNB 21A and the aGW 31A.

Figure 53:
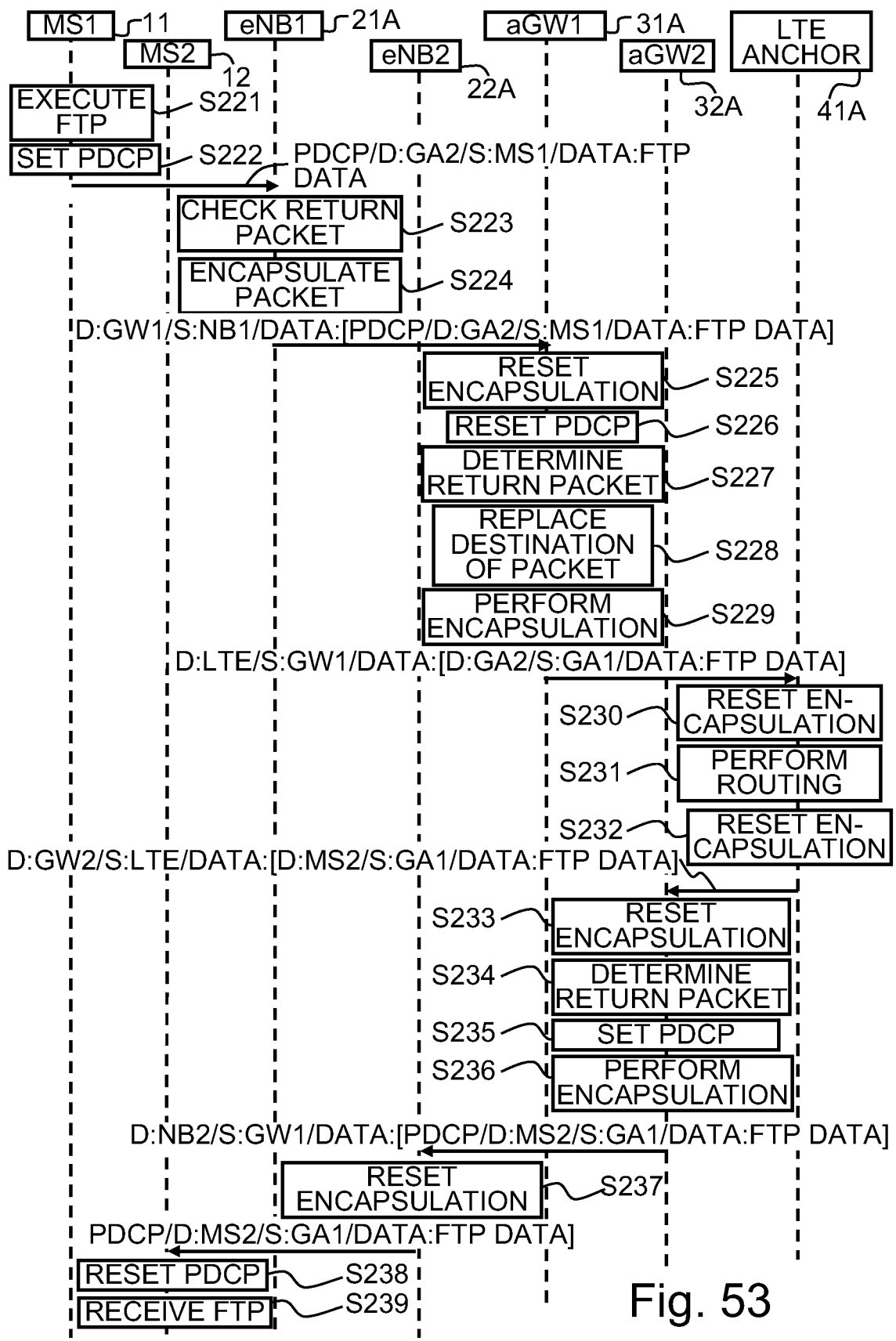
FIG. 53 is a sequence diagram for explaining the operation in FIG. 52.
Figure 54:
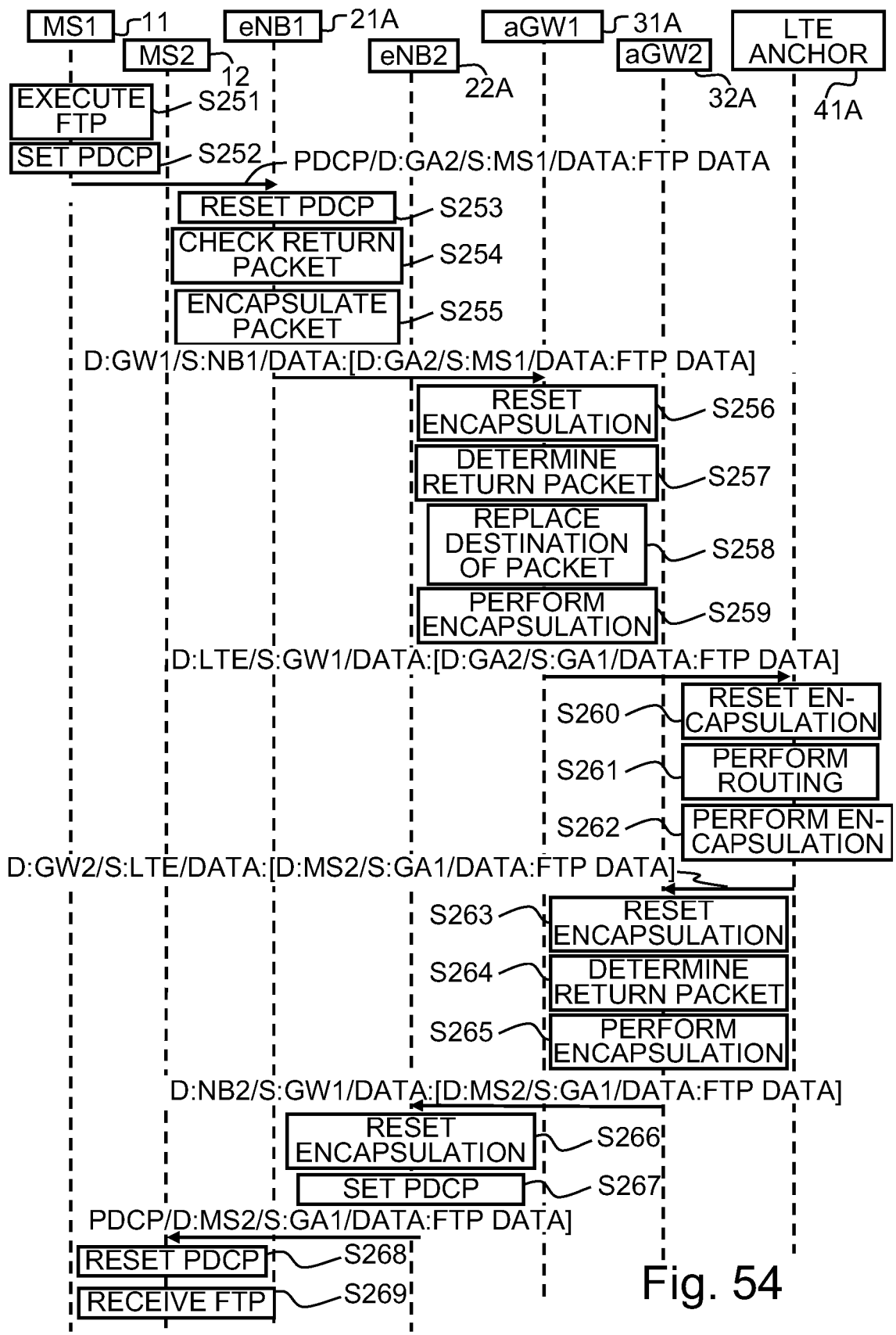
FIG. 54 is a sequence diagram for explaining the operation in FIG. 52.

Next, a description will be sequentially given of the transfer of the IP packet and a processing sequence thereof when the PDCP is terminated between the mobile station and the aGW (FIG. 53) and the PDCP is terminated between the mobile station and the eNB (FIG. 54).

In the sequence of FIG. 53, in S221, the mobile station 11 executes the FTR The PDCP is set (S222), and the packet is transferred to the eNB 21A. The eNB 21A receives the packet, and determines whether or not the packet is registered as the target of the return of the packet (S223). When it is not determined that the packet is registered as the target of the return of the packet, the packet is encapsulated and the packet is transferred to the aGW 31A as the destination (S224).

The aGW 31A receives the packet and resets the encapsulation (S225), and resets the PDCP (S226). Similarly to the fifth embodiment, the return adaptation determination is embodied (S227). The aGW 31A replaces the destination of the packet from the mobile station 11 to GA 1 (S228), performs the encapsulation (S229), and transfers the packet to the LTE anchor 41A.

The LTE anchor 41A receives the packet and resets the encapsulation (S230), and performs routing for setting the destination of the packet as the address of the mobile station 12 (S231). The encapsulation is performed (S232), and the packet is transferred to the aGW 32A.

The aGW 32A receives the packet and resets the encapsulation (S233). Similarly, the aGW 32A performs the return adaptation determination (S234), and sets the PDCP (S235). The aGW 32A performs the encapsulation (S236), and transfers the packet to the eNB 22A managed thereby.

The eNB 22A receives the packet and resets the encapsulation (S237), and transfers the packet to the mobile station 12 that manages it.

The mobile station 12 receives the packet and resets the PDCP (S238), and obtains data of the packet (S239).

In the sequence illustrated in FIG. 54, in S251, the mobile station 11 executes the FTR The PDCP is set (S252), and the packet is transferred to the eNB 21A. The eNB 21A receives the packet and resets the PDCP (S253). It is determined whether or not the packet is registered as the target of the return of the packet (S254). It is not determined that the packet is registered as the target of the return of the packet, the packet is encapsulated, and the packet is transferred to the aGW 31A as the destination (S255).

The aGW 31A receives the packet and resets the encapsulation (S256). Similarly to the case illustrated in FIG. 53, the return adaptation determination is embodied (S257). The aGW 31A replaces the destination of the packet from the mobile station 11 to the GA 1 (S258), performs the encapsulation (S259), and transfers the packet to the LTE anchor 41A.

The LTE anchor 41A receives the packet and resets the encapsulation (S260), and performs routing for setting the destination of the packet to the address of the mobile station 12 (S261). The encapsulation is performed (S262), and the packet is transferred to the aGW 32A.

The aGW 32A receives the packet and resets the encapsulation (S263), similarly performs the return adaptation determination (S264), performs encapsulation (S265), and transfers the packet to the eNB 22A managed thereby.

The eNB 22A receives the packet and resets the encapsulation (S266), sets the PDCP (S267), and transfers the packet to the mobile station 12 that manages it.

The mobile station 12 receives the packet and resets the PDCP (S268), and obtains data of the packet (S269).

Upon transmitting the packet from the aGW 31A to the LTE anchor 41A and upon receiving the packet from the LTE anchor 41A to the aGW 43A, the destination of the packet and the address on the transmission side are checked. When the address is the IP address, such as GA 1 or GA 2, under management of the LTE anchor 41A, it is determined whether or not the packet is returned by the eNB under management of the aGW.

Figure 59:
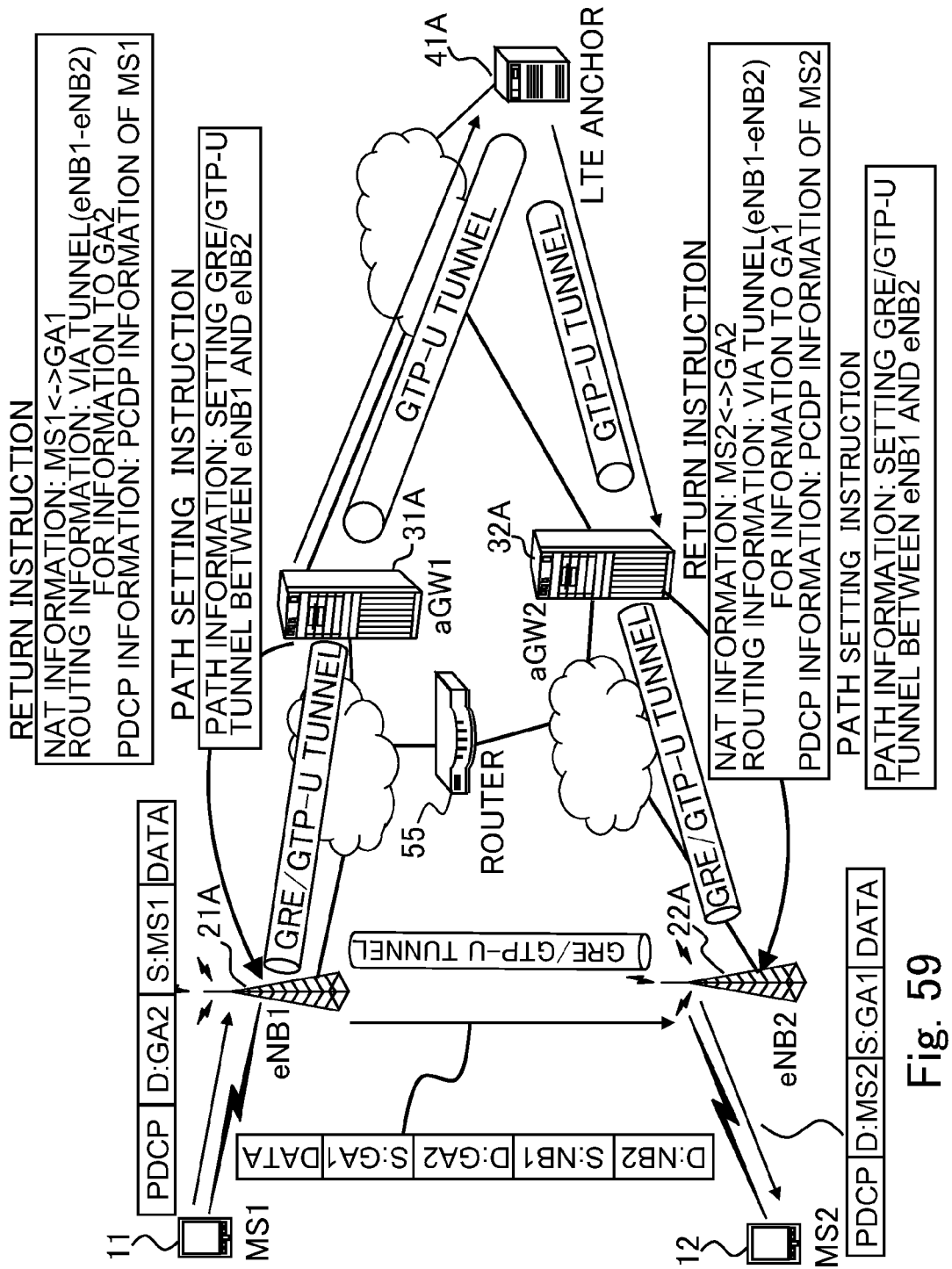
FIG. 59 is a diagram for explaining the operation of the communication system according to the sixth embodiment.

For the purpose of the determination, the aGW 31A and the aGW 32A manage the return management table illustrated in FIGS. 55 and 56, respectively. Thereafter, the aGW 31A or aGW 32A analyzes the traffic situation and the protocol (FTP or streaming) of the packet, and performs the return adaptation determination of the corresponding packet. When it is determined that the packet of the communication between the mobile stations 11 and 12 is to be registered as the target of the return of the packet, the aGW 31A and the aGW 32A search the mobile stations 11 and 12 for the communication of the corresponding packet with the third method or fourth method. As a consequence, the eNB and the aGW for managing the mobile station on the partner side are specified. The aGW 31A and the aGW 32A as specified above are cooperated and the return management table illustrated in FIGS. 55 and 56 is updated. Further, the aGW 31A and the aGW 32A create the NAT information and routing information for embodying the return of the packet on the basis of the return management table. As illustrated in FIG. 59, an instruction for embodying the return of the packet is issued to the eNB 21A and the eNB 22A under management thereof.

Figure 60A:
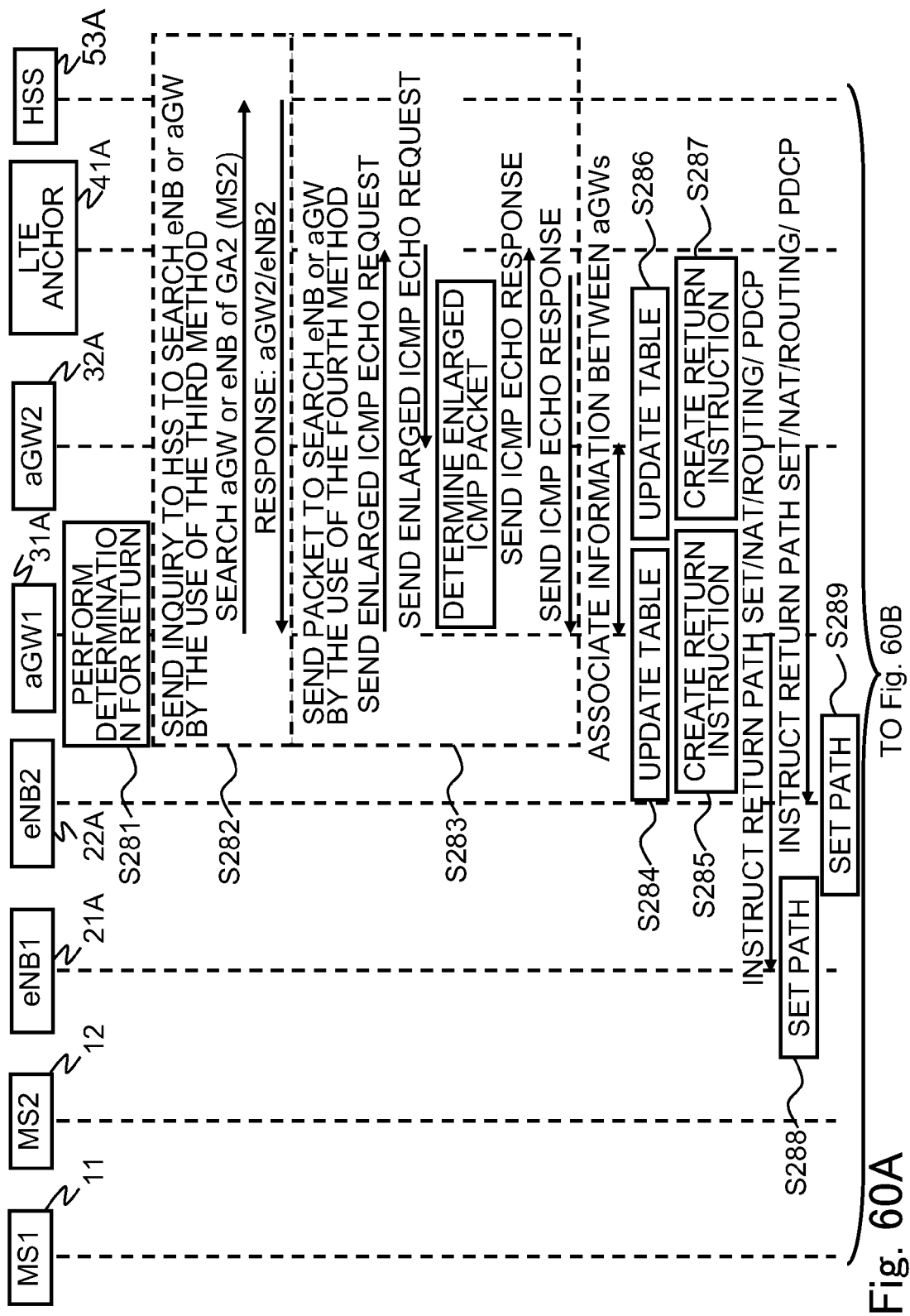

FIGS. 60A and 60B illustrate an operation sequence of an example of an operation for instructing that the return of the packet is executed and a subsequent packet-transfer operation from the mobile station 12 to the mobile station 12 in the communication system according to the sixth embodiment.

In FIGS. 60A and 60B, the aGW 31A performs the return adaptation determination (S281). Further, the eNB and the aGW on the mutual partner side are specified by using the third method (S282) or fourth method (S283). It is determined that the packet of the communication between the mobile stations 11 and 12 is to be registered as the target of the return of the packet, the aGW 31A is cooperated with the aGW 32A, and the return management table is updated (S284 and S286). That is, as illustrated in FIGS. 57 and 58, with respect to the packet of the communication between the mobile station 11 and the mobile station 12, "return to MS 2" and "return to MS 1" are written to a return state column of the corresponding record. Further, the aGW 31A and the aGW 32A create the NAT information and routing information necessary for embodying the return of the packet by the eNB 21A and the eNB 21B managed thereby and transfer the information to the eNB 21A and the eNB 21B (S285 and S287).

The eNBs 21B and 22B that receive the packet set a path (i.e., path for directly transferring the corresponding packet between the eNBs 21A and 22A) for returning the packet thereto (S288 and S289). The information is exchanged so as to check the path for returning the packet between the eNBs 21A and 22B ("check return path" in the drawing). The eNBs 21B and 22B set the NAT information and routing information thereto (S290 and S292). The packet of the communication between the mobile station 11 and the mobile station 12 is registered as the target of the return of the packet (S291 and S293).

Thereafter, the mobile station 11 performs the FTP processing (S294), sets the PDCP (S295), and transfers the packet addressed to the mobile station 12 to the eNB 21A. The eNB 21A receives the packet and resets the PDCP of the packet (S296). It is checked to see if the packet is registered as the return target (S297). The packet is encapsulated (S298). Since the packet matches the condition (destination and transmission source) registered in S291 as a result of S297, the NAT processing and routine processing are performed for returning the packet (S299). That is, the eNB 21A sets the destination of the packet as the address of the eNB 22A, and the transmission side is set as the address of the eNB 21A. Further, the address on the transmission source of the internal header of the encapsulated packet is replaced to the global address GA 1 of the mobile station 11. As a consequence, the packet is transferred to the eNB 22A, and the eNB 22A resets the encapsulation (S300). Since the packet matches the condition (destination and transmission source) registered in S293, the NAT processing and routine processing for returning the packet are performed (S301). That is, the destination of the packet address is replaced to the address of the mobile station 12. As a consequence, the return of the packet is embodied, and the packet is returned by the eNBs 21A and 22B and is transferred to the mobile station 12. The mobile station 12 that receives the packet resets the PDCP of the packet (S303), and obtains data of the packet in the FTP receiving processing (S304).

Incidentally, when t the PDCP is terminated between the mobile station and the eNB, the PDCP information does not need to be set to the return instruction information from the aGW to the eNB.

Figure 61A:
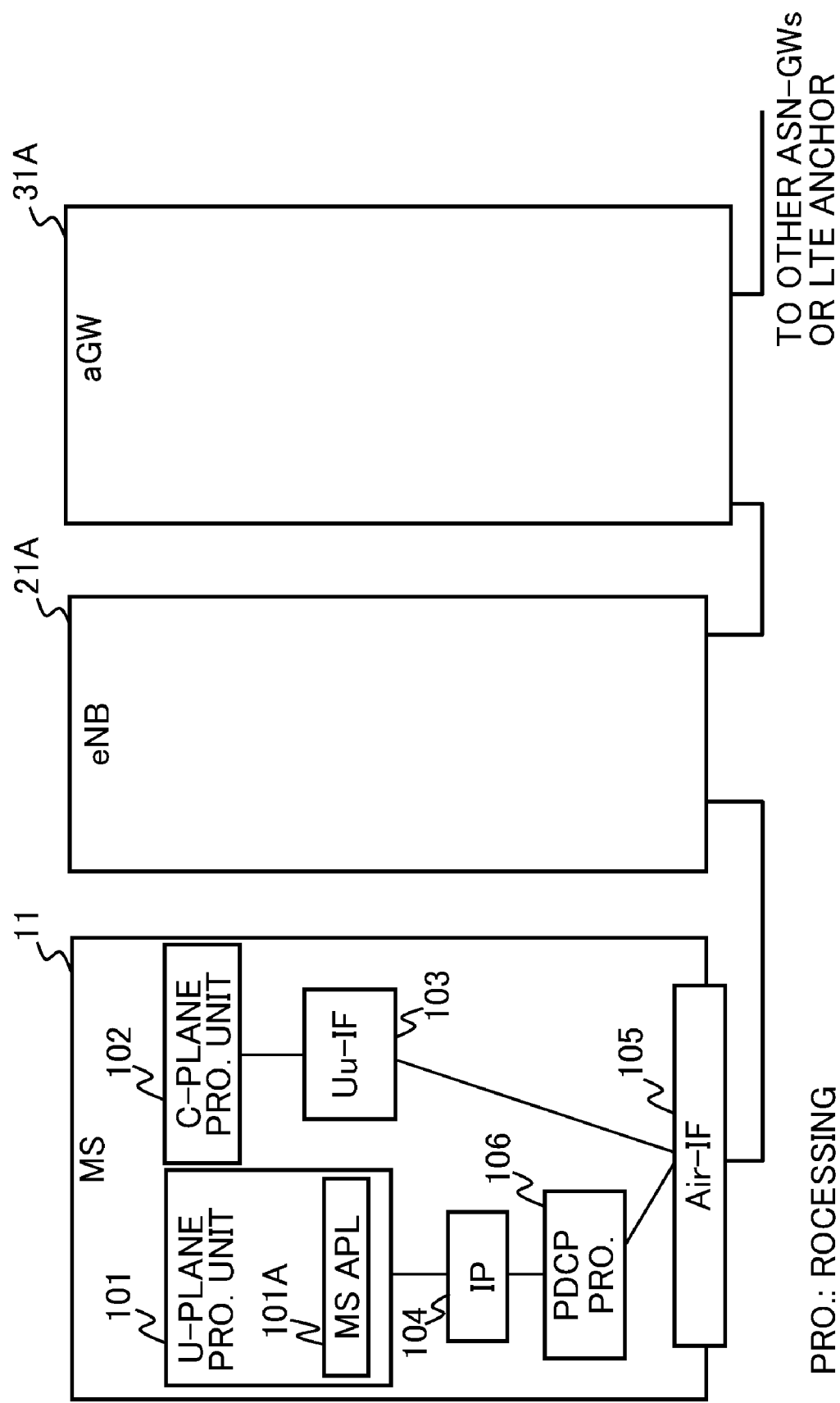
FIGS. 61A and 61B are diagrams for explaining the internal structure of devices in the communication system according to the fifth and sixth embodiments.
Figure 61B:
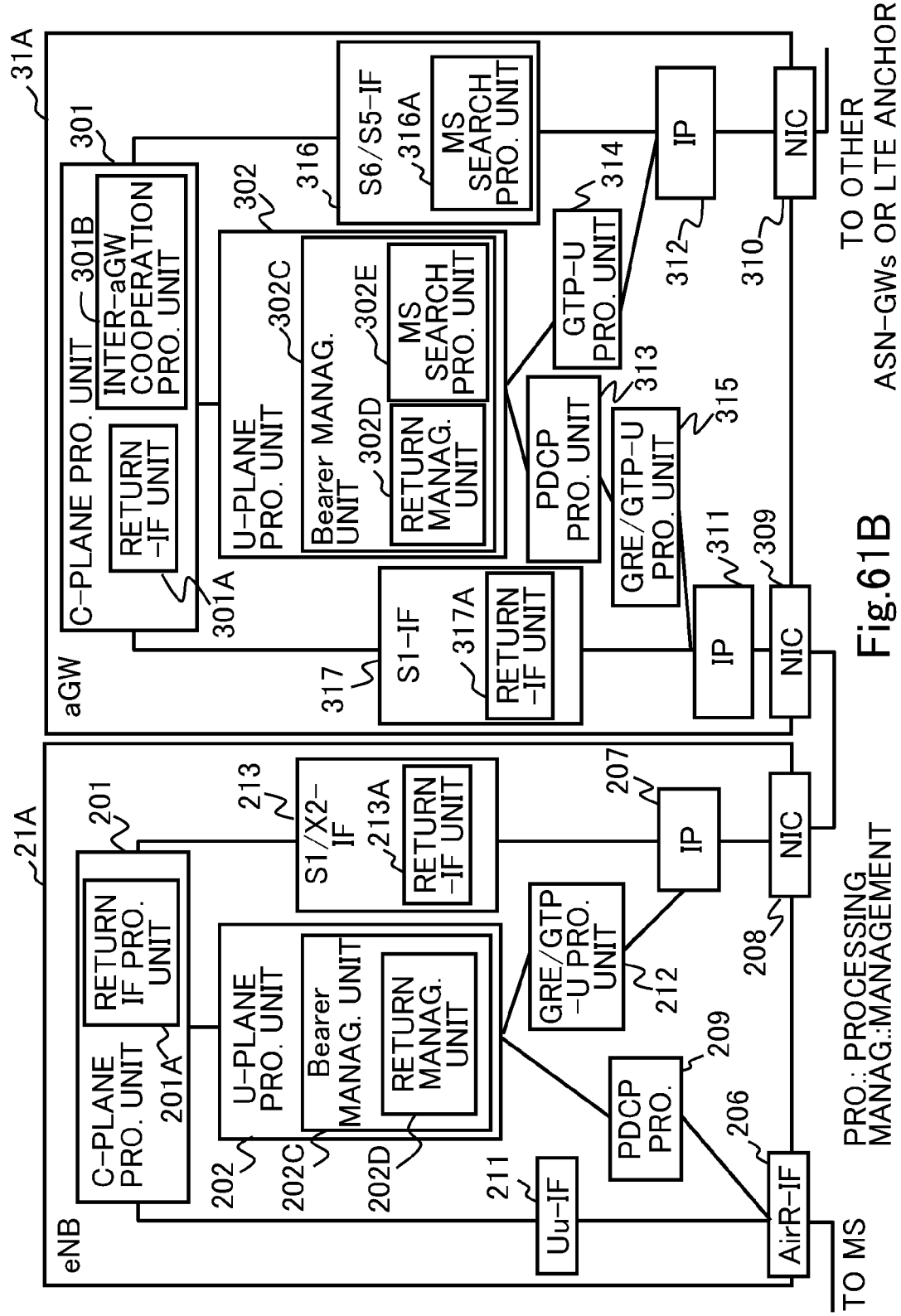

FIGS. 61A and 61B are block diagrams illustrating a block structure of the communication apparatus 11 illustrated in detail in FIG. 61A, communication apparatus 21A, and communication apparatus 31A that are illustrated in detail in FIG. 61B and perform the processing of the mobile station 11, eNB 21A, and aGW 31A structuring the fifth and sixth embodiments. The communication apparatus 21A, and the communication apparatus 31A are illustrated in detail in FIG. 61B. Incidentally, a communication apparatus 12 that executes the processing of the mobile station 12 has the same block structure as that of a communication apparatus 11 that executes the processing of the mobile station 11, and an overlapped description thereof will be therefore omitted. Similarly, a communication apparatus 22A for executing the processing of the eNB 22A has the same block structure as that of a communication apparatus 21A for executing the processing of the eNB21A and an overlapped description thereof will be therefore omitted. Similarly, a communication apparatus 32A for executing the processing of the aGW 32A has the same block structure as that of the communication apparatus 31A for executing the processing of the aGW 31A and an overlapped description thereof will be therefore omitted.

As illustrated in FIG. 61, a communication apparatus 11 for executing the processing of the mobile station 11 comprises: the U-Plane processing unit 101 having the MS APL unit 101A; the C-Plane processing unit 102; the Un-IF unit 103; the IP unit 104; the PDCP processing unit 106; and the Air-IF unit 105.

The Control Plane unit 102 (C-Plane unit 102) executes control processing, and the U-Plane processing unit 101 performs processing of user data. The MS APL unit 101A performs processing of various application (VoIP, Web browser, and email). The Uu-IF unit performs processing of an interface of LTE-Uu interface processing, i.e., at the wireless interval between the mobile station and the eNB. The IP unit 104 performs IP processing, i.e., TCP/IF, UDP/IP, and routing processing. The Air-IF unit 105 is a wireless interface.

The communication apparatus 21A that executes the processing of the eNB 21A comprises: the C-Plane processing unit 201 including the return IF processing unit 201A; and a U-Plane processing unit 202 including a Bearer management unit 202C having a return management unit 202D. Further, the communication apparatus 21A comprises: an S1/X2-IF unit 213 having a return-IF unit 213A; a GRE/GTP-U processing unit 212; a Uu-IF unit 211; the IP unit 207; the PDCP processing unit 209; the Air-IF unit 206; and the NIC unit 208.

The Control Plane unit 201 (C-Plane unit 201) executes control processing, and the U-Plane processing unit 202 performs processing of user data. The Uu-IF unit 211 performs the processing of an interface of an LTE-Uu interface processing, i.e., at the wireless interval between the mobile station and the eNB. The IP unit 207 performs IP processing, i.e., TCP/IF, UDP/IP, and routing processing. The Air-IF unit 206 is a wireless interface.

The Bearer management unit 202C performs route management of data transfer. The GRE/GTP-U processing unit performs the GRE tunnel or GTP-U tunnel. An S1/X1-IF unit performs processing of an interface of S1 (i.e., between the eNB and the aGW) and X2 (i.e., between the eNBs). The NIC unit 208 is a network interface card. The PDCP processing unit 209 performs processing for working the IP packet, compressing the header, and managing the sequence number. The return-IF unit 213A analyzes a return instruction (setting/resetting/path setting/path resetting) as the expanded S1, obtained by the aGW. The return-IF processing unit 201A transmits the received return instruction to the return management unit 202D. The return management unit 202D sets NAT/path/routing/PDCP in response to a return instruction.

The communication apparatus 31A for executing the processing of the aGW 31A comprises the C-Plane processing unit 301 (Control Plane unit 301) including the return-IF processing unit 301A and an inter-aGW cooperation IF processing unit 301B. Further, the communication apparatus 31A comprises the U-Plane processing unit 302 including the Bearer management unit 302C having a return management unit 304D and an MS search processing unit 302E. Furthermore, the communication apparatus 31A comprises: an S1-IF unit 317 having a return-IF unit 317A; and an S6/S5-IF unit 316 having an MS search processing unit 316A. In addition, the communication apparatus 31A comprises: the PDCP processing unit 313; the GTP-U processing unit 314; the GRE/GTP-U processing unit 315; the IP units 311 and 312; and the NIC units 309 and 310.

The C-Plane processing unit 301 executes the control processing, and the U-Plane processing unit 302 performs processing of user data. The IP units 311 and 312 perform IP processing, i.e., TCP/I/F, UDP/IP, and routing processing. The Bearer management unit 302C performs route management of the data transfer. The GRE/GTP-U processing unit 315 manages the GRE tunnel or GTP-U tunnel. The NIC units 309 and 310 are network interface cards. The PDCP processing unit 313 performs processing for working the IP packet, compressing the header, and managing the sequence number.

The S6/S5-IF unit 316 performs processing of an interface via S5 (i.e., between the aGWs or between the aGW and the LTE anchor) and S6 (i.e., between the aGW and HSS). The return-IF unit 317A constructs a return instruction message and transmits the created message to the eNB via an S1 interface. The IF processing unit 301A issues an instruction to the eNB, depending on the return state. The return management unit 302D checks the packet and determines the return on the basis of the return management table. The inter-aGW cooperation IF processing unit 301B performs processing of an interface when the aGWs cooperates with each other with respect to the return information. The MS search processing unit 316A requests information on the positions of the aGW and the eNB for managing the mobile stations in the mutual communication to HSS, or constructs a response message in response to the request. The MS search processing unit 302E expands an ICMP packet, and transmits or receives a message for specifying the information on the positions of the aGW and the eNB for managing the mobile stations in the mutual communication.

Figure 62:
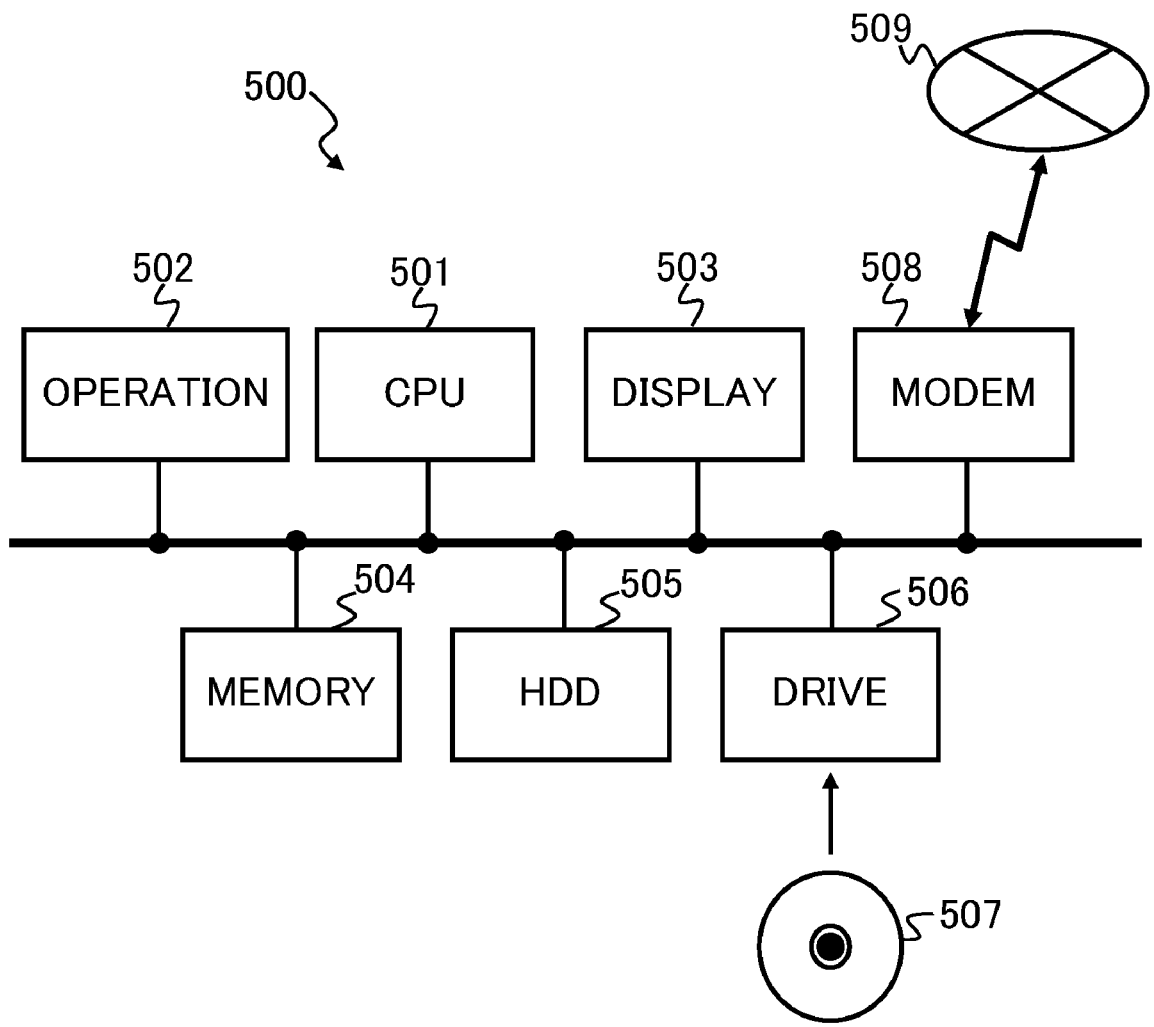
FIG. 62 is a diagram for explaining the case of realizing the devices in the communication system according to the embodiments by using a computer.

FIG. 62 is a block diagram of computer hardware for explaining the case of realizing the devices forming the communication system according to the embodiments. The communication systems means the communication apparatus 11, 12, 21, 22, 31, 32, 21A, 22A, 31A, and 32A that execute processing of the mobile station 11 and 12, the base stations 21 and 22, the ASN-GWs 31 and 32, the eNBs 21A and 22A, and the aGWs 31A and 32A.

As illustrated in FIG. 62, a computer 500 comprises: a CPU 501 that performs various operations by executing a command structuring a given program; an operation unit 502 that inputs operation contents or data by user via a keyboard or mouse; a display unit 503, such as a CRT or liquid crystal display, that displays a processing progress and a processing result of the CPU 501 to a user; a memory 504, such as a ROM or RAM, that stores a program and data executed by the CPU 501 and is used as a work area; a hard disk device 505 that stores the program and data; a CD-ROM drive 506 that loads the program or loads the data from an external unit via a CD-ROM 507; and a modem 508 that downloads the program from an external unit via a communication network 509 such as Internet or LAN.

The computer 500 loads or downloads the program via the CD-ROM 507 or via the communication network 509. The program includes commands for enabling the CPU 501 to execute the processing performed by the communication apparatuses 11, 12, 21, 22, 31, 32, 21A, 22A, 31A, and 32A. The computer 500 installs the program to the hard disk device 505 and properly loads the program to the memory 504, and the CPU 501 executes the program. As a consequence, the computer 500 realizes the communication apparatuses 11, 12, 21, 22, 31, 32, 21A, 22A, 31A, and 32A.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A communication apparatus comprising:
   a first transfer unit for transferring a first packet received from a base station to a second home agent, wherein the first packet, to be sent from a first mobile station to a second mobile station as a destination, is being transferred to the second home agent, the first mobile station and the second mobile station being managed by a first home agent and the second home agent respectively, the first mobile station and the second mobile station being located in a region under control of the base station;
   a second transfer unit for transferring the first packet sent back from the second home agent to the base station, the first packet encapsulated at the second home agent so as to include an address of the second mobile station as a destination address; and
   a return instruction unit for issuing to the base station an instruction for directly transferring a second packet to the second mobile station when a predetermined condition is satisfied, the instruction being including information of a network address translation for resetting an address of the second home agent to an address of the first home agent, wherein the second packet to be sent from the first mobile station to the second mobile station as a destination is being transferred to the second home agent, wherein the return instruction unit does not issue the instruction to the base station when the predetermined condition is not satisfied.

2. The communication apparatus according to claim 1, wherein the predetermined condition is at least one of a condition that an amount of the second packets is over a predetermined threshold and a condition that the second packet is one of a predetermined type of protocol.

3. The communication apparatus according to claim 1, wherein the first transfer unit updates an address on a transmission source in a third packet in an encapsulated packet received from the base station from an address of the first mobile station to an address of the first home agent, the first encapsulated packet being creating by encapsulating the third packet at the base station and adding a destination address to the first encapsulated packet, the third packet being transmitted from the first mobile station to the base station and sent to the second home agent,
   the second transfer unit updates a destination address on the third packet to an address of the base station, the third packet received from the second home agent in which a destination address on the third packet is updated from an address of the second home agent to an address of the second mobile station and encapsulates the third packet, and
   the return instruction unit transmits to the base station an instruction for updating a destination address and the source address of the third packet to the address of the second mobile station and the address of the first home agent respectively.

4. The communication apparatus according to claim 1, wherein, upon detecting handover or shut-off of power of the second mobile station, the return instruction unit transmits the resetting of the instruction to the base station.

5. A communication apparatus comprising:
   a first transfer unit for transferring a first packet received from a base station to a destination addressed to a second global address, wherein the first packet, being sent from a first mobile station to a second mobile station as a destination, is being addressed to a second global address, the first mobile station having the first global address managed by the base station and the second mobile station having the second global address managed by the base station;
   a second transfer unit for transferring the first packet sent back through an anchor to the base station; and
   a return instruction unit for issuing an instruction to the base station for directly transferring a second packet to the second mobile station when a predetermined condition is satisfied, wherein the second packet, destined from the first mobile station to the second mobile station, is being sent to the destination addressed to a global address, wherein the return instruction unit does not issue the instruction to the base station when the predetermined condition is not satisfied.

6. A method for controlling a communication apparatus comprising:
   first transferring a first packet received from a base station to a second home agent, wherein the first packet, to be sent from a first mobile station to a second mobile station as a destination, is being transferred to the second home agent, the first mobile station and the second mobile station being managed by a first home agent and the second home agent respectively, the first mobile station and the second mobile station being located in a region under control of a base station;
   second transferring the first packet sent back from the second home agent to the base station; and
   issuing instruction to the base station an instruction for directly transferring a second packet to the second mobile station when a predetermined condition is satisfied, wherein the second packet, destined from the first mobile station to the second mobile station, is being sent to the second home agent, wherein the return instruction unit does not issue to the instruction the base station when the predetermined condition is not satisfied.

7. The method for controlling a communication apparatus according to claim 6, wherein the predetermined condition is at least one of a condition that an amount of the second packets is over a predetermined threshold and a condition that the second packet is one of a predetermined type of protocol.

* * * * *